United States Patent
Norelius et al.

(10) Patent No.: US 12,248,998 B2
(45) Date of Patent: Mar. 11, 2025

(54) LOCATION-BASED VERIFICATION OF USER REQUESTS, IDENTIFICATION OF MATCHING USERS BASED ON IMAGE ANALYSIS, AND GENERATION OF NOTIFICATIONS ON MOBILE DEVICES

(71) Applicant: Panoramiq Markets Inc., Kalispell, MT (US)

(72) Inventors: Morgan Randall Norelius, Kalispell, MT (US); Eugene Thomas Luning, II, Colorado Springs, CO (US)

(73) Assignee: Panoramiq Markets Inc, Kalispell, MT (US)

( * ) Notice: Subject to any disclaimer, the term of this patent is extended or adjusted under 35 U.S.C. 154(b) by 109 days.

(21) Appl. No.: 18/058,221

(22) Filed: Nov. 22, 2022

(65) Prior Publication Data
US 2023/0351390 A1    Nov. 2, 2023

Related U.S. Application Data

(63) Continuation of application No. 17/262,969, filed as application No. PCT/US2019/044997 on Aug. 2, 2019, now Pat. No. 11,538,121.
(Continued)

(51) Int. Cl.
*G06Q 50/16* (2024.01)
*G06Q 30/06* (2023.01)
(Continued)

(52) U.S. Cl.
CPC ......... *G06Q 50/16* (2013.01); *G06Q 30/0613* (2013.01); *G06Q 30/0643* (2013.01); *G06Q 20/4015* (2020.05); *G06V 10/751* (2022.01)

(58) Field of Classification Search
None
See application file for complete search history.

(56) References Cited

U.S. PATENT DOCUMENTS 7,827,069 B2 * 11/2010 King ................... G06Q 50/167
                                                            705/37
8,718,612 B2    5/2014 Calman et al.
(Continued)

FOREIGN PATENT DOCUMENTS

WO    WO 2011011616 A1    1/2011

OTHER PUBLICATIONS

Wolfe, K., "The Mag: Homes & Gardens: 6 For Viewing; Coming Soon," Sunday Mercury [Birmingham (UK)] Dec. 21, 2003: 99. (Year: 2003).*

(Continued)

*Primary Examiner* — Nicholas D Rosen
(74) *Attorney, Agent, or Firm* — Knobbe, Martens, Olson & Bear, LLP

(57) ABSTRACT

Various techniques for facilitating communication with and across a network platform and one or more user computing devices are described. For example, these techniques may include (i) generating preference data based on capturing and analyzing user interactions with respect to a set of training photographs, (ii) generating, verifying, and processing search requests to allow users to identify other users and/or target objects on the network platform, and (iii) generating, verifying, and processing link requests to allow users to create links to or associations with other users and/or target objects on the network platform, among others.

20 Claims, 56 Drawing Sheets

Related U.S. Application Data

(60) Provisional application No. 62/867,129, filed on Jun. 26, 2019, provisional application No. 62/851,478, filed on May 22, 2019, provisional application No. 62/714,611, filed on Aug. 3, 2018.

(51) Int. Cl.
  *G06Q 30/0601* (2023.01)
  *G06Q 20/40* (2012.01)
  *G06V 10/75* (2022.01)

(56) References Cited

U.S. PATENT DOCUMENTS

| | | | |
|---|---|---|---|
| 10,037,561 B1 | 7/2018 | Hecht | |
| 10,073,584 B2 | 9/2018 | Miura et al. | |
| 10,109,095 B2 | 10/2018 | Johansen | |
| 10,223,859 B2 | 3/2019 | Massing et al. | |
| 10,438,301 B2* | 10/2019 | Ruebush | G06Q 30/0639 |
| 10,445,782 B2* | 10/2019 | Linden | H04L 67/01 |
| 10,679,269 B2 | 6/2020 | Wang et al. | |
| 10,902,158 B2 | 1/2021 | Liu et al. | |
| 11,538,121 B2* | 12/2022 | Norelius | G06Q 20/4015 |
| 2007/0162347 A1* | 7/2007 | King | G06Q 40/00 705/26.1 |
| 2012/0231814 A1 | 9/2012 | Calman et al. | |
| 2014/0121015 A1 | 5/2014 | Massing et al. | |
| 2014/0279592 A1* | 9/2014 | Ruebush | G06Q 50/16 705/313 |
| 2015/0024711 A1 | 1/2015 | Stob | |
| 2016/0048880 A1* | 2/2016 | Linden | G06Q 50/01 705/14.66 |
| 2016/0335688 A1 | 11/2016 | Wang et al. | |
| 2017/0357382 A1 | 12/2017 | Miura et al. | |
| 2018/0165848 A1 | 6/2018 | Johansen | |
| 2018/0196811 A1 | 7/2018 | Zhang et al. | |
| 2018/0220189 A1* | 8/2018 | Hodge | G06F 16/7837 |
| 2019/0147115 A1 | 5/2019 | Liu et al. | |
| 2019/0266683 A1 | 8/2019 | Burns | |

OTHER PUBLICATIONS

International Search Report and Written Opinion in PCT/US2019/044997 dated Dec. 6, 2019 in 12 pages.

* cited by examiner

1400

LOCATION-BASED VERIFICATION OF USER REQUESTS, IDENTIFICATION OF MATCHING USERS BASED ON IMAGE ANALYSIS, AND GENERATION OF NOTIFICATIONS ON MOBILE DEVICES

INCORPORATION BY REFERENCE TO ANY PRIORITY APPLICATIONS

This application is a continuation of U.S. patent application Ser. No. 17/262,969, filed on Jan. 25, 2021, which is a U.S. National Phase Application of PCT Application No. PCT/US2019/044997, filed on Aug. 2, 2019, which claims priority to U.S. Provisional Application No. 62/714,611, filed on Aug. 3, 2018, U.S. Provisional Application No. 62/851,478, filed on May 22, 2019, and U.S. Provisional Application No. 62/867,129, filed on Jun. 26, 2019, the disclosures of which are incorporated herein by reference in its entirety for all purposes. Any and all applications for which a foreign or domestic priority claim is identified in the Application Data Sheet as filed with the present application are hereby incorporated herein by reference in their entirety under 37 CFR 1.57 for all purposes.

TECHNICAL FIELD

This disclosure relates to the field of network transmission of requests, messages, and notifications, and particularly to techniques for facilitating transmission of requests, messages, and notifications in a network platform having multiple users and/or multiple types of users.

BACKGROUND

In a modern network platform, users can submit requests to a central server of the network platform, and the server can process the requests and transmit any responses back to the users. For example, such requests can be requests to search for data or users on the network platform. As another example, such requests can be requests to create or update user profiles maintained on the network platform.

SUMMARY

Various techniques for facilitating communication with and across a network platform and one or more user computing devices are described. For example, these techniques may include (i) generating preference data based on capturing and analyzing user interactions with respect to a set of training photographs, (ii) generating, verifying, and processing search requests to allow users to identify other users and/or target objects on the network platform, and (iii) generating, verifying, and processing link requests to allow users to create links to or associations with other users and/or target objects on the network platform, among others. These and other implementations are described in greater detail below with reference to FIGS. 1-56.

BRIEF DESCRIPTION OF THE DRAWINGS

The embodiments described herein are illustrated by way of example, and not by way of limitation, in the figures of the accompanying drawings in which like references indicate similar elements.

DETAILED DESCRIPTION

Introduction

Figure 1:
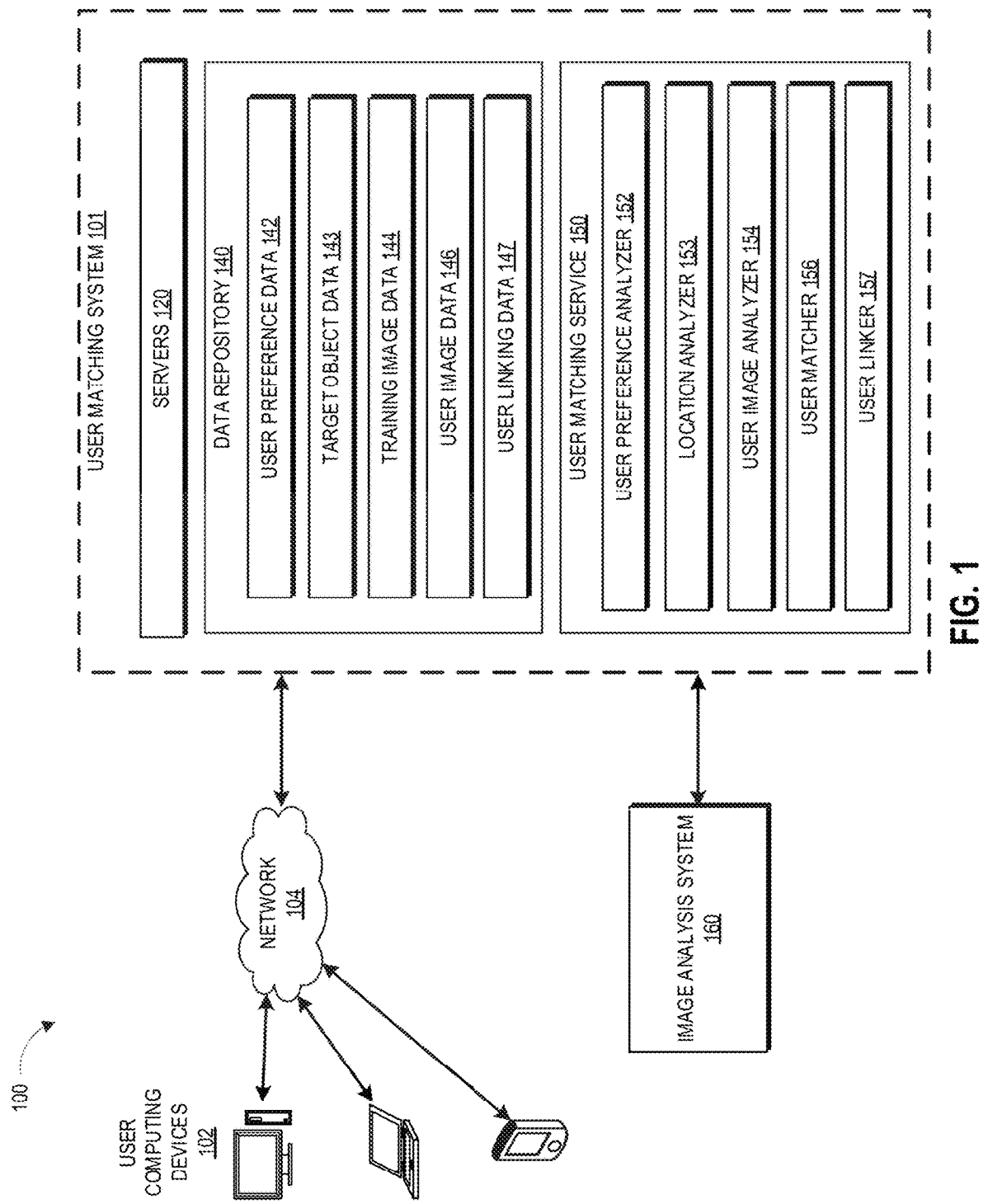
FIG. 1 is a block diagram depicting an illustrative network environment for generating preference profiles based on image analysis and user feedback, generating and processing search requests based on image analysis, and linking user accounts to target objects based on requests from user computing devices in accordance with aspects of the present disclosure.

Disclosed herein are systems and methods for matching buyers (or a first type of users) and sellers (or a second type of users) on a real estate marketplace platform. The system may present a set of training photographs to buyers, and for each buyer, generate a buyer profile based on the buyer's interaction with the photographs and any additional user-inputted data such as price range (e.g., $700 k-$900 k), neighborhood (e.g., ZIP code, city name, region name, etc.), minimum and maximum beds/baths (e.g., 3+ beds and 2.5+ baths), future date for potential purchase (e.g., in two years when my child finishes elementary school, we would like to buy a home in that neighborhood). For example, the system may allow the buyer to perform an action (e.g., swipe the photograph left or activate a digital button displayed on a touchscreen) to indicate that he or she dislikes a photograph, or perform another action (e.g., swipe the photograph right or activate another digital button displayed on the touchscreen) to indicate that he or she likes the photograph.

Alternatively, the system may allow the buyer to indicate of degree of preference for the photograph using a slider bar (e.g., by dragging the slider bar in one direction or another). Based on the preferences expressed for the training photographs, the system can extract attributes from the photographs, and use the attributes to build preference profiles for the buyer users. For example, the system may use the buyer user's preference scores on the training photographs to extract the user's preference for the attributes corresponding to the training photographs (e.g., that the user prefers attribute A based on the user's indication of like for photograph X associated with attribute A, that the user does not prefer attribute B based on the user's indication of dislike for photograph Y associated with attribute B, that the user prefers attribute C 60% based on the user's slider bar score for photograph Z associated with attribute C, etc.), and then compare the user's preference for those attributes to the attributes extracted from the sellers' photographs. Further, the system may receive user photographs of sellers' homes and extract attributes from the user photographs. For example, a seller may use her smartphone to capture a photograph of her home from her front yard, transmit the photograph to a remote server for image analysis, and find out the attributes associated with her home and/or potential buyers who might be interested in purchasing her home. Based on a comparison of the attributes of the buyer users to the attributes of the homes of the seller users, the system can identify the best matching sellers/homes for each buyer, and the best matching buyers for each seller/home.

By allowing a user to submit a request to search for and discover potential buyers who might be interested in purchasing the user's home regardless of whether the user's home is listed for sale, the systems and methods of the present disclosure can facilitate communication between the user and potential buyers of the user's home by generating and transmitting electronic notifications to and from their mobile devices. Such a request may be referred to herein as a "search request." In some cases, a search is performed in response to the search request without any further approval. In other cases, a search is performed only after the remote server verifies that the search request is a valid one based on the information included in the search request and/or information otherwise accessible by the remote server. In yet other cases, a search is performed only upon approval by an administrative user of the remote server.

In some cases, however, the platform configured to perform the search may encounter a volume of requests that are generated by fraudulent or unauthorized users. Such requests may unnecessarily burden the computing resources of the platform and degrade the quality of the search and/or matching services provided by the platform. To address such technical concerns, an improved method for validating and/or verifying the incoming search requests may be desired.

Also disclosed herein are systems and methods for linking one or more types of users (e.g., potential buyers and/or current homeowners) to one or more target objects (e.g., houses that may or may not be listed for sale) on a real estate marketplace platform. For example, a user may walk by a house and fall in love with the house. Even though the user has no idea whether or not the house is listed for sale (or knows that the house is not listed for sale), he or she may still wish to express his or her interest in purchasing the house to its owner (who may or may not be a registered user on the real estate marketplace platform).

In such cases, the systems and methods described herein can allow the user to request or establish a link between the user (or his or her user account) and the house (or a representation of the house such as the street address of the house or another object or identifier associated with the house). An example system may present, on the user's mobile device, a user interface for taking a picture of the house that the user likes and submitting the picture along with the street address of the house. The mobile device may transmit the user-submitted picture and street address to a remote server (e.g., a system for linking users to corresponding houses). In response, the remote server may store the user-submitted picture and/or the identity of the user (e.g., user account, user profile, user ID, etc.) in association with the street address (or another object or identifier) to create a link between the user and the house that the user likes.

If the house is associated with another user on the remote server (e.g., based on this user being identified as the owner of the house), the remote server may cause a notification to be provided to the user associated with the house (e.g., the owner of the house). For example, the notification may let the owner of the house know that there is someone (e.g., the user who has requested and/or established the link as described in the preceding paragraph) interested in potentially buying his or her house. If the house is not associated with any other user on the remote server (e.g., if no one has claimed to be the owner of the house), the remote server may automatically cause a notification to the mobile device of the next user who submits a request to associate their user account with the house (e.g., when the owner of the house eventually creates a user account on the remote server). For example, when the owner of the house downloads a mobile application for the real estate marketplace platform and creates a user account on the mobile application, the owner of the house may be prompted for the street address information of one or more of his or her property. When the owner of the house inputs the street address of the house into the mobile application and the street address is transmitted to the remote server, the remote server may identify all other user accounts that were previously linked to the particular street address (e.g., those who expressed interest in potentially purchasing the house at the street address) and notify the owner of the house about these other users (e.g., by sending an in-app notification, email, text message, and/or via other modes of communication).

By allowing a user to request and create a link between the user's account and a house that the user discovers and falls in love with, regardless of whether the house is listed for sale, the systems and methods of the present disclosure can facilitate communication between the user and the owner of the house by generating and transmitting electronic notifications to their mobile devices based on the created link. A request to create such link may be referred to herein as a "link request." In some cases, a link is automatically established between the requesting user's account and the target object in response to the link request without any further approval. In other cases, a link is created between the requesting user's account and the target object only after the remote server verifies that the link request is a valid one based on the information included in the link request. In yet other cases, a link is created between the requesting user's account and the target object only upon approval by an administrative user of the remote server.

In some cases, however, the platform may encounter a volume of requests that are created by fraudulent users or entities. Such requests may unnecessarily burden the computing resources of the platform and degrade the quality of the linking and/or notification services provided by the platform. To address such technical concerns, an improved method for validating and/or verifying the incoming link requests may be desired.

The techniques described herein may be utilized by the system to perform location-based validation (and/or verification) using global positioning system (GPS) coordinates (or other location determination technology) to ensure that the requests are submitted by authorized users and/or perform location-based verification using GPS coordinates to ensure that the information included in the requests is accurate. Location-based validation can be used to ensure that only users that are physically near a target object are allowed to submit search requests using such target object and/or establish links with such target object. Such validation can help prevent fraudulent or unauthorized use of the system, and ensure that only users who have actually seen the actual target object are able to establish links with, or generate search requests based on, such target object. For example, the system may compare the GPS coordinates associated with the user's mobile device to the location associated with the target object to ensure that the locations are within a threshold level of proximity (e.g., within a threshold distance from each other, within the same or adjacent geographical region, within the same ZIP Code, on the same or adjacent street, on the same or adjacent lot, plot, tract, or parcel of land, and the like). As another example, the system may compare the GPS coordinates associated with the user-submitted image of the target object to the location associated with the target object to ensure that the locations are within a threshold level of proximity.

Additionally or alternatively, the system may determine whether the target object (e.g., home) based on which the search request is submitted is indicated in the system (e.g., in a data repository) as being owned by the user submitting the search request. For example, User A standing right next to a particular home may be able to submit a search request by taking a photograph of the home based on User A being listed in the system as the owner of the home, whereas User B standing right next to the home may not be allowed to submit a search request by taking a photograph of the home because User B is not listed in the system as the owner of the home.

In some implementations, the system may compare the user-submitted image of the target object to another image of the target object accessed (e.g., using the location associated with the user's mobile device or the user-submitted image) from a database of images to confirm that the user-submitted image matches the image accessed from the database, and the system may validate and/or verify a request from a user (e.g., a search request, a link request, etc.) based on the user-submitted image matching the image accessed from the database (e.g., process the request if verification is successful, otherwise deny the request). For example, the system may determine that one image matches the other based one or more considerations such as whether the level of similarity (e.g., from pixel-by-pixel comparison, feature detection and comparison, etc.) between the two images satisfies a threshold condition (e.g., exceeds a threshold level), whether the image corresponds to the other, whether the image is cross-referenced to the other in a database (e.g., a data repository of the system), and/or whether there is an indication having or exceeding a threshold degree of certainty that the two images are one and the same), etc. As yet another example, the system may input both of the images into an image analysis model and compare the output results to determine whether the images match. For example, based on the output results being within a threshold percentage of each other, the system may determine that the images match, and based on the output results exhibiting a level of difference that is greater than a threshold level, the system may determine that the images do not match.

As yet another example, the system may compare the characteristics of the user-submitted image (or another image submitted by another user, such as the owner of the target object) of the target object to the user's preference values (e.g., in a preference model generated based on one or more inputs previously provided by the user in response to a series of training photographs presented via the user interface on a user computing device) to confirm that the characteristics of the target object (or the user-submitted image) are aligned with the user's preference values, and the system may validate and/or verify a request from a user (e.g., a search request, a link request, etc.) based on the characteristics being aligned with the user's preference values (e.g., process the request if verification is successful, otherwise deny the request). For example, the system may determine that the characteristics are aligned with the user's preference values based on the characteristics including one or more of the user's preference values, based on the characteristics being within a threshold level of the user's preference values, and the like.

Based on the one or more comparisons described herein, the system may allow the search request to be submitted, and generate and return a search result. By using one or more combinations of these techniques, the system can ensure that the search requests are legitimate and accurate. By filtering out or disabling illegitimate or unauthorized requests, the system can reduce the consumption of valuable computing resources.

Additionally, based on the one or more comparisons described herein, the system may allow the link request to be submitted, approve the creation of the requested link, and/or provide an indication of the result(s) of the one or more comparisons (e.g., whether or not there was a match, how close the locations, images, and/or the preference values were, etc.). For example, the system may establish the link based on determining that the locations are within a threshold level of proximity but indicate that there is only a 33% match between the target object and the user's preference values. As another example, the system may not allow the user to submit the link request based on the location of the user's mobile device being outside the threshold level of proximity from the target object. As yet another example, the system may establish the requested link regardless of whether the location of the user's mobile device is within the threshold level of proximity from the target object but indicate that the user's link request was submitted from a location outside the threshold level of proximity from the target object.

By using one or more combinations of these techniques, the system can ensure that the requests are legitimate and accurate such that the links created based on such requests are valid. Based on these links, the system can ensure that the electronic notifications transmitted to the mobile devices of its users are also valid. Also, by filtering out or disabling illegitimate requests and/or providing an indication that the requests may not be genuine, the system can reduce the consumption of valuable computing resources.

Overview of Example Network Environment

The illustrative network environment 100 shown in FIG. 1 includes a user matching system 101 according to one implementation. The user matching system 101 can output training photographs for presentation to the user, receive indications of the user's preferences for the training photographs, generate a preference profile for the user (e.g., based on tags or attributes associated with the training photographs), receive user photographs from another user, determine tags or attributes associated with the user photographs, generate a preference profile for said another user, determine a match between the users based on a comparison of their preference profiles, and perform other aspects discussed herein or illustrated in FIGS. 1-56. The user matching system 101 can also link user accounts associated with the user matching system 101 with one or more target objects based on requests from user computing devices 102. The created links can be used to transmit electronic notifications to the user computing devices 102 and to facilitate communication among the user accounts of the user matching system 101.

In FIG. 1, various example user computing devices 102 are shown in communication with the user matching system 101 via network 104. The user computing devices 102 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like.

The network 104 over which the user computing devices 102 can access the user matching system 101 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some implementations, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

In the depicted implementation, the user matching system 101 includes servers 120, data repository 140, and user matching service 150. The servers 120 can communicate with the user computing devices 102 over the network 104 and provide access to various services of the user matching system 101. In the example of FIG. 1, the user matching system 101 provides a user matching service 150. In some implementations, one or more of the services provided by the user matching system 101 can be implemented as software components executing in physical computer hardware on the servers 120 or on separate computing devices.

The data repository 140 includes user preference data 142, target object data 143, training image data 144, user image data 146, and user linking data 147. The user preference data 142 may include information indicating the qualities, characteristics, or attributes that individual users of the user matching system 101 look for (or are predicted to be looking for, for example, using the training photographs) in a home.

The target object data 143 may include information regarding the target objects identified by the users of the user matching system 101. For example, the target objects are houses, and the target object data 143 may include the target object identifiers associated with the target objects (e.g., the street address or another unique identifier) and additional information about the target objects such as city, state, location information, lot size, number of bedrooms, bathrooms, and the like.

The training image data 144 may include the training photographs presented to the users of the user matching system 101 to determine the preferences of the users, and the combination of attributes associated with each of the training photographs.

The user image data 146 may include photographs that are submitted by the users of the user matching system 101. For example, the user image data 146 include photographs of houses that the users captured on their user computing devices 102 and submitted along with the link requests (e.g., a potential buyer searching for potential homes or sellers to be linked to) or search requests (e.g., a potential seller searching for potential buyers, or a potential buyer searching for potential homes or sellers).

User linking data 147 (also referred to herein as linking information) may include information indicating one or more of the users of the user matching system 101 and one or more corresponding target objects associated with the user(s). For example, if User A is linked to Target Object X, the user linking data 147 may indicate that User A is linked to Target Object X. Other components of the user matching system 101 or components outside the user matching system 101 may utilize the user linking data 147 to determine whether a target object is linked to any users in the user matching system 101 and/or to determine whether a user is linked to any target objects in the user matching system 101.

Although not illustrated in FIG. 1, the data depository 140 may include other types of data such as target object data including information regarding the target objects (e.g., homes) identified by the users of the user matching system 101. For example, the target objects can be the homes registered by homeowner users of the user matching system 101, homes identified by potential buyers, or homes retrieved from public or private databases. Such target object data may include the target object identifiers associated with the target objects (e.g., the street address or another unique identifier) and additional information about the target objects such as city, state, location information, lot size, number of bedrooms, bathrooms, and the like.

Figure 56:
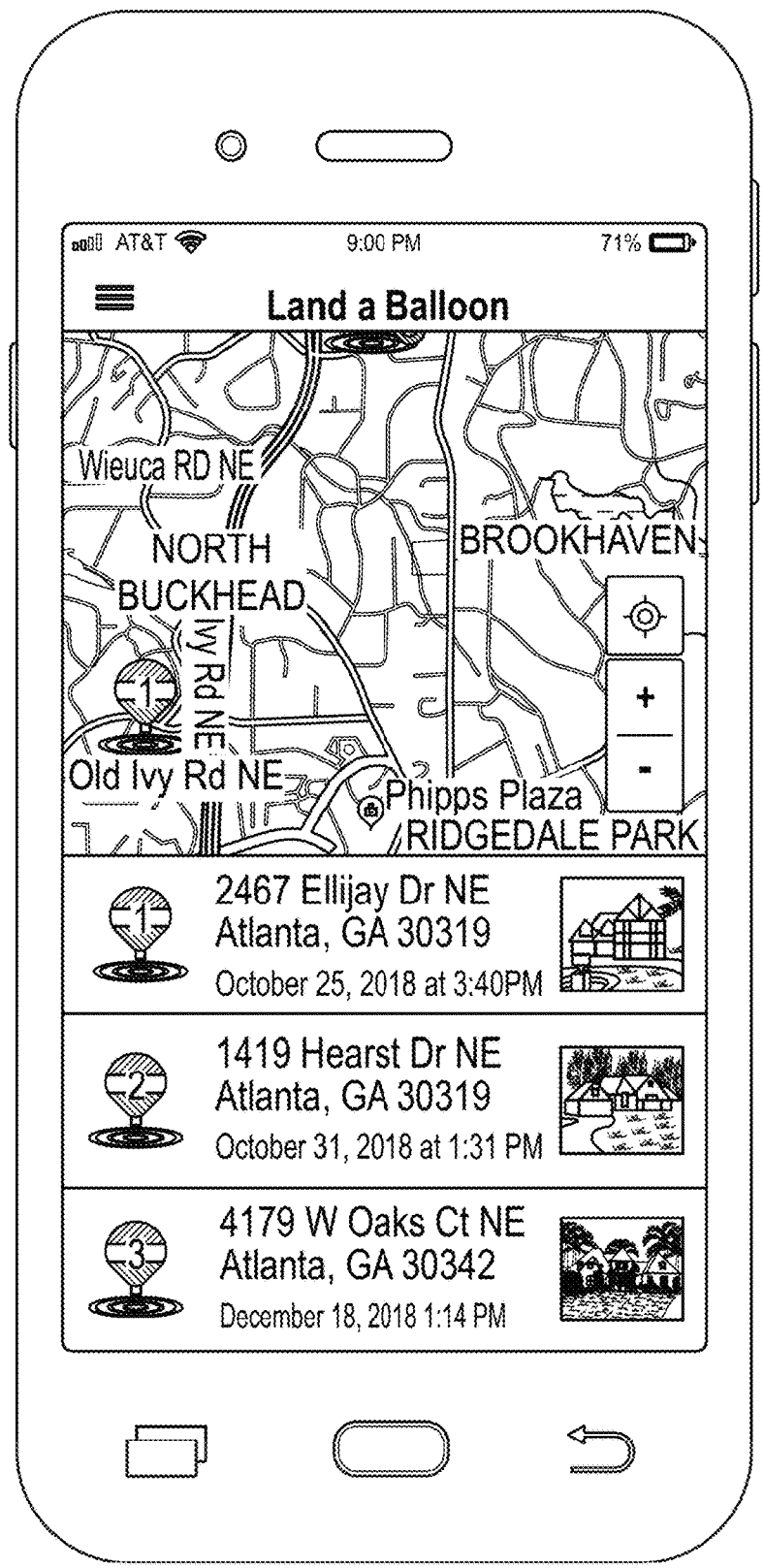

The user matching service 150 may implement a user matching method by which users of the system 101 are matched based on the preference profiles and the uploaded user photographs. In the example of FIG. 1, the user matching service 150 includes a user preference analyzer 152, a location analyzer 153, a user image analyzer 154, a user matcher 156, and a user linker 157 that may be used to implement various aspects of the present disclosure, such as outputting training photographs for presentation to the user, receiving indications of the user's preferences for the training photographs, generating a preference profile for the user (e.g., based on tags or attributes associated with the training photographs), receiving user photographs from another user, determining the location associated with the user photographs, determining that the location is proximate (e.g., is within a threshold level of proximity) to the target object depicted in the user photographs, determining tags or attributes associated with the user photographs, generating a preference (or attribute) profile for said another user (or an object depicted in the user photographs), determining a match between the users (e.g., buyer user and seller user)

based on a comparison of their preference (or attribute) profiles, and other aspects discussed herein or illustrated in FIGS. 1-56. Additionally or alternatively, the user matching service 150 may use one or more of its components to implement various aspects of the present disclosure, such as receiving a request to link a first user account with a target object using an image depicting the target object, verifying that the geographical location associated with the image and the geographical location associated with the target object are within a threshold level of proximity, causing the first user account to be linked to the target object in a database or storage device accessible by the user matching service 150, receive a request to associate a second user account with the target object, causing a notification to be transmitted to the second user account based at least on the link between the first user account and the target object, and other aspects discussed herein or illustrated in FIGS. 1-56.

In some implementations, the user matching service 150 may implement a user linking method by which users of the user matching system 101 can request to be linked to one or more target objects identified by the users. The target objects identified by the users may already be stored in the user matching system 101. Alternatively, the target objects identified by the users may not yet be in the user matching system 101 and may be added to the user matching system 101 in response to the link requests from the users.

As described herein, "linking a user account to a target object" or "creating a link between a user account to a target object" may refer to, for example, associating the user account with the target object in a database such that the system can query the database to retrieve all user accounts associated with a given target object and/or query the database to retrieve all target objects associated with a given user account. In some cases, other techniques for associating the user account and the target object may be used (e.g., using tags, identifiers, and the like).

Although referred to herein as the user matching system 101 and the user matching service 150, in some implementations such system and service may be referred to as a user linking system 101 and a user linking service 150.

The user matching system 101 is depicted in FIG. 1 as operating in a distributed computing environment including several computer systems that are interconnected using one or more computer networks. The user matching system 101 could also operate within a computing environment having a fewer or greater number of devices than are illustrated in FIG. 1. Thus, the depiction of the user matching system 101 in FIG. 1 should be taken as illustrative and not limiting to the present disclosure. For example, the user matching system 101 or various constituents thereof could implement various Web services components, hosted or "cloud" computing environments, and/or peer to peer network configurations to implement at least a portion of the processes described herein.

Further, the user matching system 101 may be implemented in hardware and/or software and may, for instance, include one or more physical or virtual servers implemented on physical computer hardware configured to execute computer executable instructions for implementing the various features described herein. The one or more servers may be geographically dispersed or geographically co-located, for instance, in one or more data centers.

As used herein, the term "target object," in addition to having its ordinary meaning, is used interchangeably to refer to a target object itself (e.g., a physical house that the user has photographed and requested to be linked to on his or her mobile device, or the like) and/or to its representation in a computer system (e.g., data object, data entry, data identifier, or the like associated with the physical house and stored on the user computing devices 102 and/or the user matching system 101). As will be apparent from the context in which it is used, the term "target object" is also sometimes used herein to refer only to the target object itself or only to its representation in the computer system.

Moreover, the processing of the various components or services of the user matching system 101 can be distributed across multiple machines, networks, or other computing resources. The various components or services of the user matching system 101 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some implementations, the connections between the components or services shown represent possible paths of data flow, rather than actual connections between hardware. Executable code modules that implement various functionalities of the user matching system 101 can be stored in the memories of the servers 120 and/or on other types of non-transitory computer-readable storage media. While some examples of possible connections are shown, any subset of the components shown can communicate with any other subset of components in various implementations.

As shown in FIG. 1, in some cases, the network environment 100 may include an image analysis system 160 that may perform some or all of the image analysis described herein. In some of such cases, the user image analyzer 154 may communicate with the image analysis system 160 to perform some or all of the image analysis described herein. In other cases, the image analysis system 160 may be part of the user matching system 101 or may be omitted from the network environment 100.

Example Architecture of User Matching Service

Figure 2:
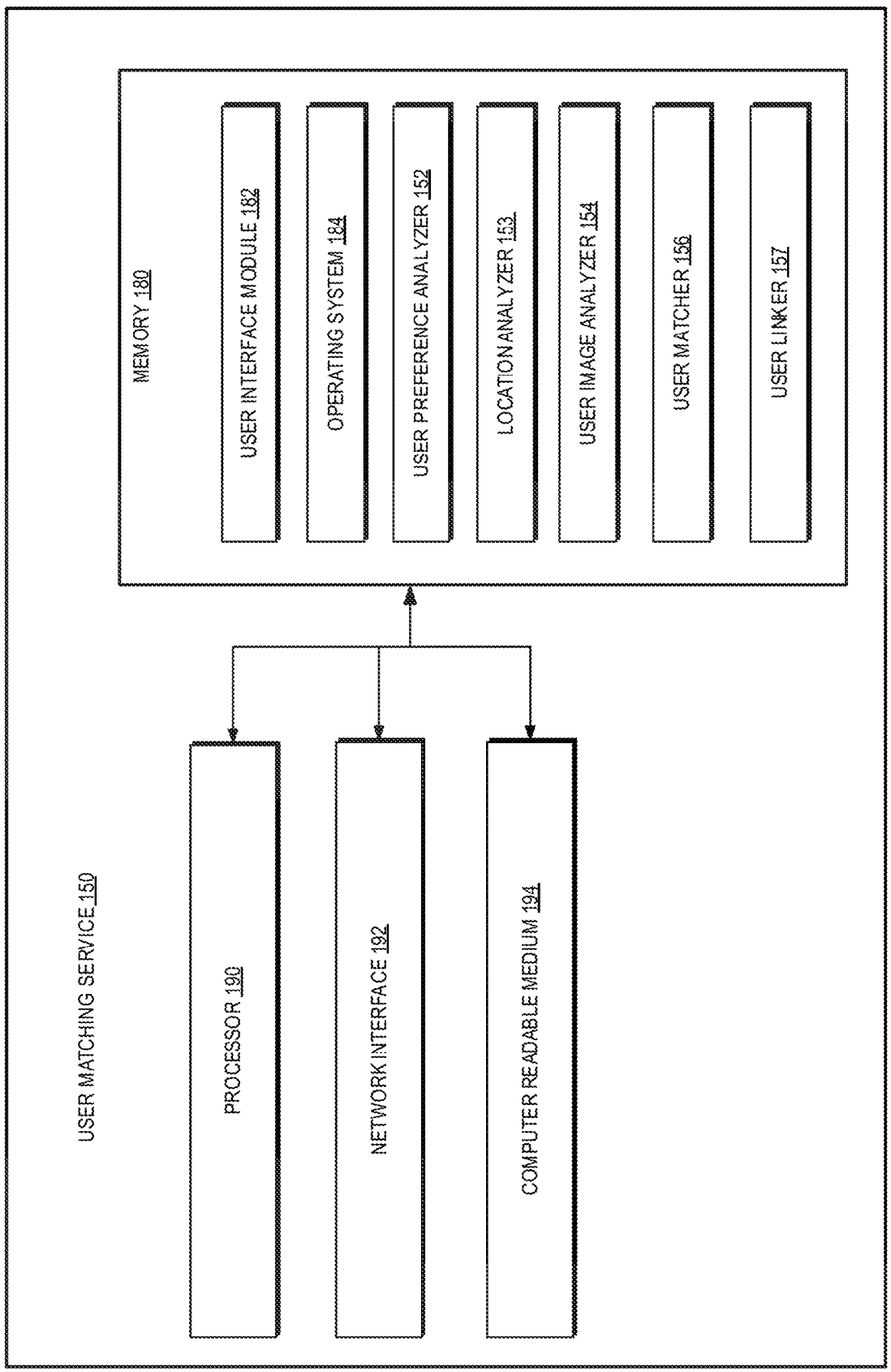
FIG. 2 depicts a general architecture of a computing device or system providing a user matching service for matching users based on preference profiles and user photographs and/or providing a user linking service for linking user accounts to target objects in accordance with aspects of the present disclosure.

FIG. 2 depicts an example architecture of a computing system (referenced as the user matching service 150) that can be used to perform one or more of the techniques described herein or illustrated in FIGS. 1-56. The general architecture of the user matching service 150 depicted in FIG. 2 includes an arrangement of computer hardware and software modules that may be used to implement one or more aspects of the present disclosure. The user matching service 150 may include many more (or fewer) elements than those shown in FIG. 2. It is not necessary, however, that all of these elements be shown in order to provide an enabling disclosure. As illustrated, the user matching service 150 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some implementations) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the user matching service 150. The memory 180 may further include computer program instructions and other information for implementing one or more aspects of the present disclosure. For example, in one implementation, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores (e.g., data repository 140 of FIG. 1).

In addition to and/or in combination with the user interface module 182, the memory 180 may include the user preference analyzer 152, the location analyzer 153, the user image analyzer 154, the user matcher 156, and the user linker 157 that may be executed by the processor 190. In one implementation, the user interface module 182, user preference analyzer 152, the location analyzer 153, user image analyzer 154, user matcher 156, and user linker 157 individually or collectively implement various aspects of the present disclosure, e.g., outputting training photographs for presentation to a first user, receiving indications of the first user's preferences for the training photographs, generating a preference profile for the first user (e.g., based on tags or attributes associated with the training photographs), receiving a user photograph from a second user, determining the location associated with the user photograph, determining that the location is proximate to a home registered as being owned by the second user, determining tags or attributes associated with the user photograph, generating a profile for the second user and/or the second user's home, determining a match between the first user and the second user based on a comparison of their preference profiles (or a match between the first user and the second user's home), providing a user interface for submitting a link request to link a user account to a target object along with a photograph of the target object, processing the link request, processing and analyzing the user-submitted photograph, analyzing and comparing the location of the user's mobile device or photograph and the location of the target object, creating a link between the user account and the target object, generating and transmitting notifications to one or more users based on the link, and/or other aspects discussed herein or illustrated in FIGS. 1-56.

While the user preference analyzer 152, location analyzer 153, user image analyzer 154, user matcher 156, and user linker 157 are shown in FIG. 2 as part of the user matching service 150, in other implementations, all or a portion of the user preference analyzer 152, location analyzer 153, user image analyzer 154, user matcher 156, and/or user linker 157 may be implemented by other components of the user matching system 101 and/or another computing device. For example, in certain implementations of the present disclosure, another computing device in communication with the user matching system 101 may include several modules or components that operate similarly to the modules and components illustrated as part of the user matching service 150. It will also be appreciated that, in some implementations, a user computing device may implement functionality that is otherwise described herein as being implemented by the elements and/or modules of the user matching service 150. For example, the user computing device 102 may receive code modules or other instructions from the user matching service 150 and/or other components of the user matching system 101 via the network 104 that are executed by the user computing device 102 to implement various aspects of the present disclosure.

Data Parsing and Matching Method

Figure 3:
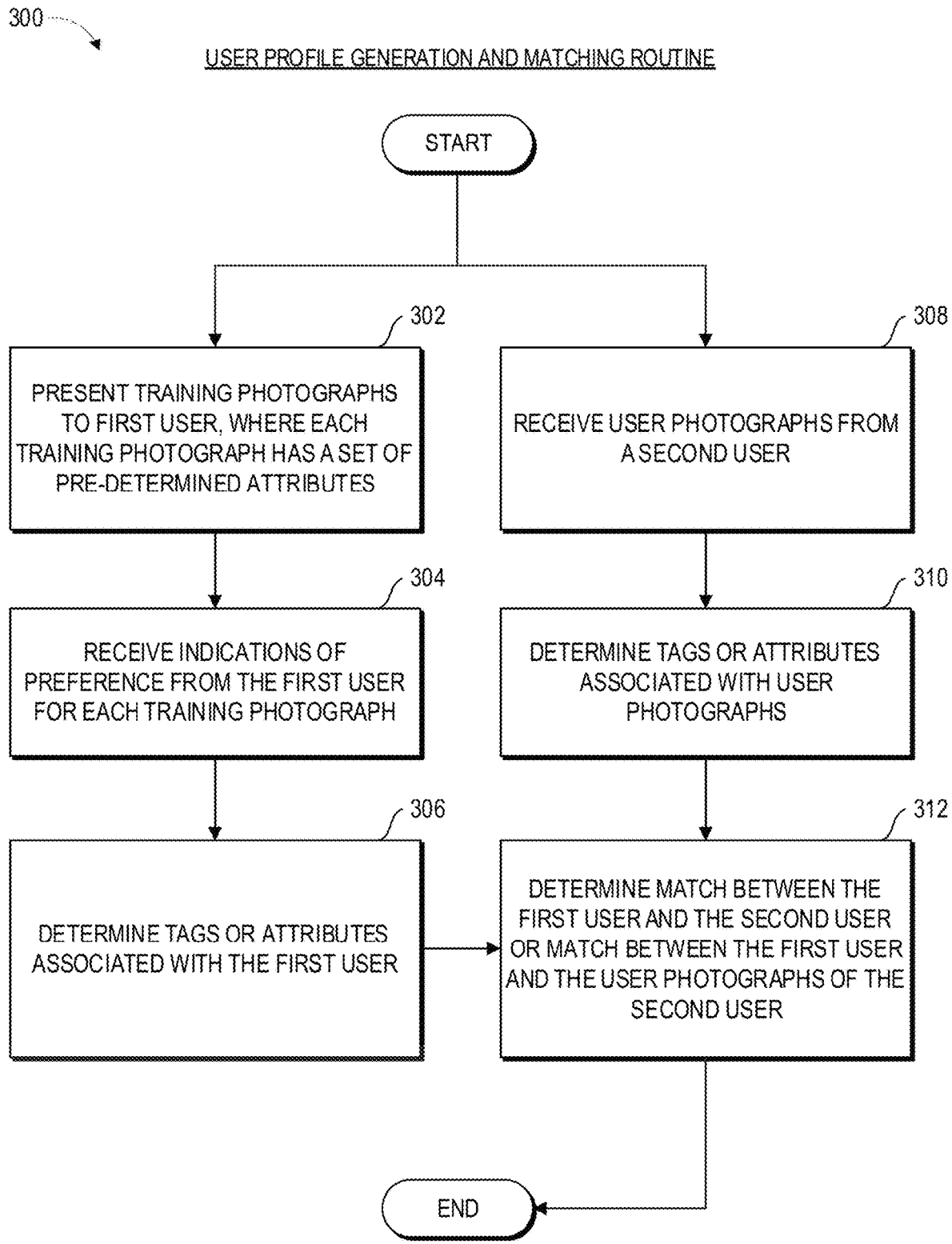
FIG. 3 is a flow diagram illustrating an example routine for matching users based on preference profiles and user photographs in accordance with aspects of the present disclosure.
Figure 4:
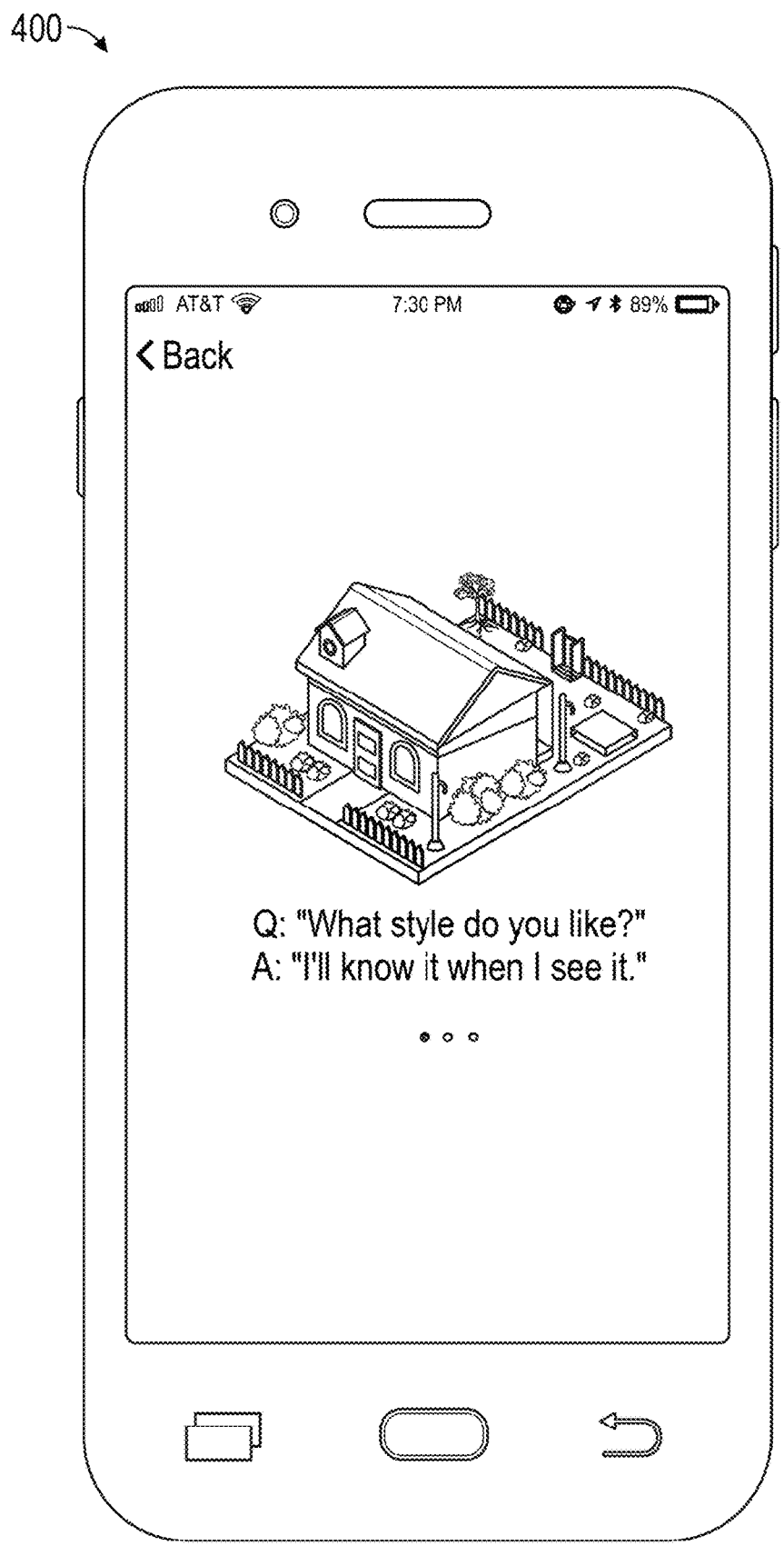
FIGS. 4-35 are example user interfaces used for generating preference profiles based on image analysis and user feedback and matching users based on the preference profiles and user photographs in accordance with aspects of the present disclosure.
Figure 5:
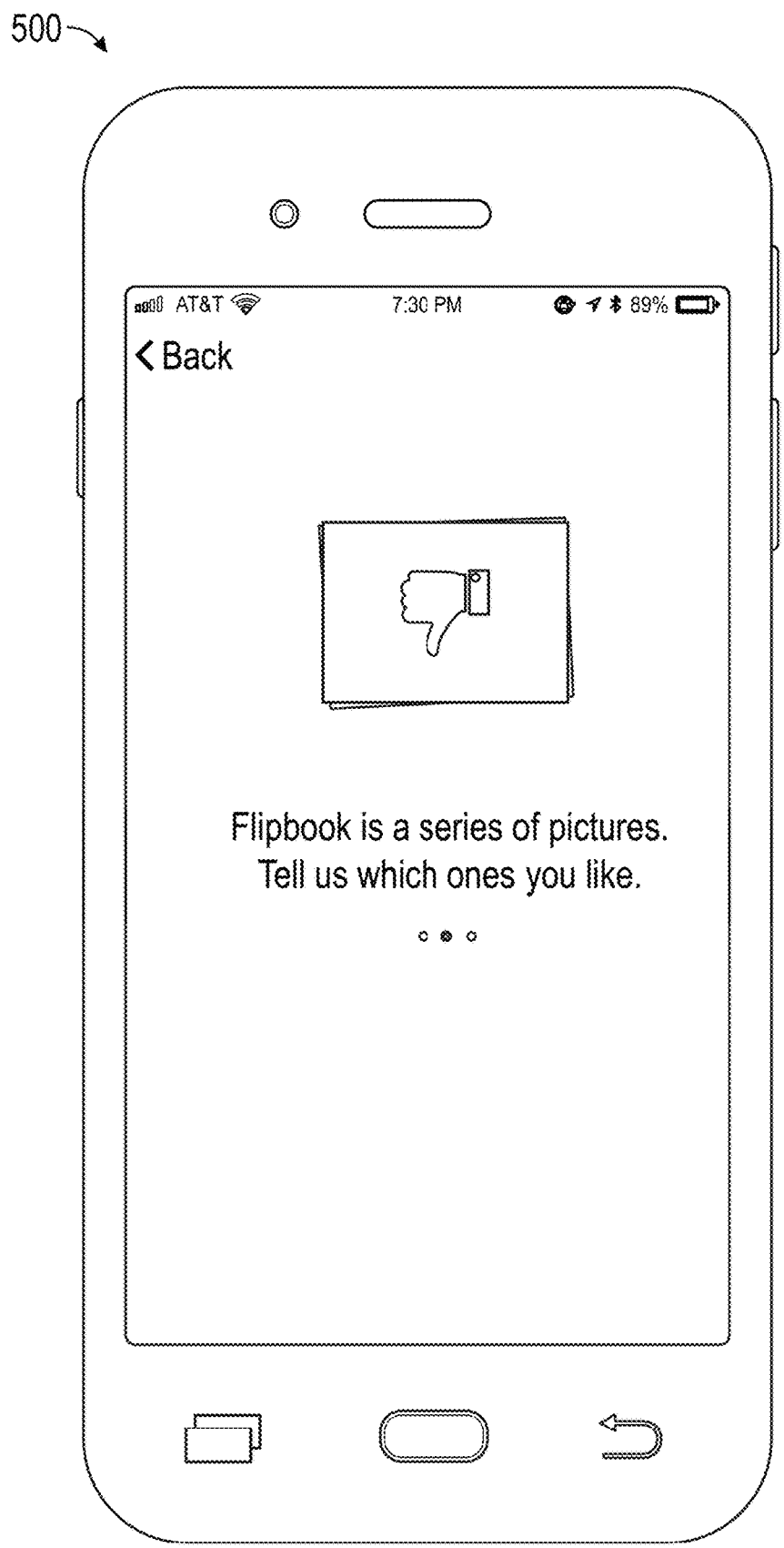
Figure 6:
Figure 7:
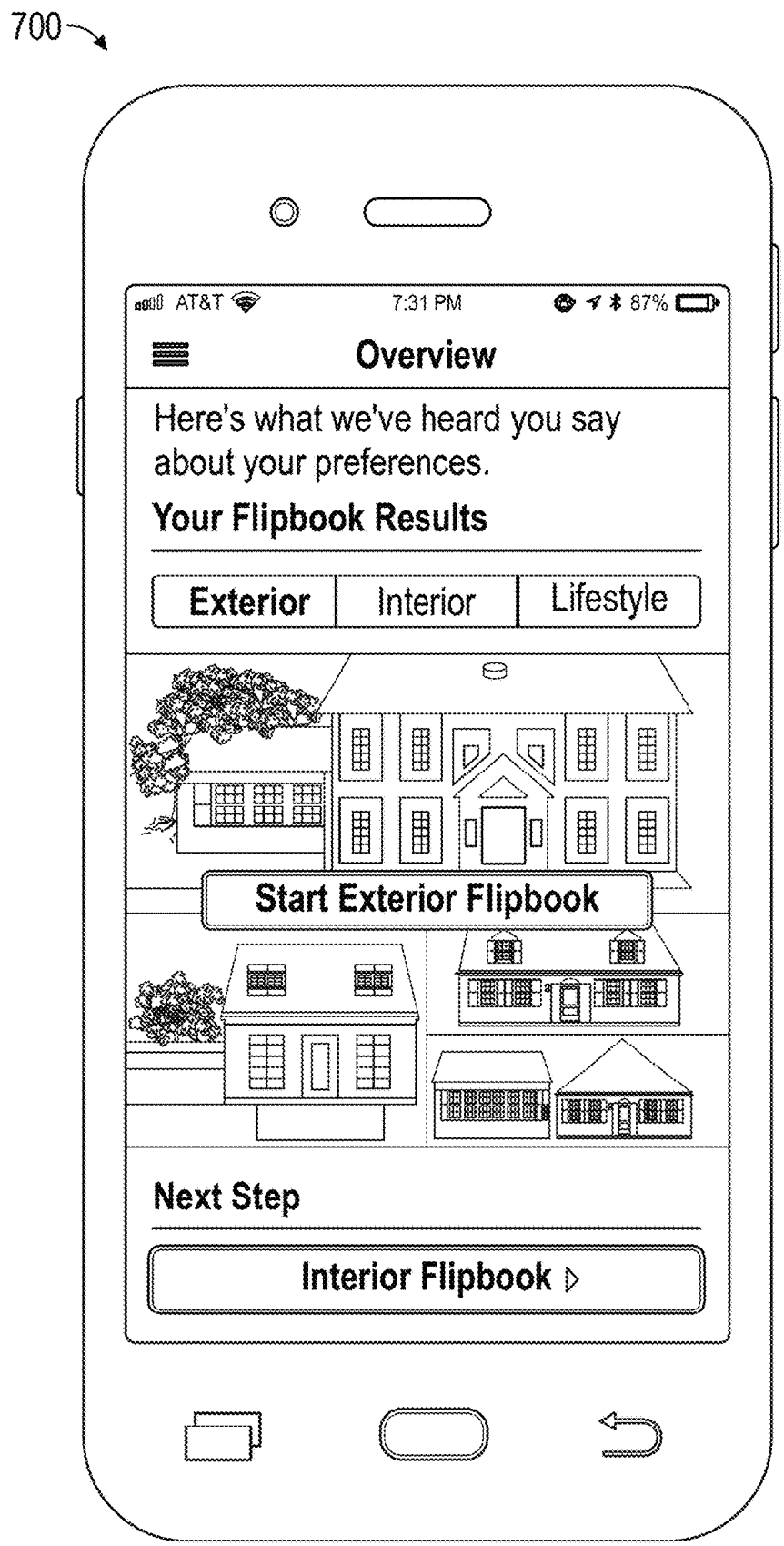
Figure 8:
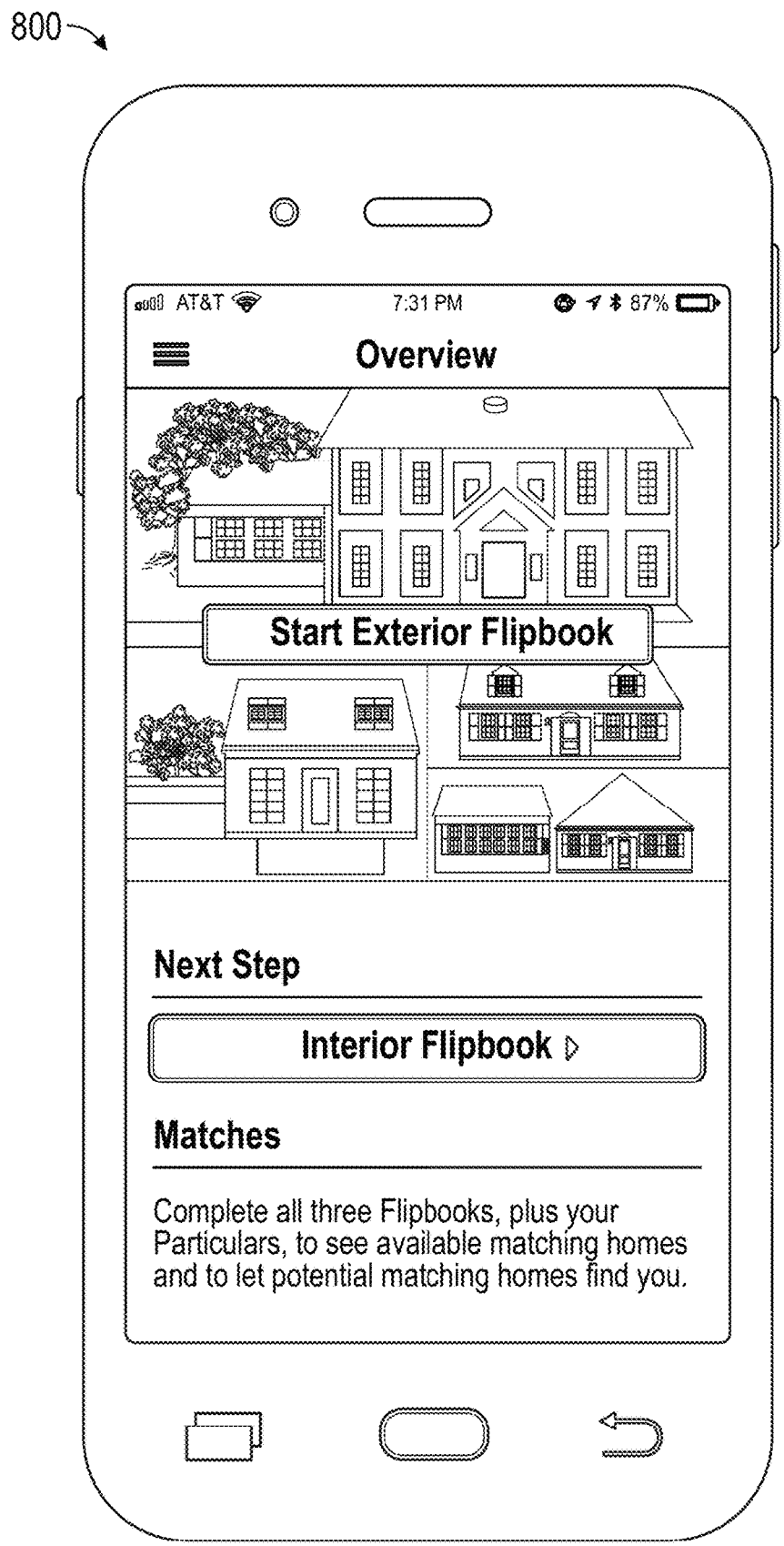

FIG. 3 is a flow diagram of an illustrative method 300 implemented at least in part by the user matching service 150 for matching users based on preference profiles including attributes and/or tags. Although any number of systems, in whole or in part, can implement the method 300, to simplify discussion, the method 300 will be described as being performed by the user matching service 150. The system may use the buyer user's preference indications or scores on the training photographs to extract the user's preference for the attributes corresponding to the training photographs (e.g., that the user prefers attribute A based on the user's indication of like for photograph X associated with attribute A, that the user does not prefer attribute B based on the user's indication of dislike for photograph Y associated with attribute B, that the user prefers attribute C 60% based on the user's slider bar score for photograph Z associated with attribute C, etc.), and then compare the user's preference for those attributes to the attributes extracted from the sellers' photographs. Further, the system may receive user photographs of sellers' homes and extract attributes from the user photographs. For example, a seller may use her smartphone to capture a photograph of her home from her front yard, transmit the photograph to a remote server for image analysis (or have one or more processors on her smartphone perform the image analysis, for example, via the mobile application installed on her smartphone), and find out the attributes associated with her home and/or potential buyers who might be interested in purchasing her home. Based on a comparison of the attributes of the buyer users to the attributes of the homes of the seller users, the system can identify the best matching sellers/homes for each buyer, and the best matching buyers for each seller/home.

At block 302, the user matching service 150 presents training photographs to a first user, where each training photograph has a set of pre-determined attributes. The training photographs may be associated with different combinations of attributes. For example, one photograph may be associated with a combination of attributes such as wooden façade, Colonial style, and multi-story home, and another photo may be associated with a combination of attributes such as front yard, Traditional Ranch style, and single-story home.

At block 304, the user matching service 150 receives indications of preference from the first user for each of the presented training photographs. For example, the user matching service 150 may allow the first user to perform (e.g., on the first user's smartphone) an action (e.g., swipe the photograph left or activate a digital button displayed on a touchscreen) to indicate that he or she dislikes a photograph, or perform another action (e.g., swipe the photograph right or activate another digital button displayed on the touchscreen) to indicate that he or she likes the photograph. Alternatively, the user matching service 150 may allow the first user to indicate of degree of preference for the photograph using a slider bar (e.g., by dragging the slider bar in one direction or another).

At block 306, the user matching service 150 determines tags or attributes associated with the first user. The user computing device 102 may use the first user's preference indications or scores on the training photographs to extract information about the first user's preference for the attributes corresponding to the training photographs (e.g., that the user prefers attribute A based on the user's indication of like for photograph X associated with attribute A, that the user does not prefer attribute B based on the user's indication of dislike for photograph Y associated with attribute B, that the user prefers attribute C 60% based on the user's slider bar score for photograph Z associated with attribute C, etc.), and use the extracted information to build a preference profile for the first user. For example, the user matching service 150 may determine, based on the user's positive indication on 92% of the training photographs of Contemporary-style homes, that the first user has a 92% preference rating for Contemporary-style homes, and based on the user's positive indication on 75% of the training photographs of Colonial-style homes, that the first user has a 75% preference rating for Colonial-style homes.

At block 308, the user matching service 150 receives one or more user photographs from a second user. For example, a seller user may stand in his front yard, open the mobile application (also referred to herein as user application) associated with the user matching system 101 on his smartphone, and capture a photograph of his home, and the mobile application may transmit the photograph to the user matching system 101 for image analysis.

At block 310, the user matching service 150 determines tags or attributes associated with the one or more user photographs received from the second user. For example, the user matching service 150 may analyze a user photograph depicting a homeowner's home and determine the attributes of the home such as style, size, color, roofing, gardening, etc. One or more attributes may be associated with a weight value or a modifier (e.g., 80% Georgian style, average size, lighter in color, etc.).

At block 312, the user matching service 150 determines a match between the first user and the second user, or a match between the first user and the one or more user photographs of the second user. For example, the user matching service 150 may determine a match percentage between the attributes of the second user's home determined using the user photograph received from the second user and the attributes assigned to the first user based on the preference indications of the first user on the training photographs.

In some implementations, one or more blocks may be added to the method 300. For example, although not illustrated in FIG. 3, In some implementations, one or more of the blocks shown in FIG. 3 may be omitted or modified. For example, one or more tasks described herein as being performed by a remote server may instead be performed by the user computing device. Alternatively, one or more tasks described herein as being performed by the user computing device may instead be performed by a remote server.

User Interface Screenshots

Figure 9:
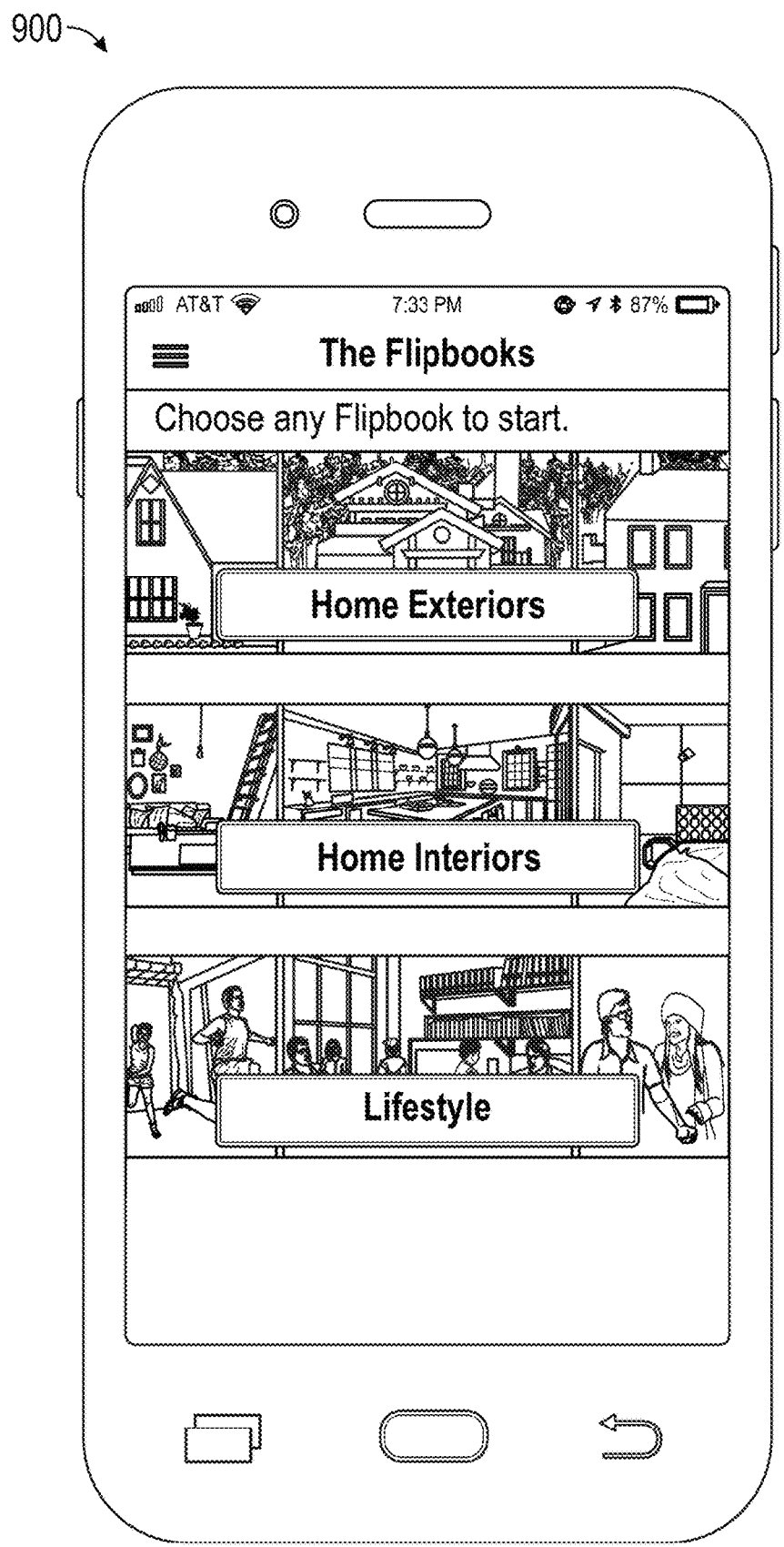
Figure 10:
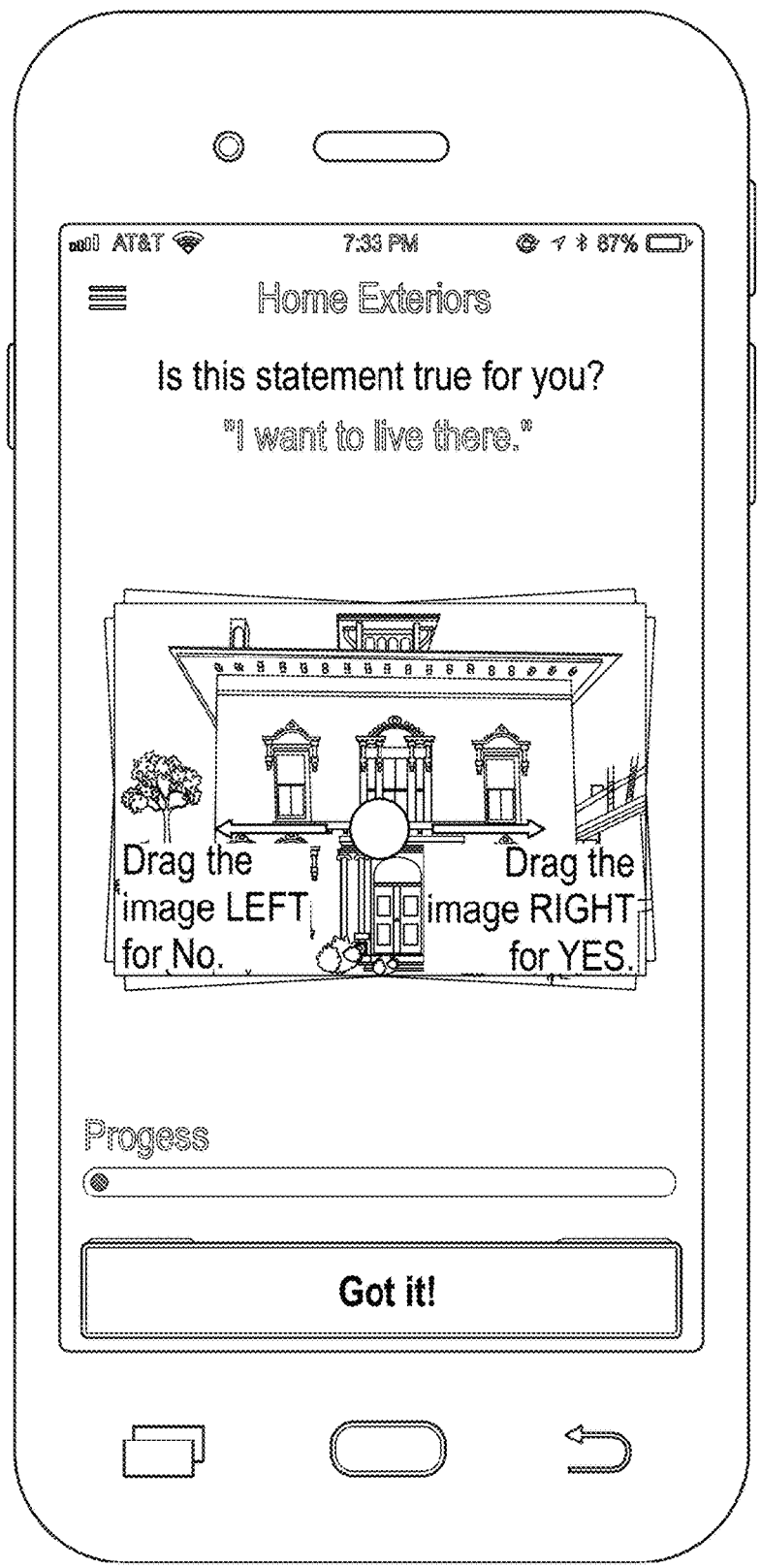
Figure 11:
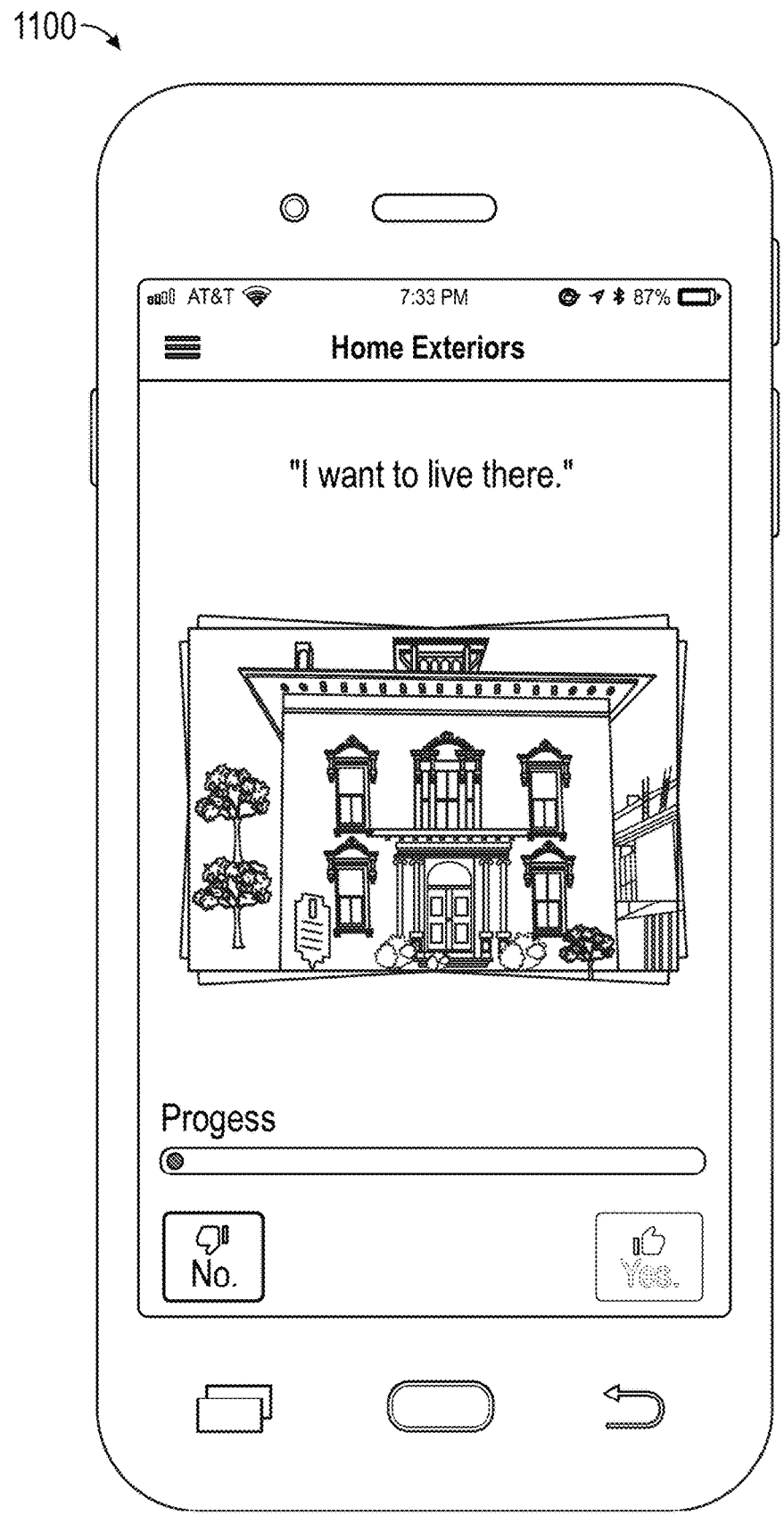
Figure 12:
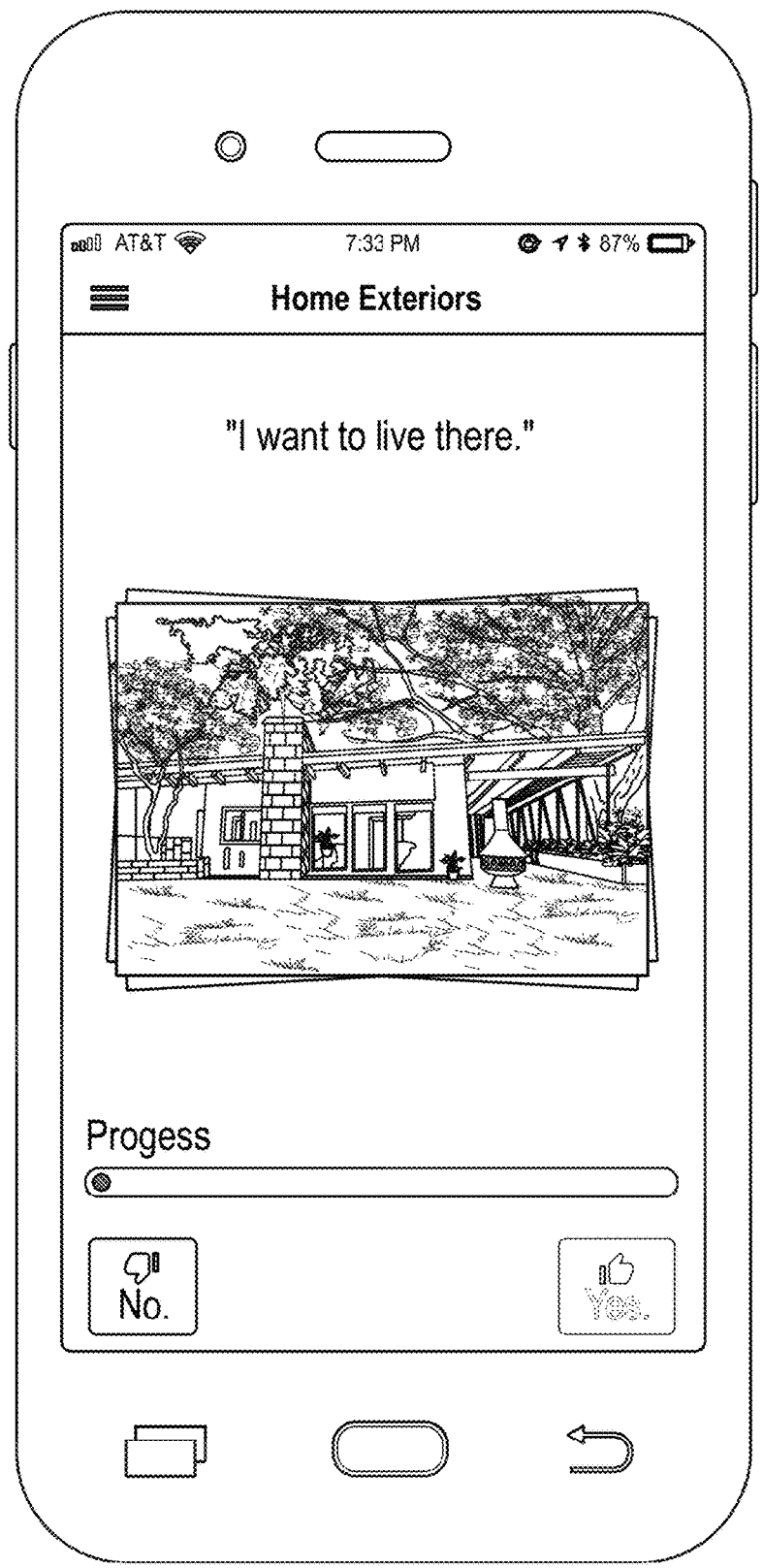
Figure 13:
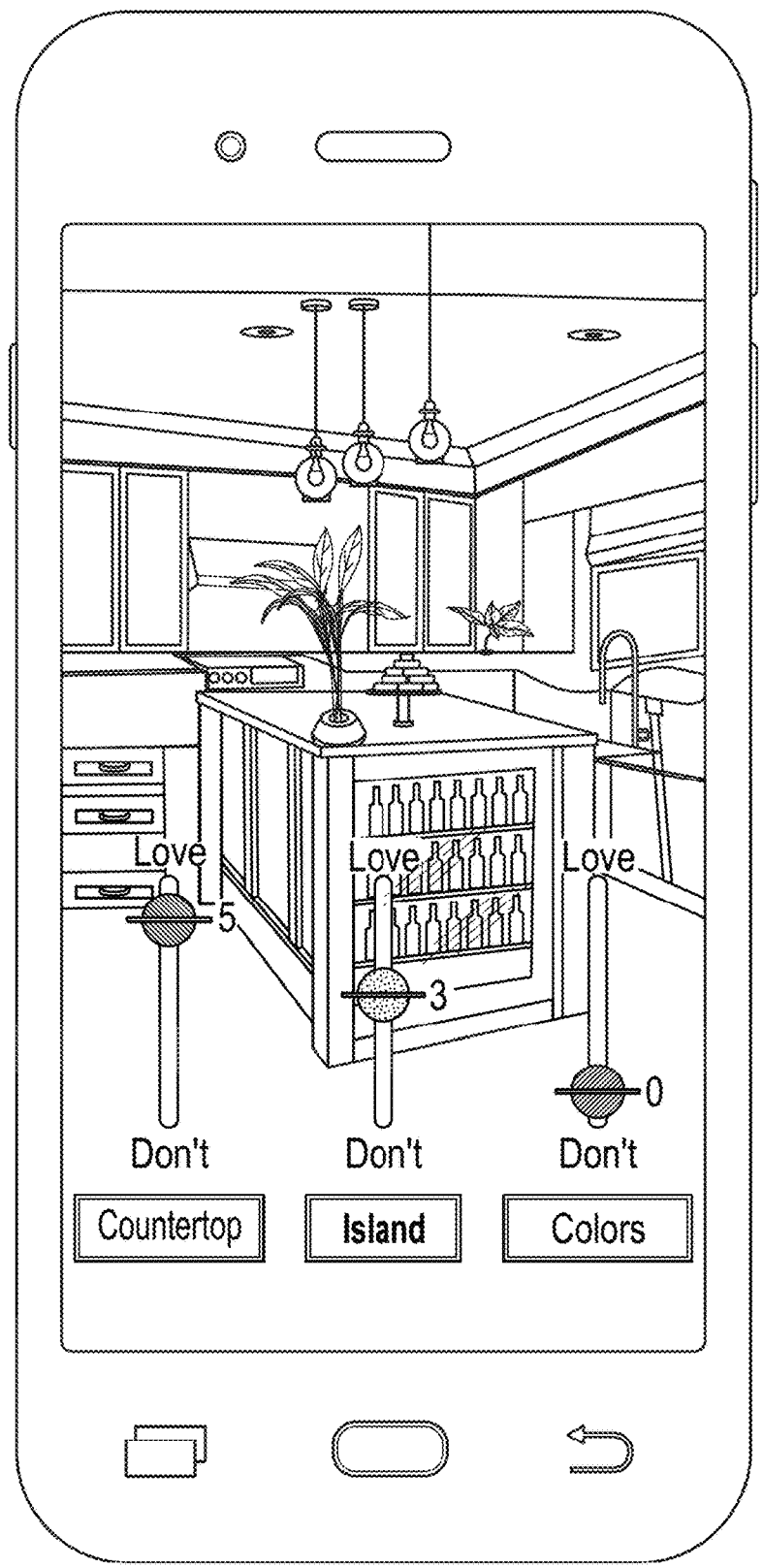
Figure 14:
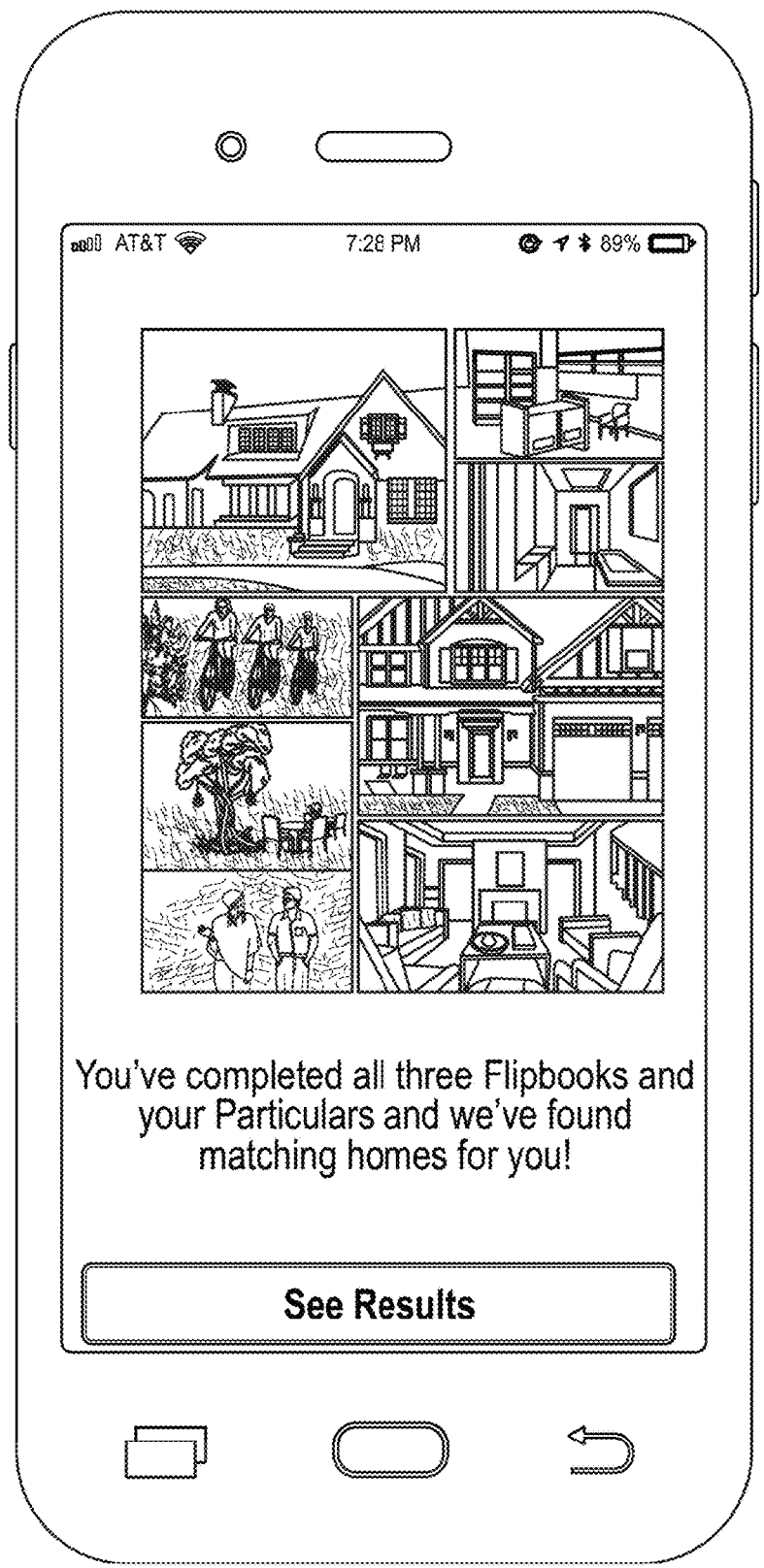
Figure 15:
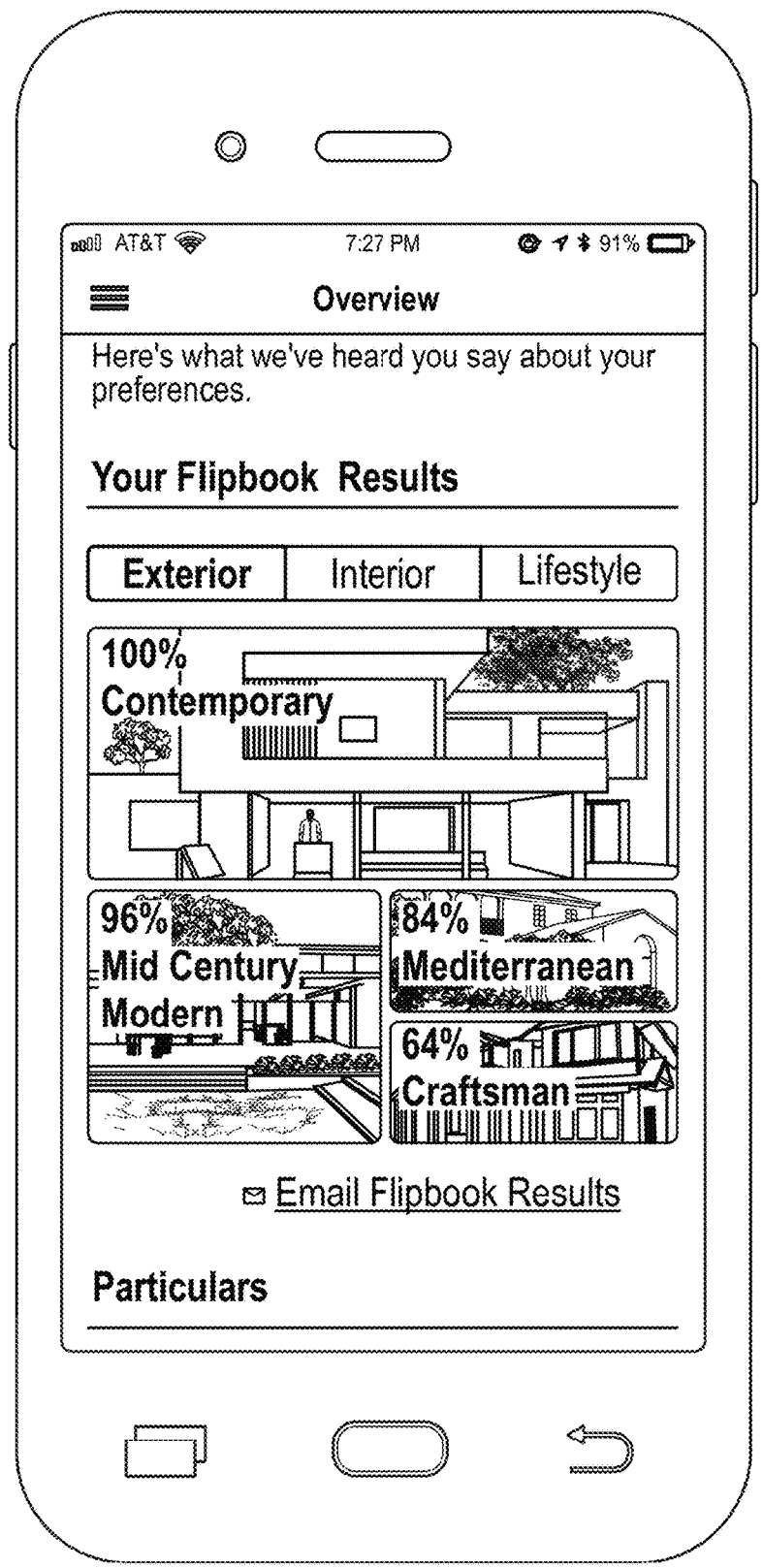
Figure 16:
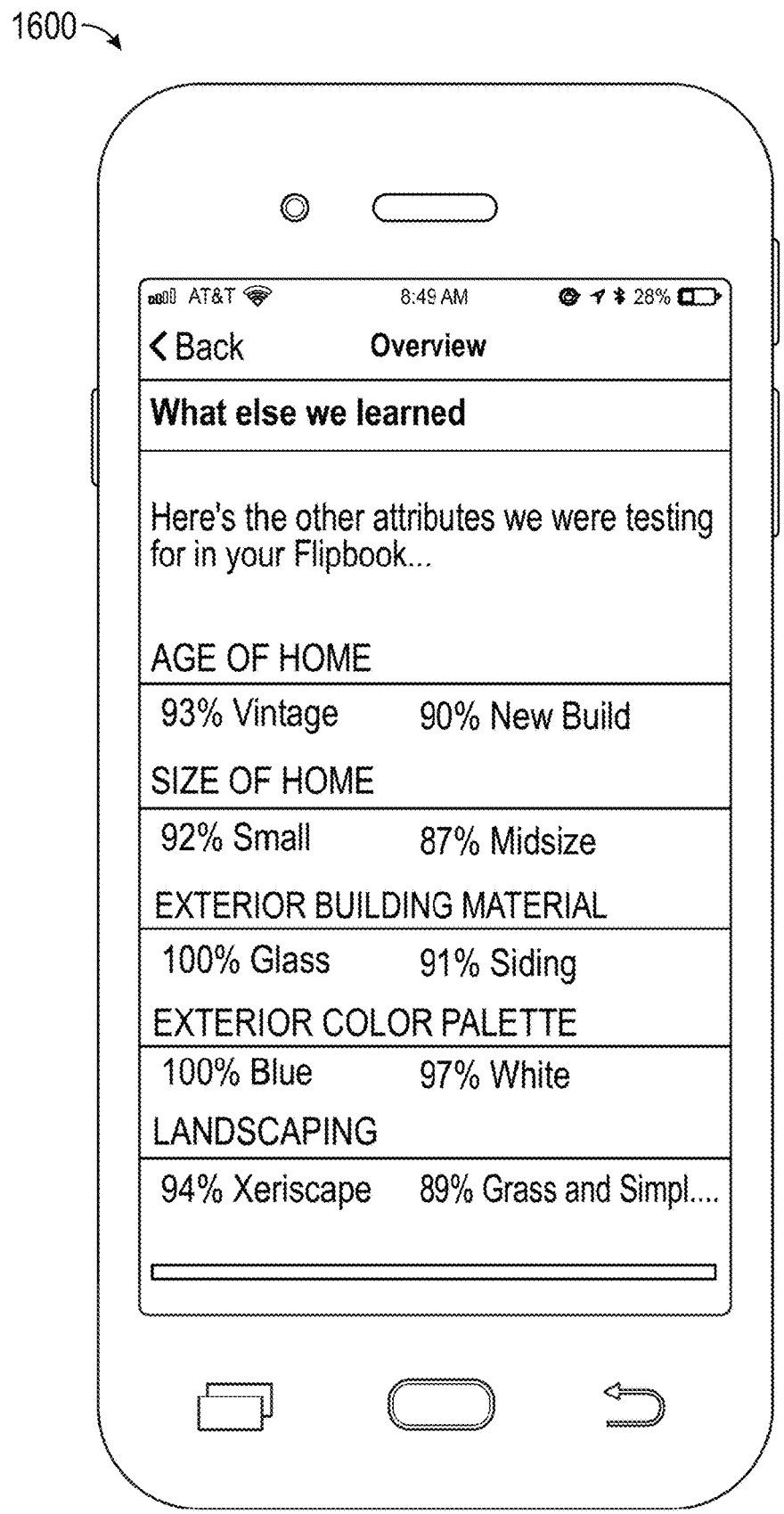
Figure 17:
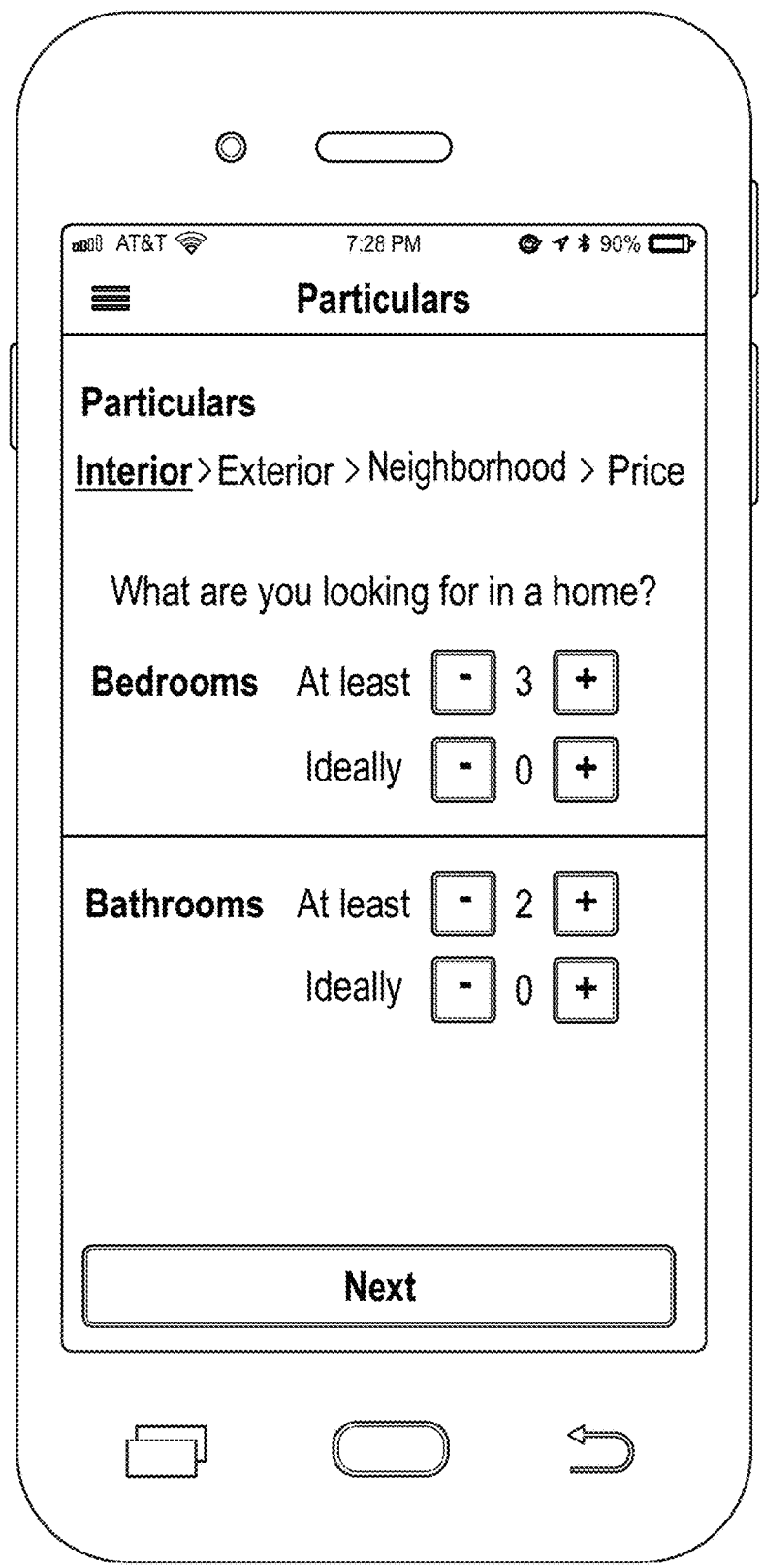
Figure 18:
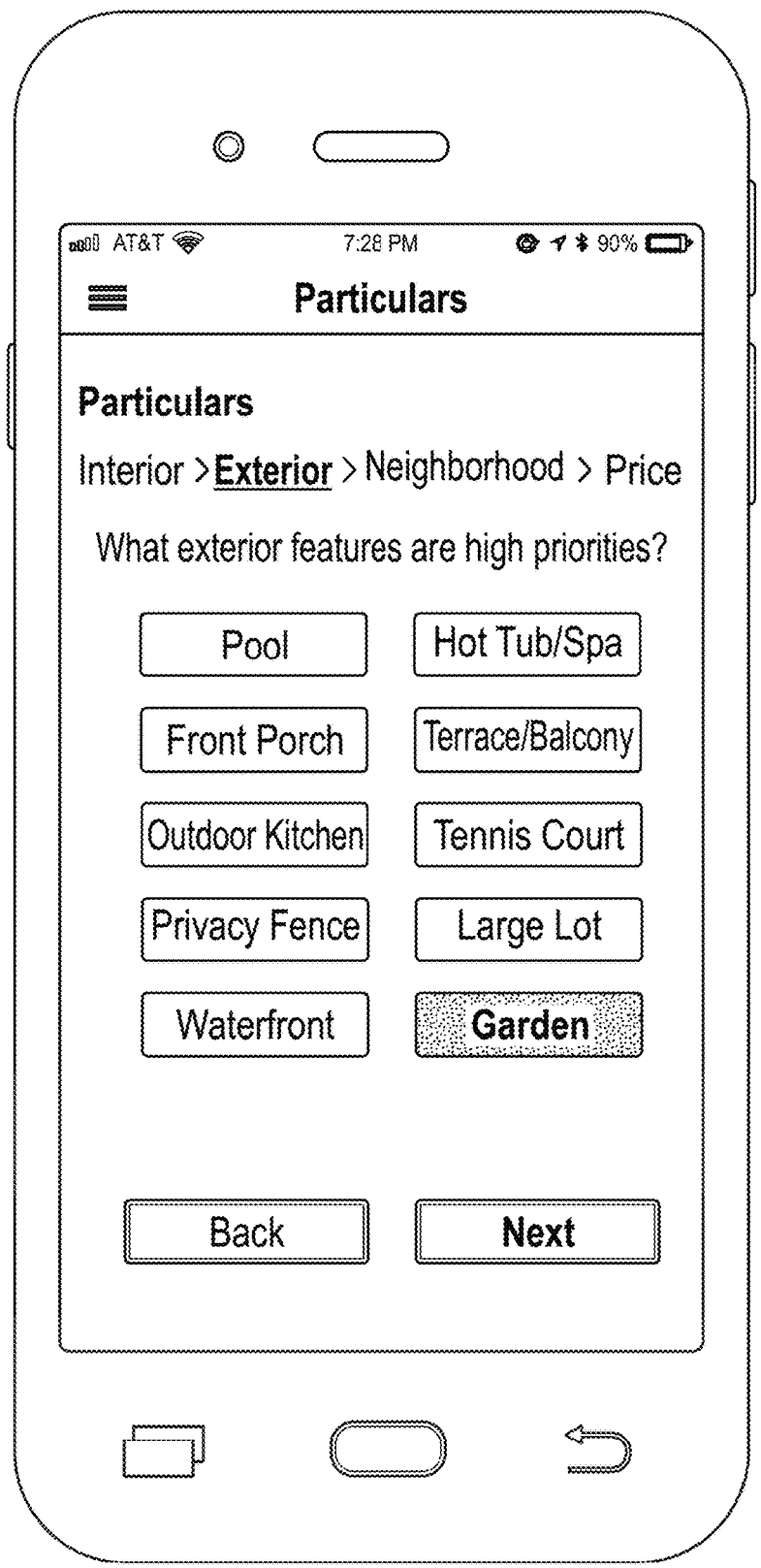
Figure 19:
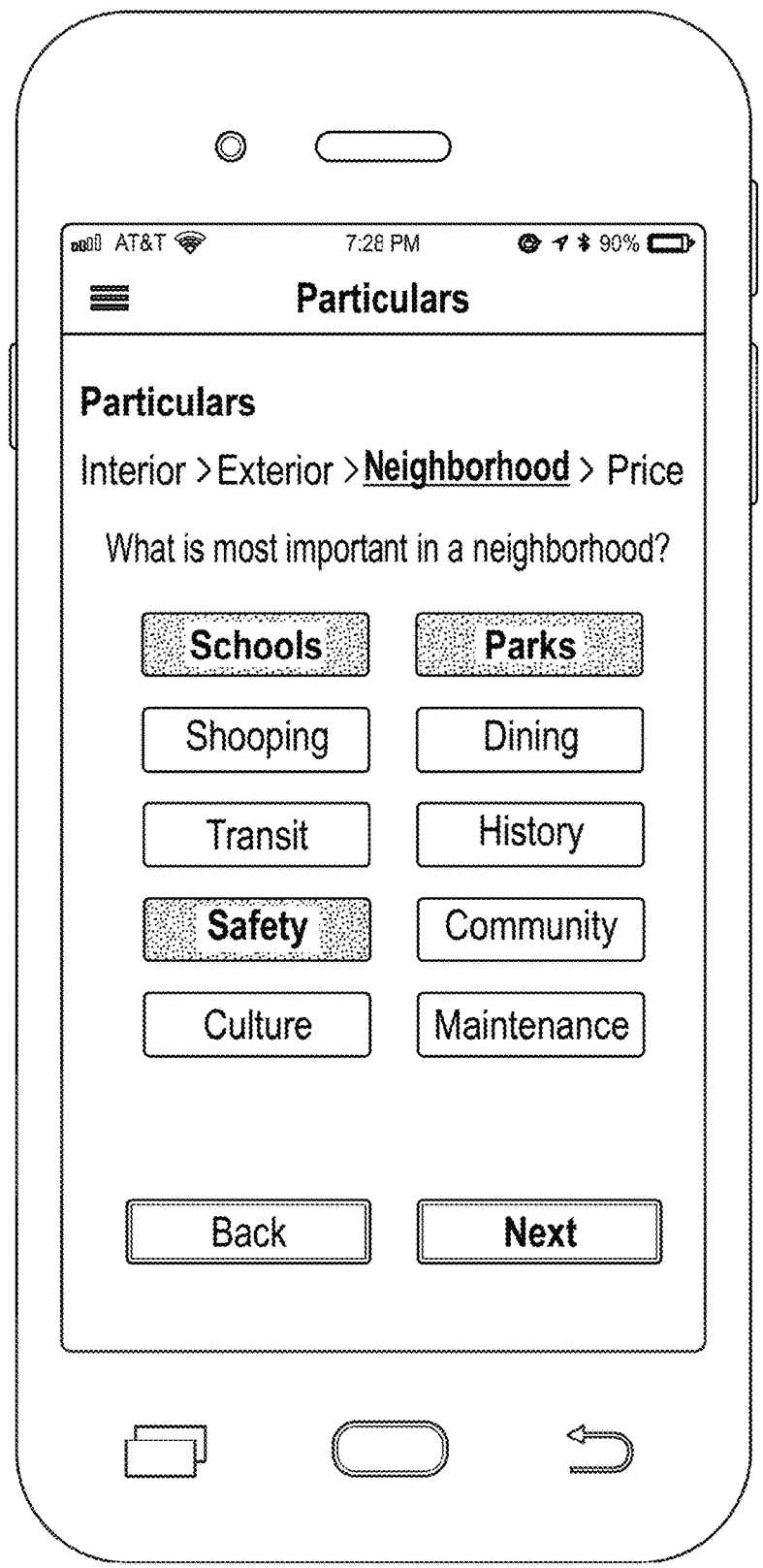
Figure 20:
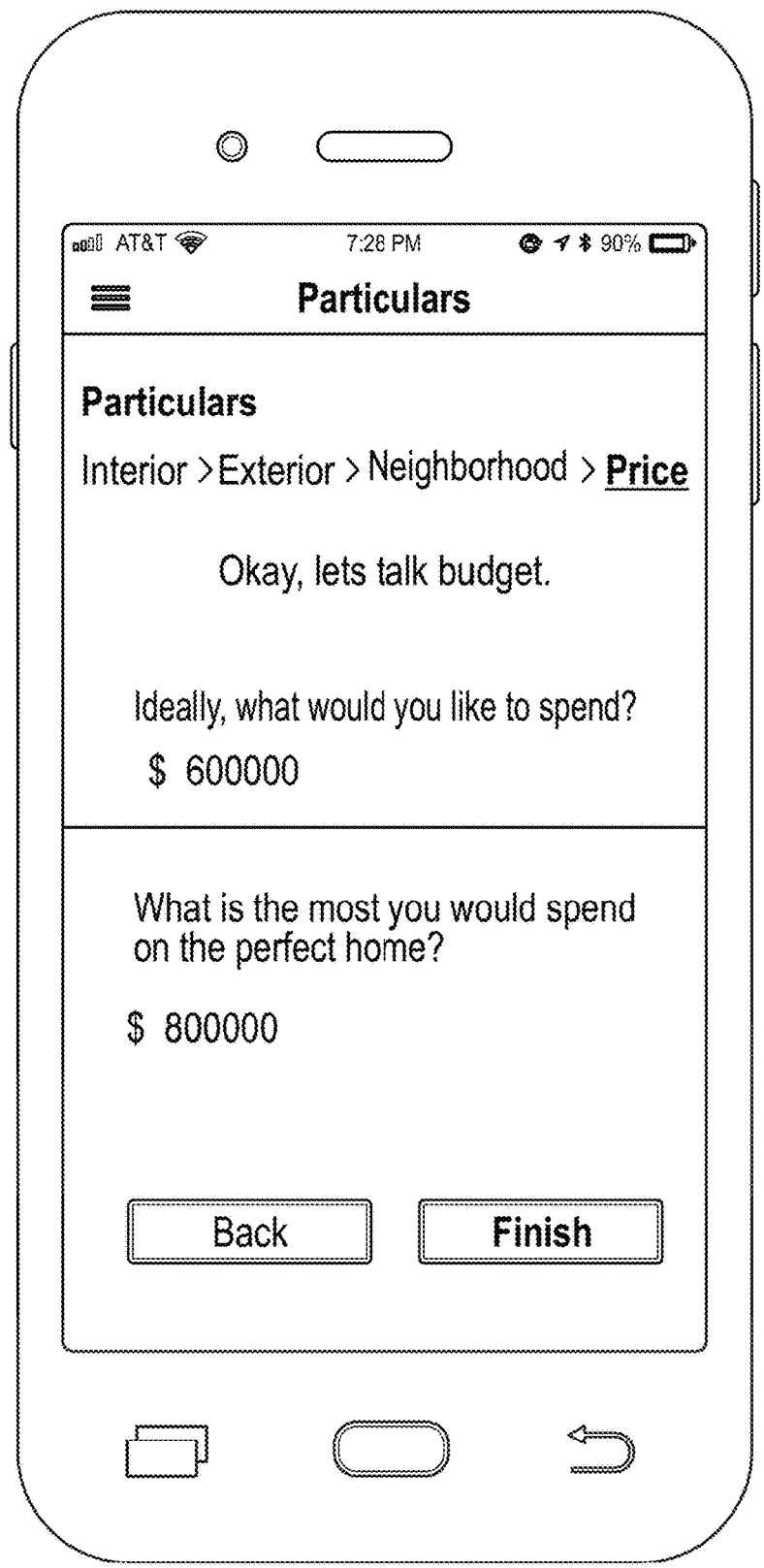
Figure 21:
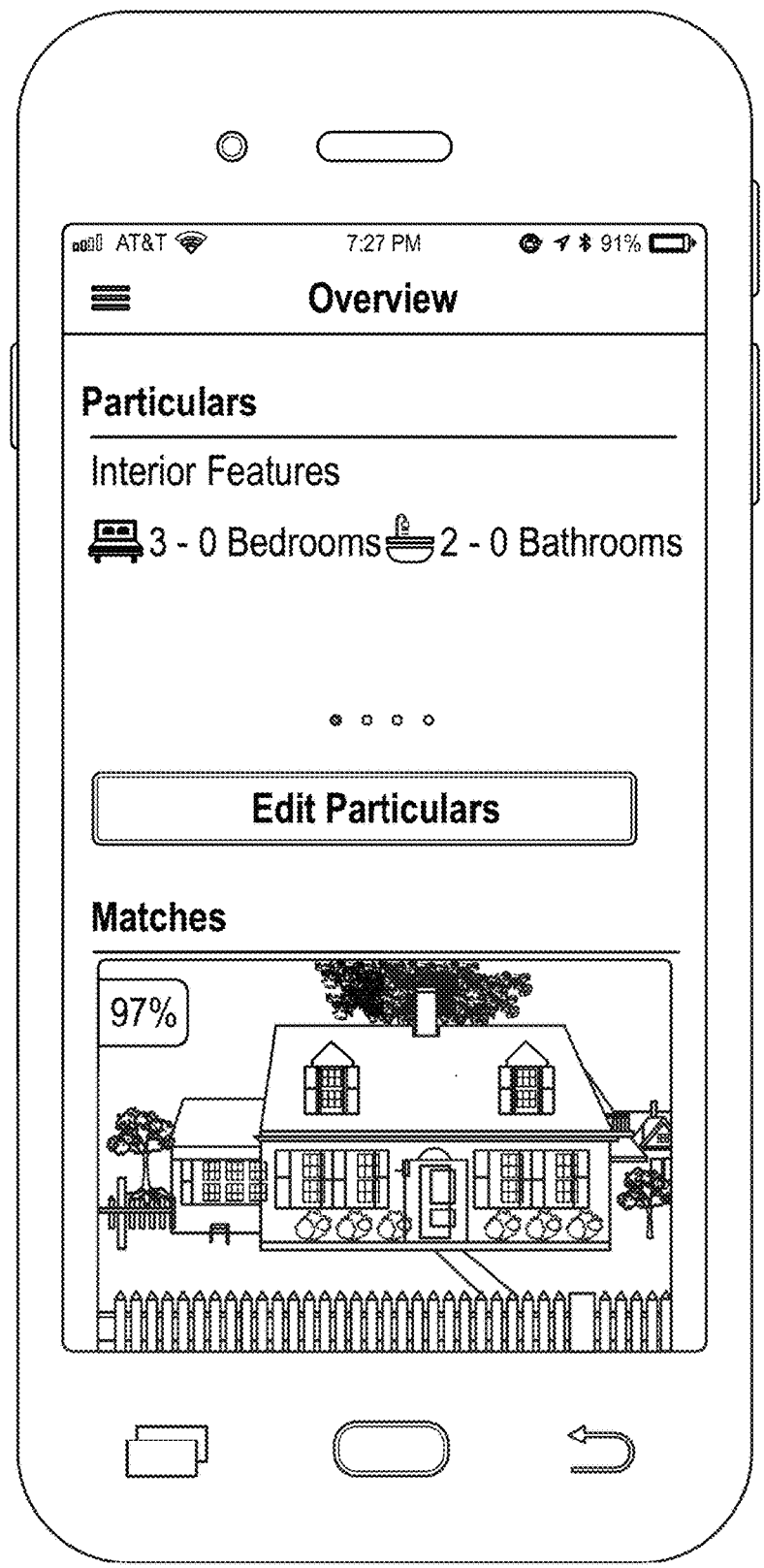
Figure 22:
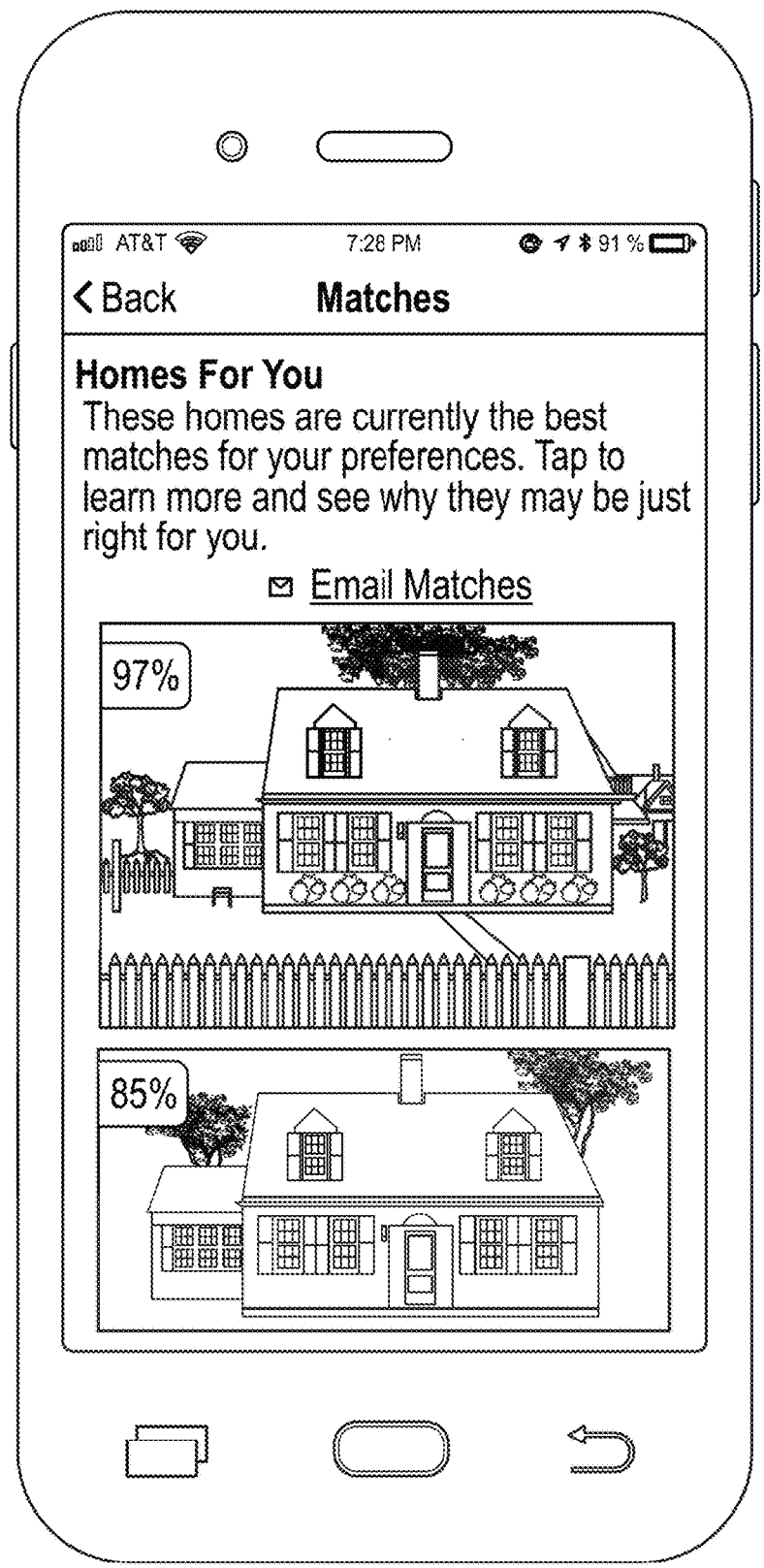
Figure 23:
Figure 24:
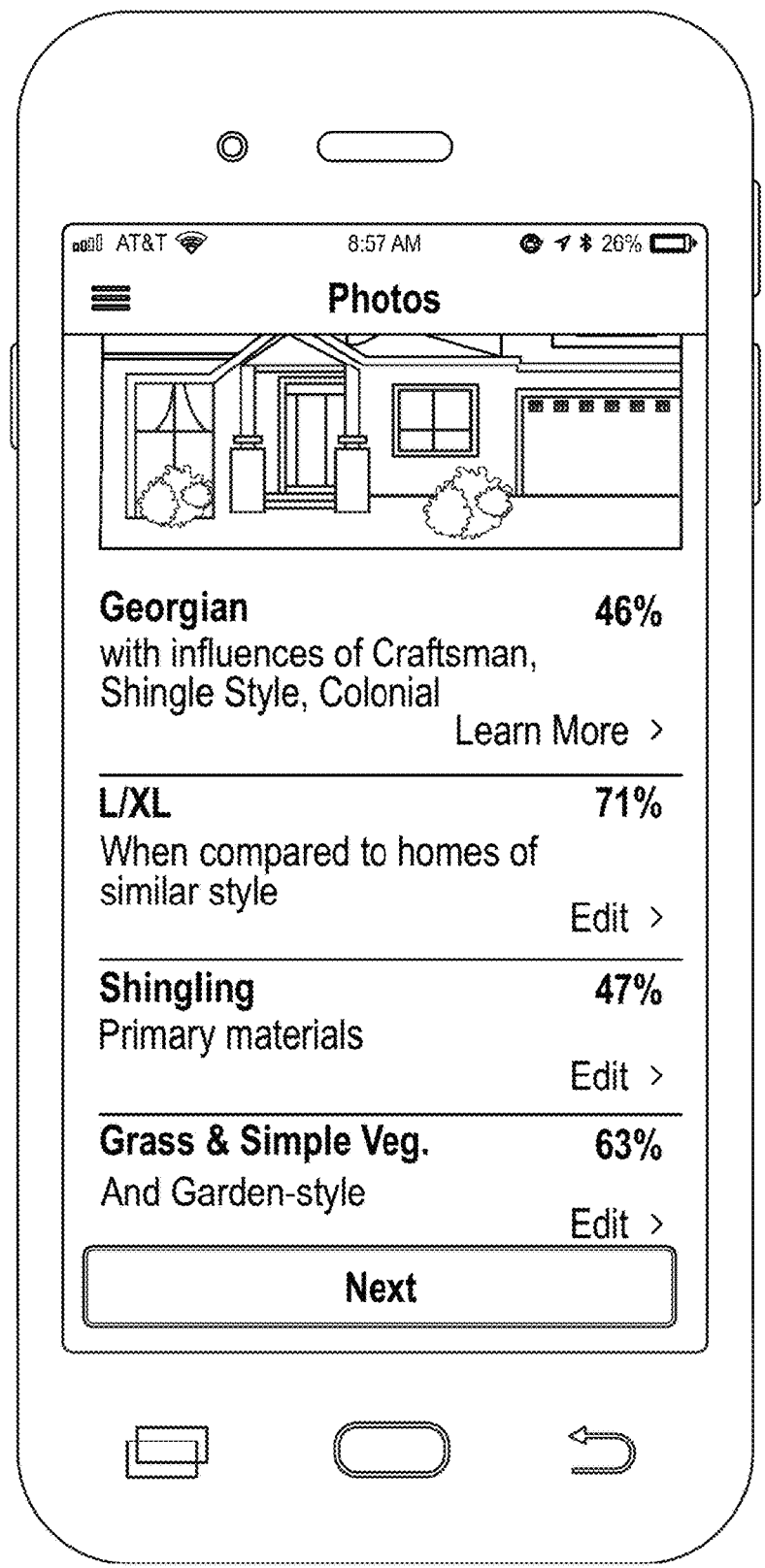
Figure 25:
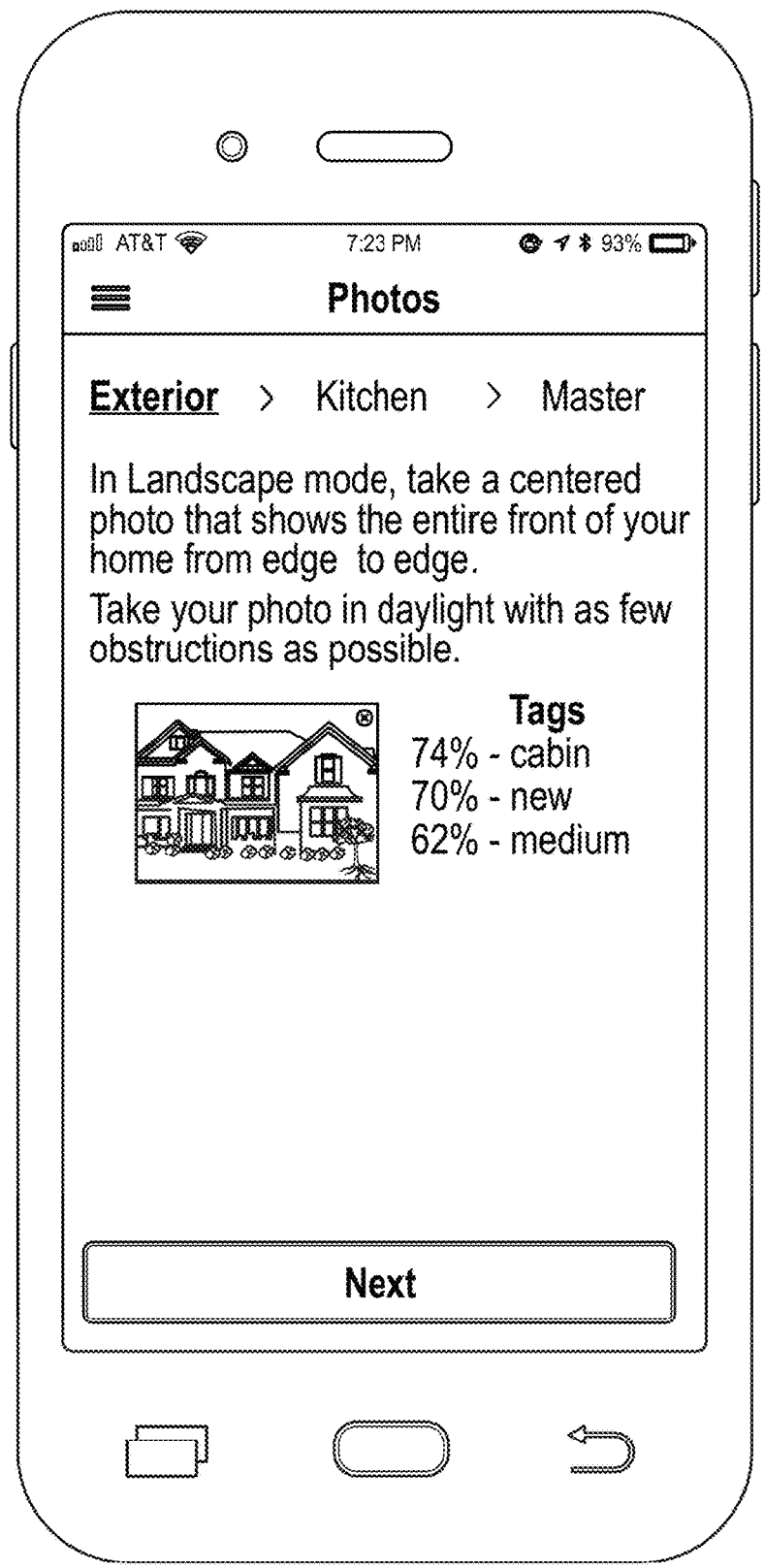
Figure 26:
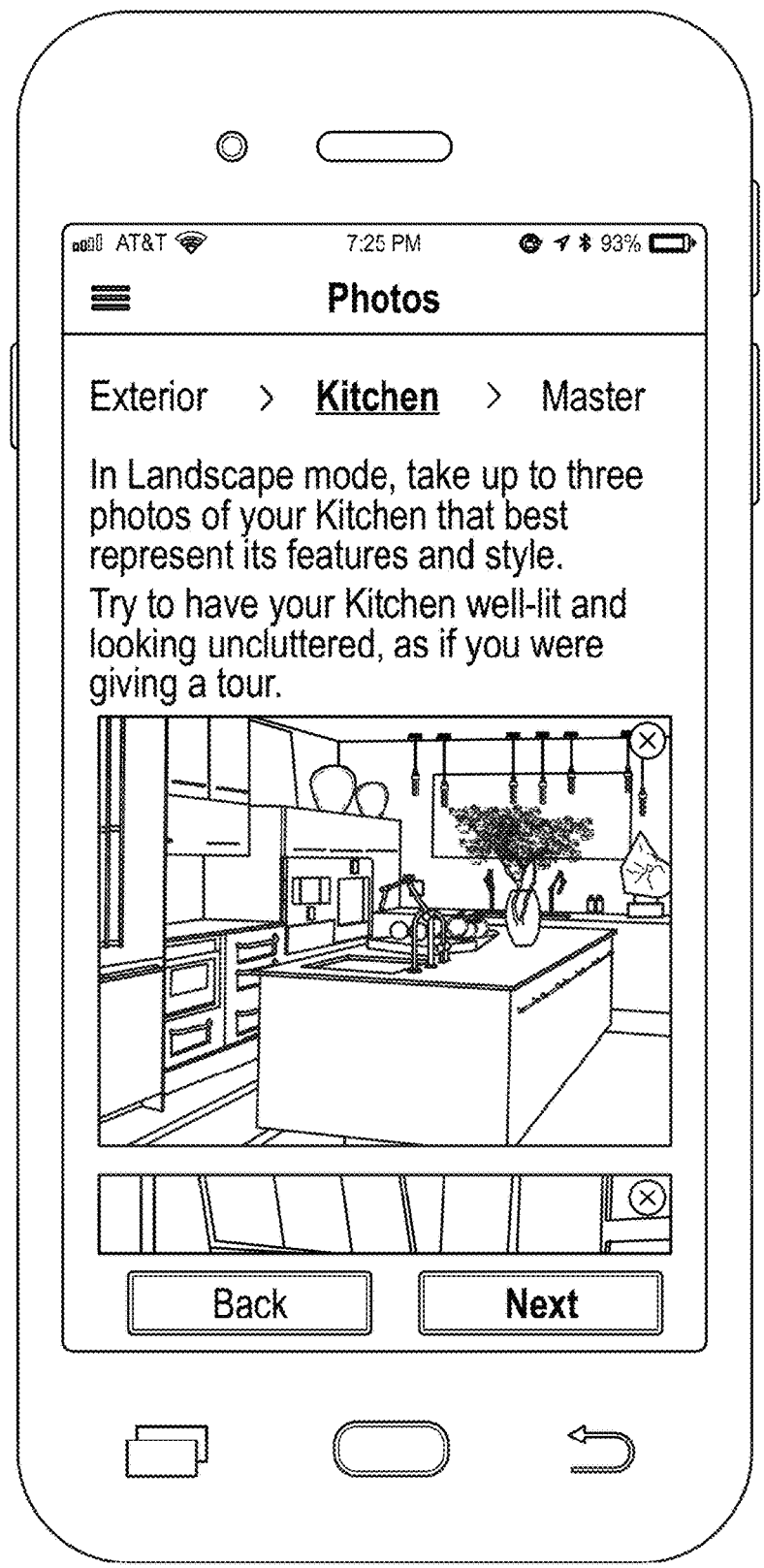
Figure 27:
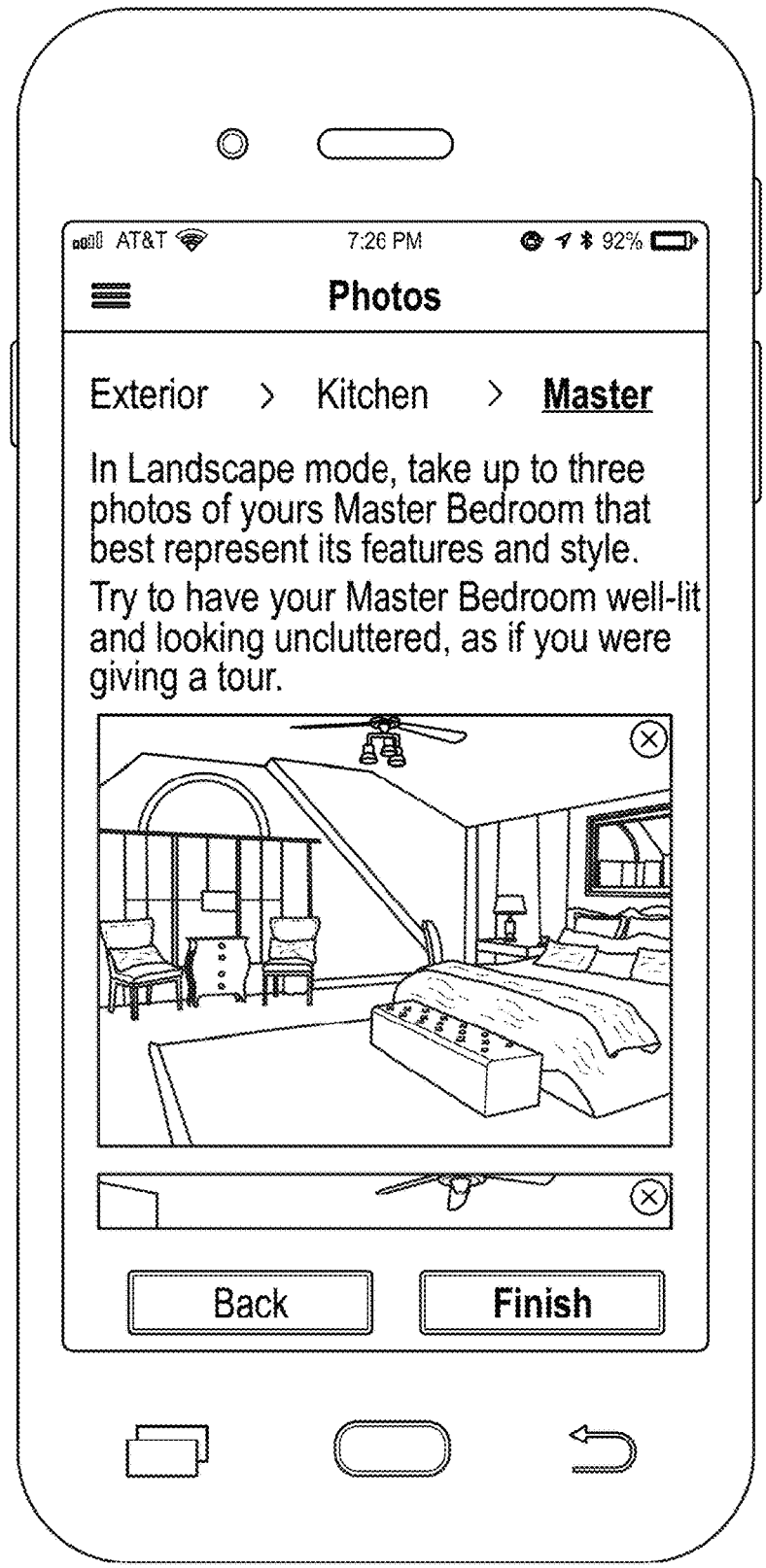
Figure 28:
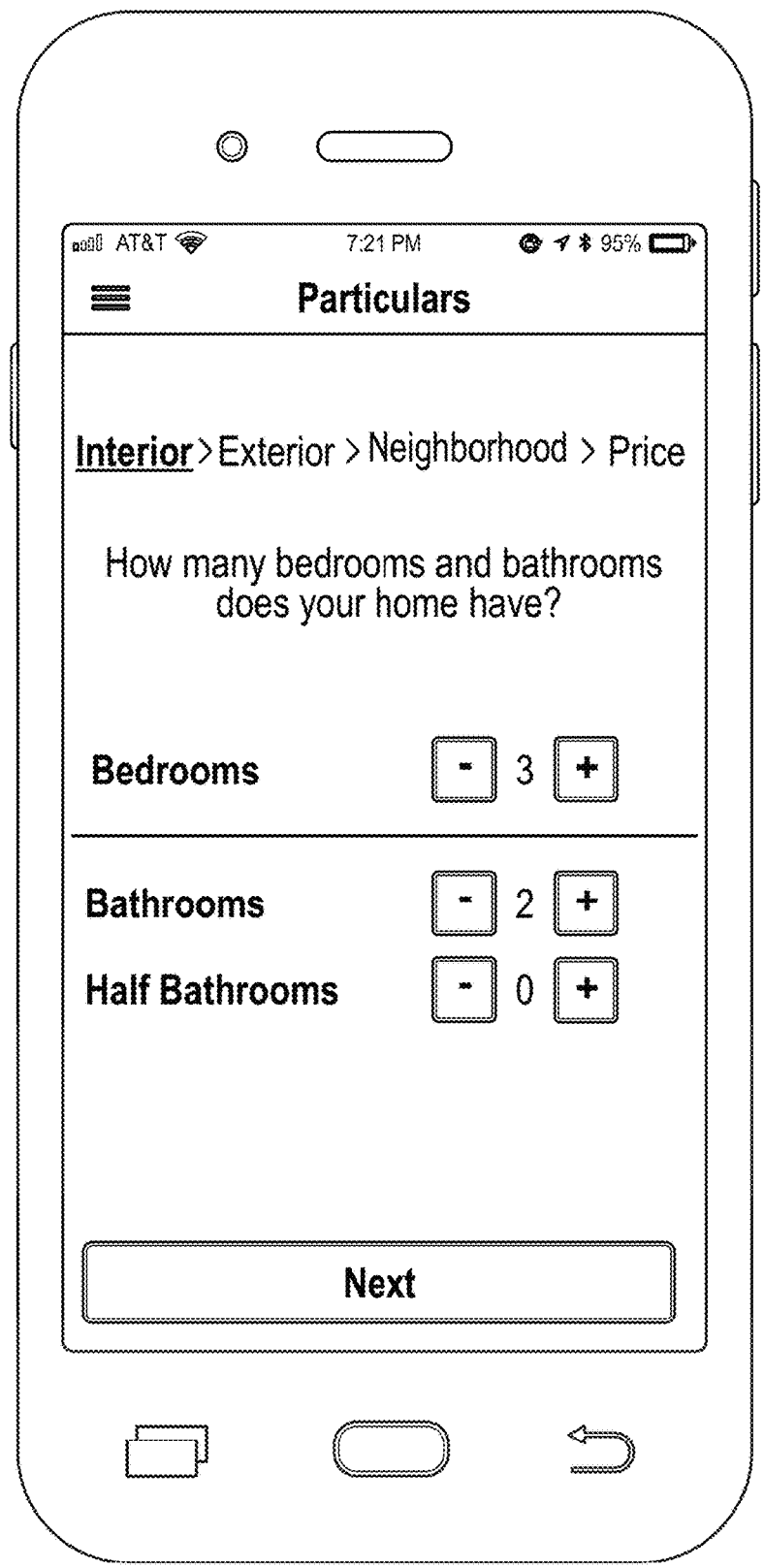
Figure 29:
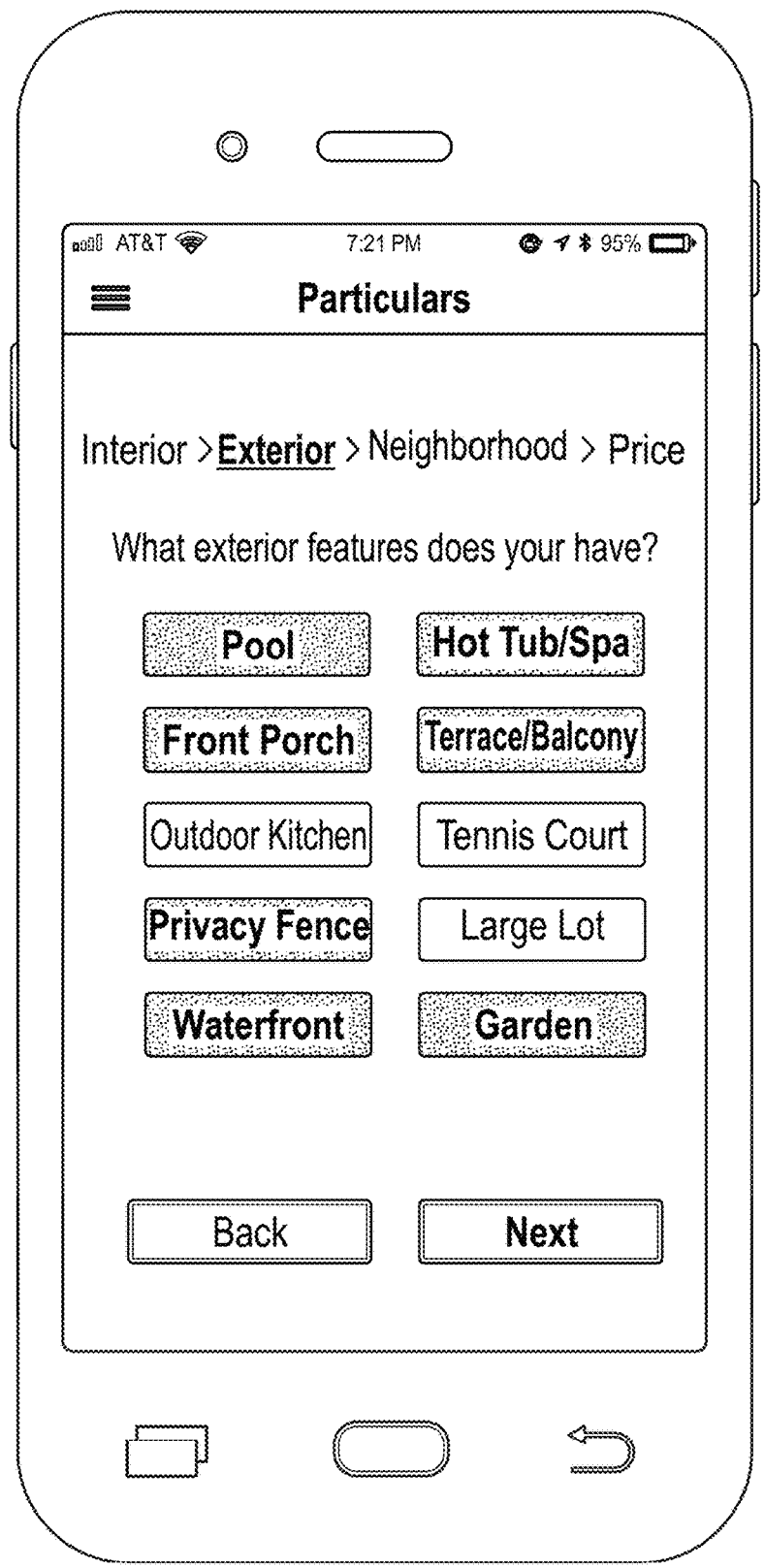
Figure 30:
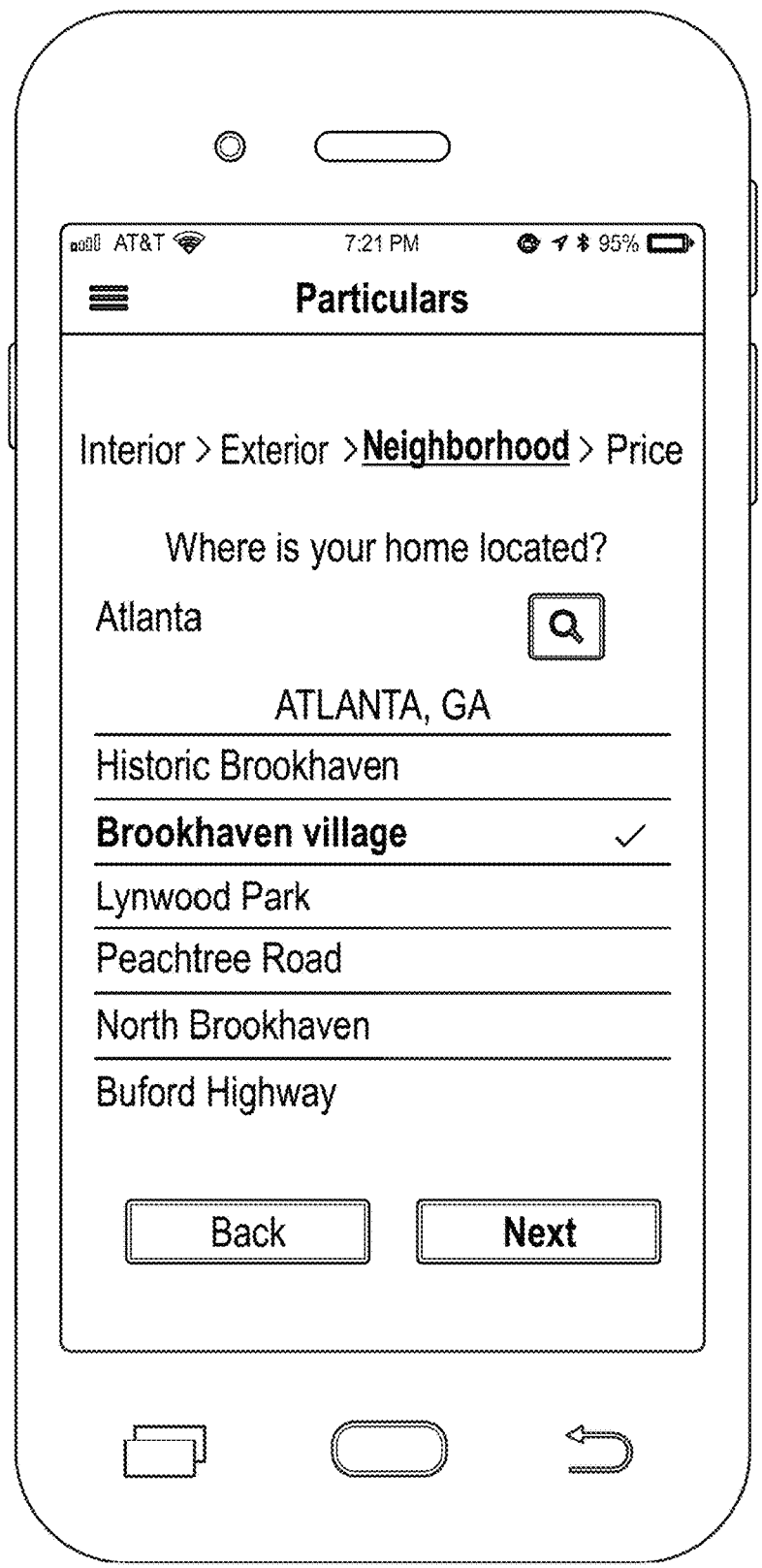
Figure 31:
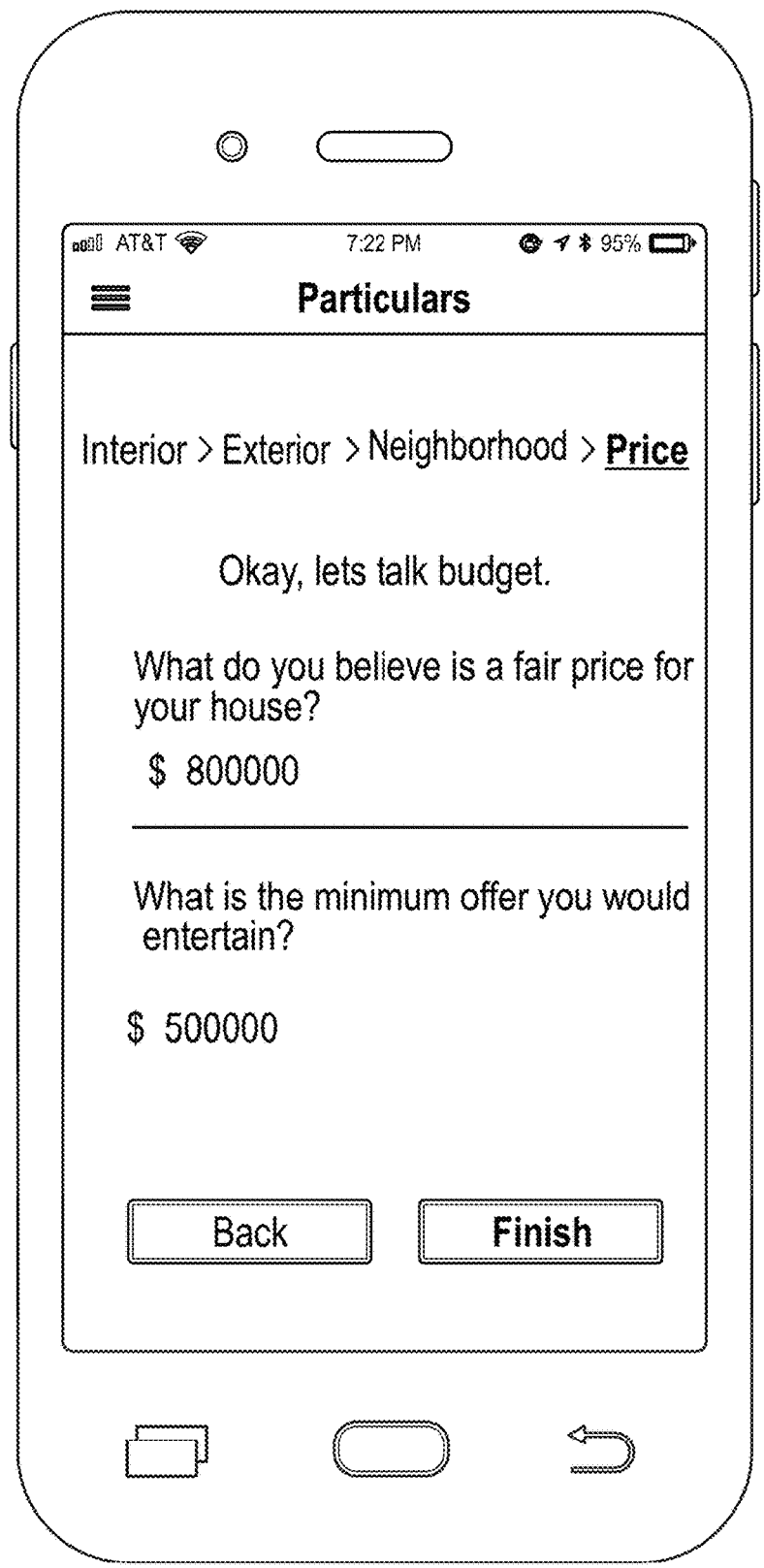
Figure 32:
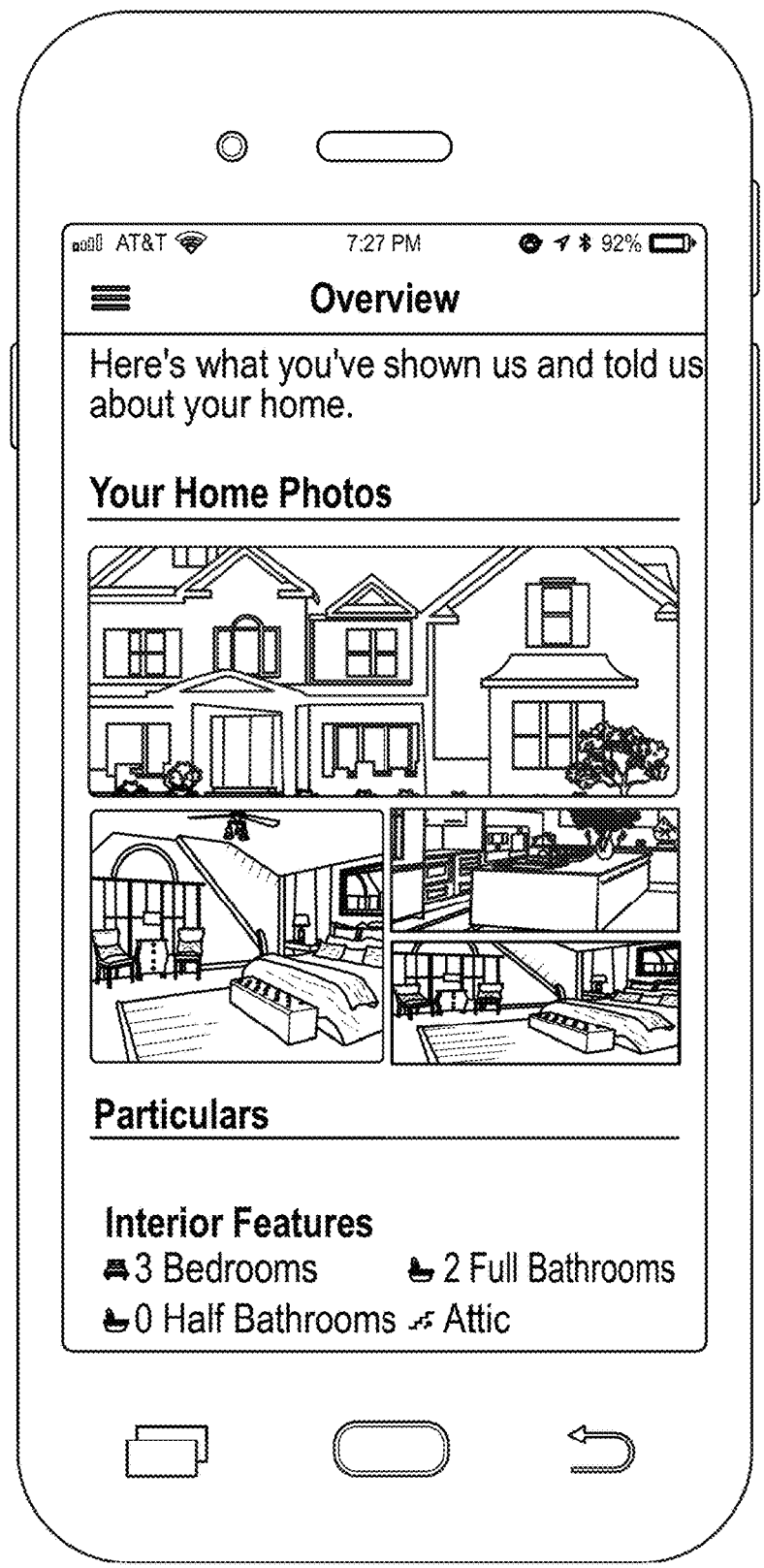
Figure 33:
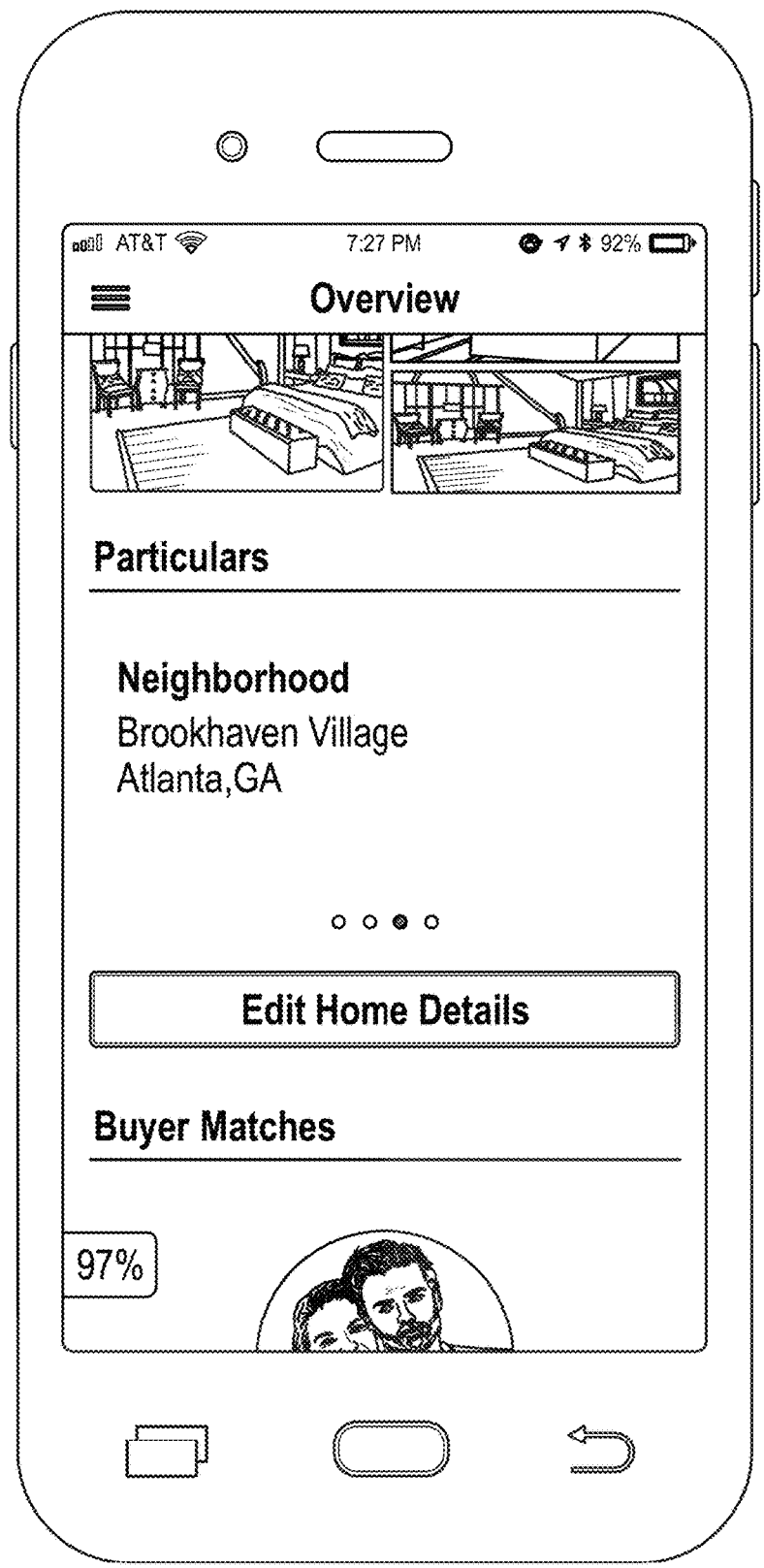
Figure 34:
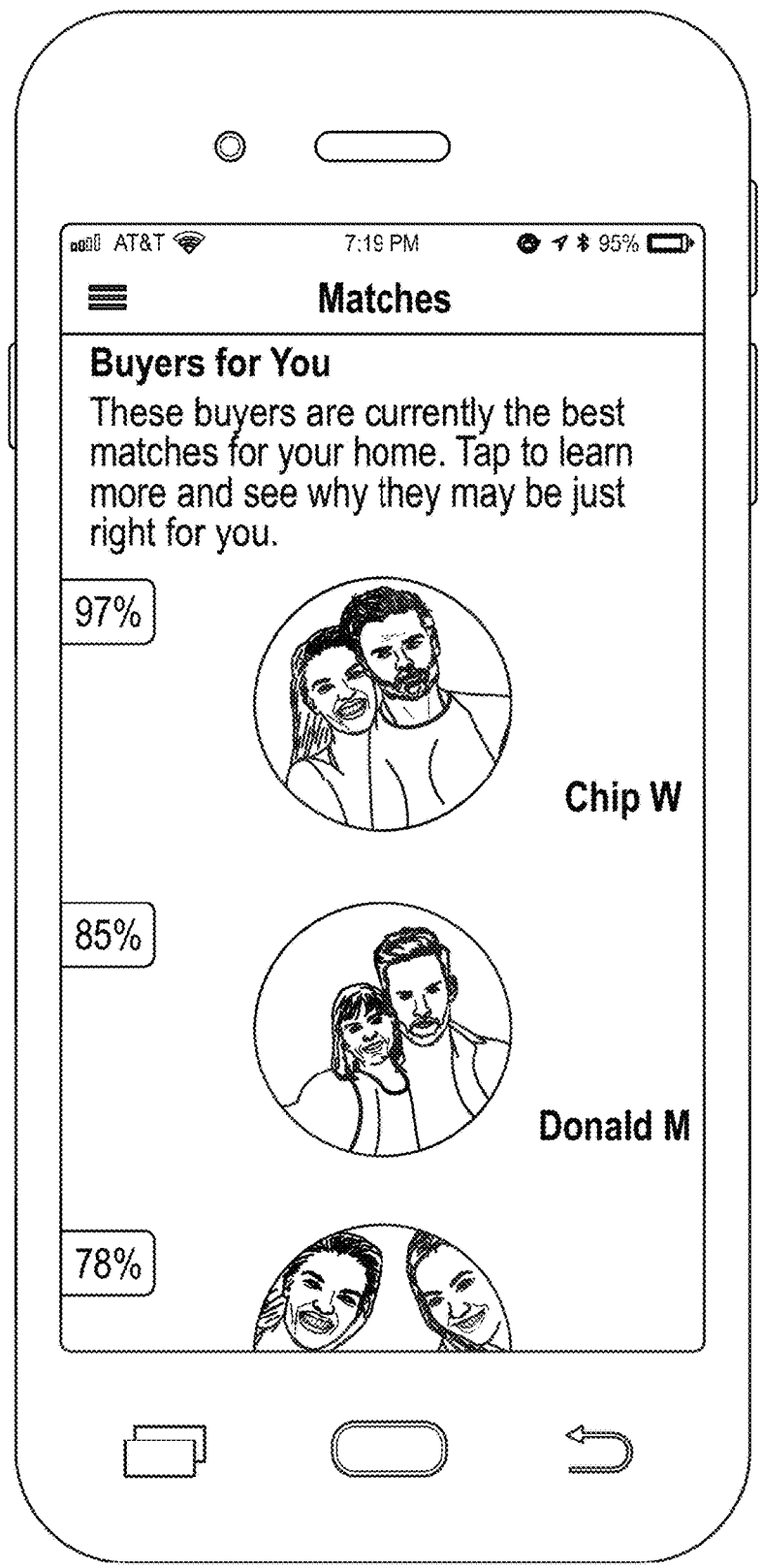
Figure 35:
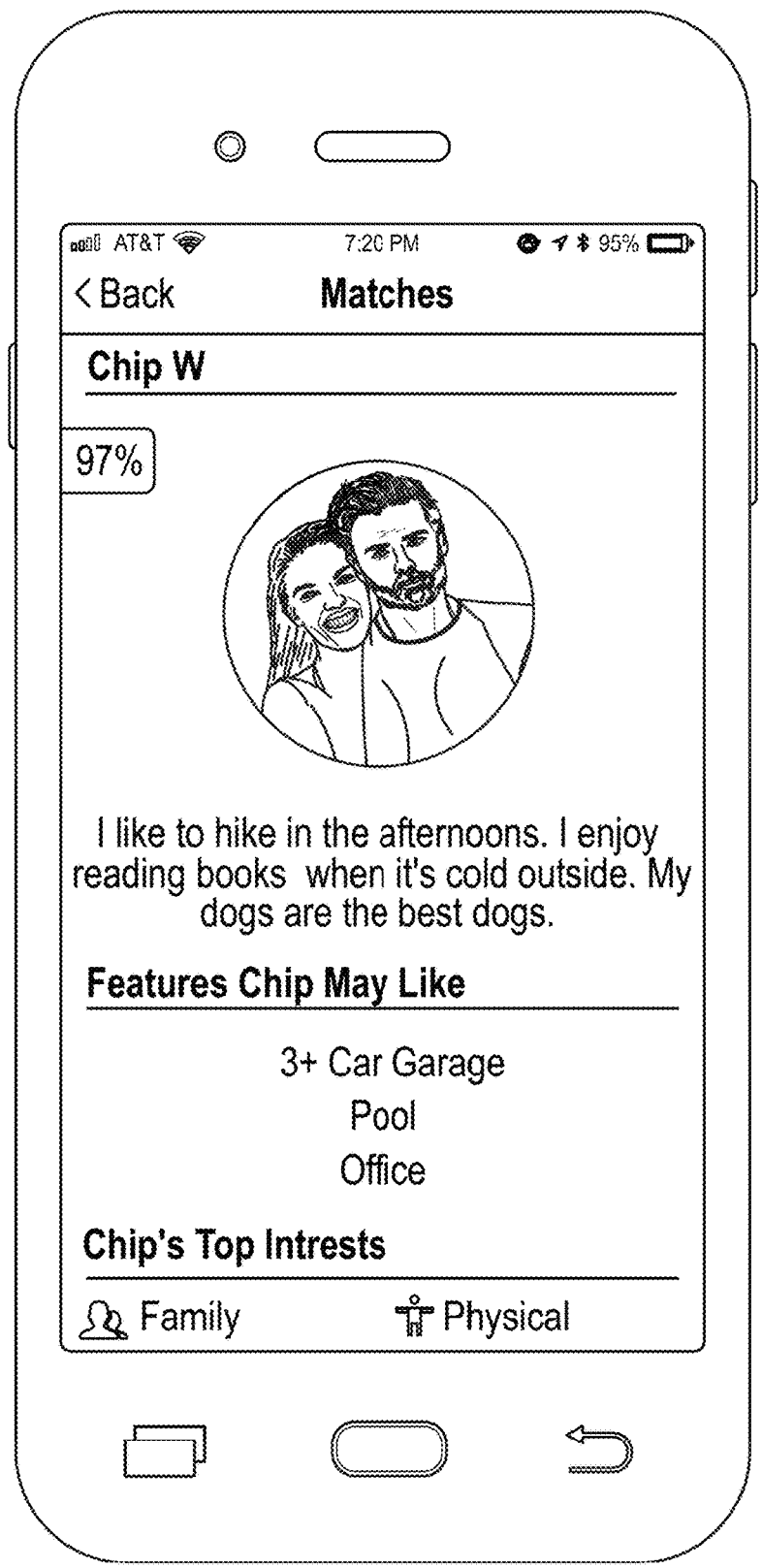
Figure 36:
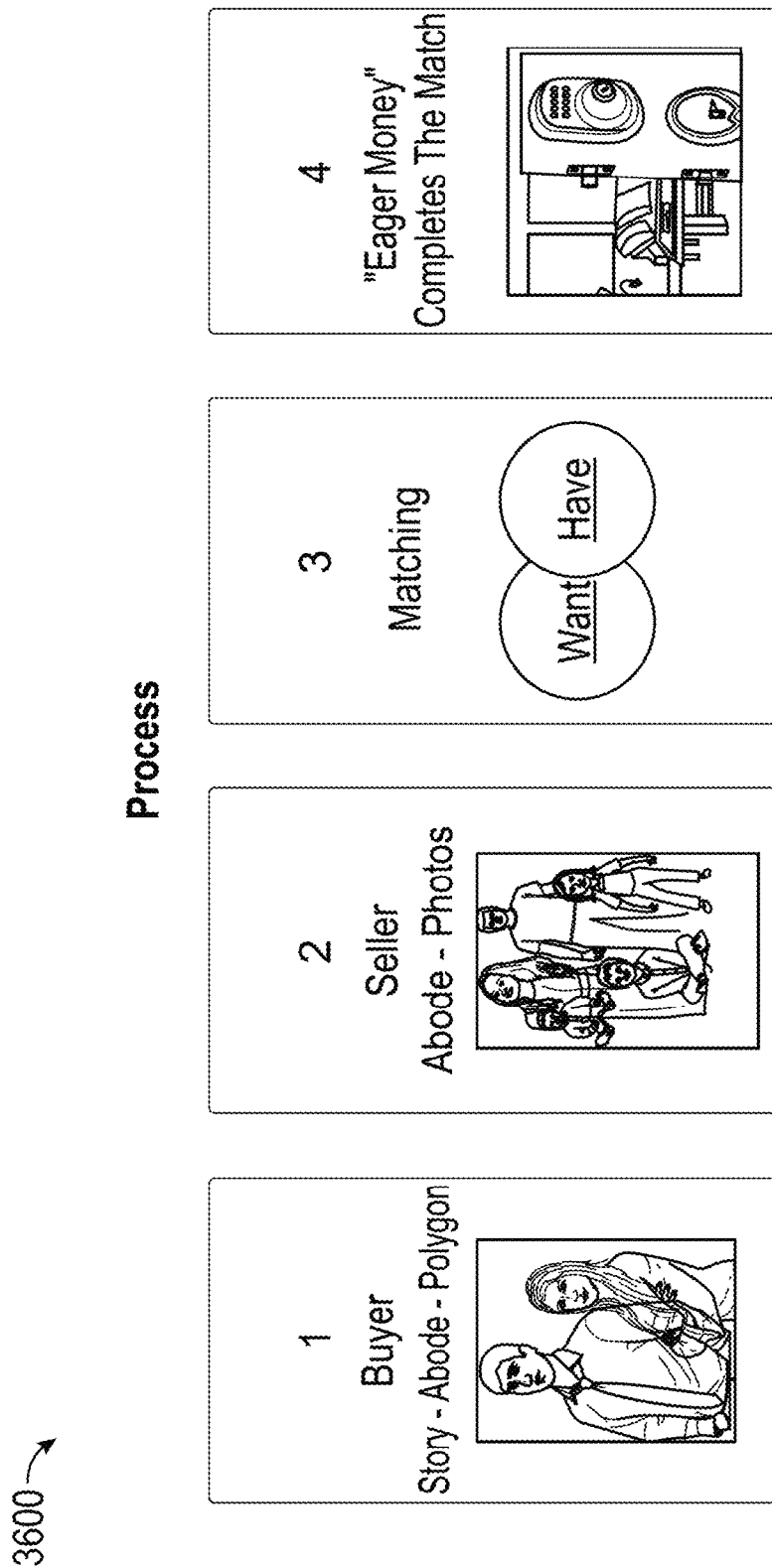
FIGS. 36-43 are example diagrams illustrating additional features of the systems and methods in accordance with aspects of the present disclosure.
Figure 37:
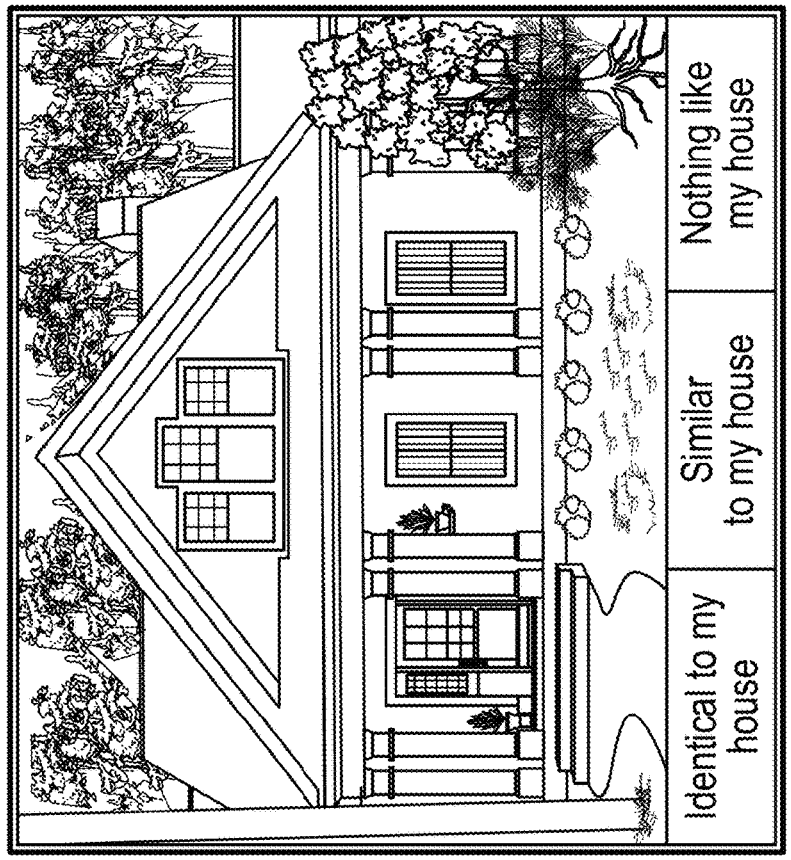
Figure 37:
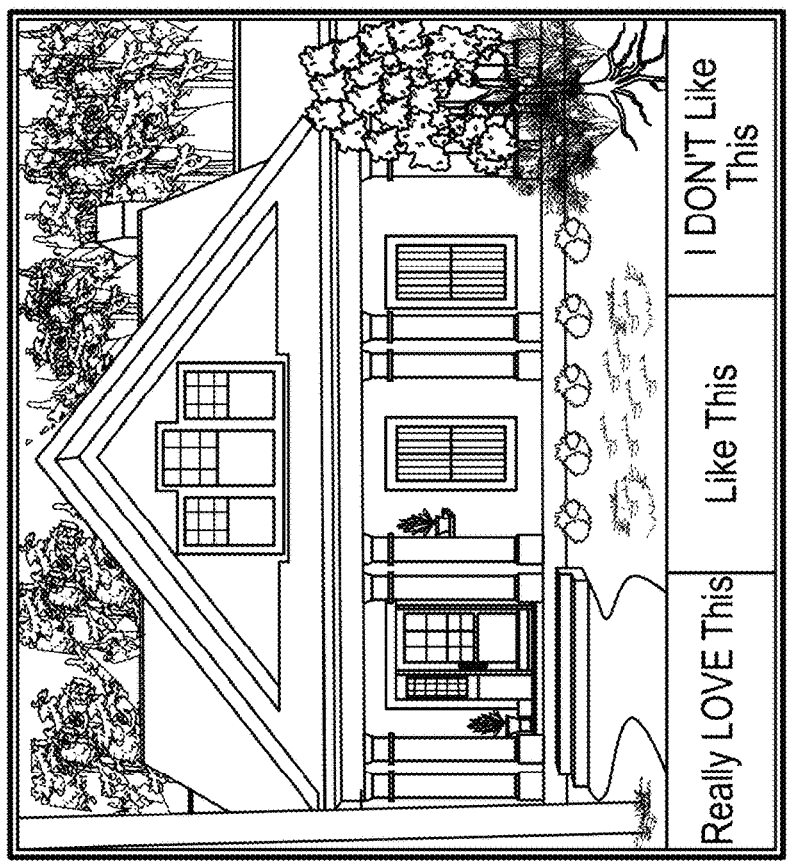
Figure 38:
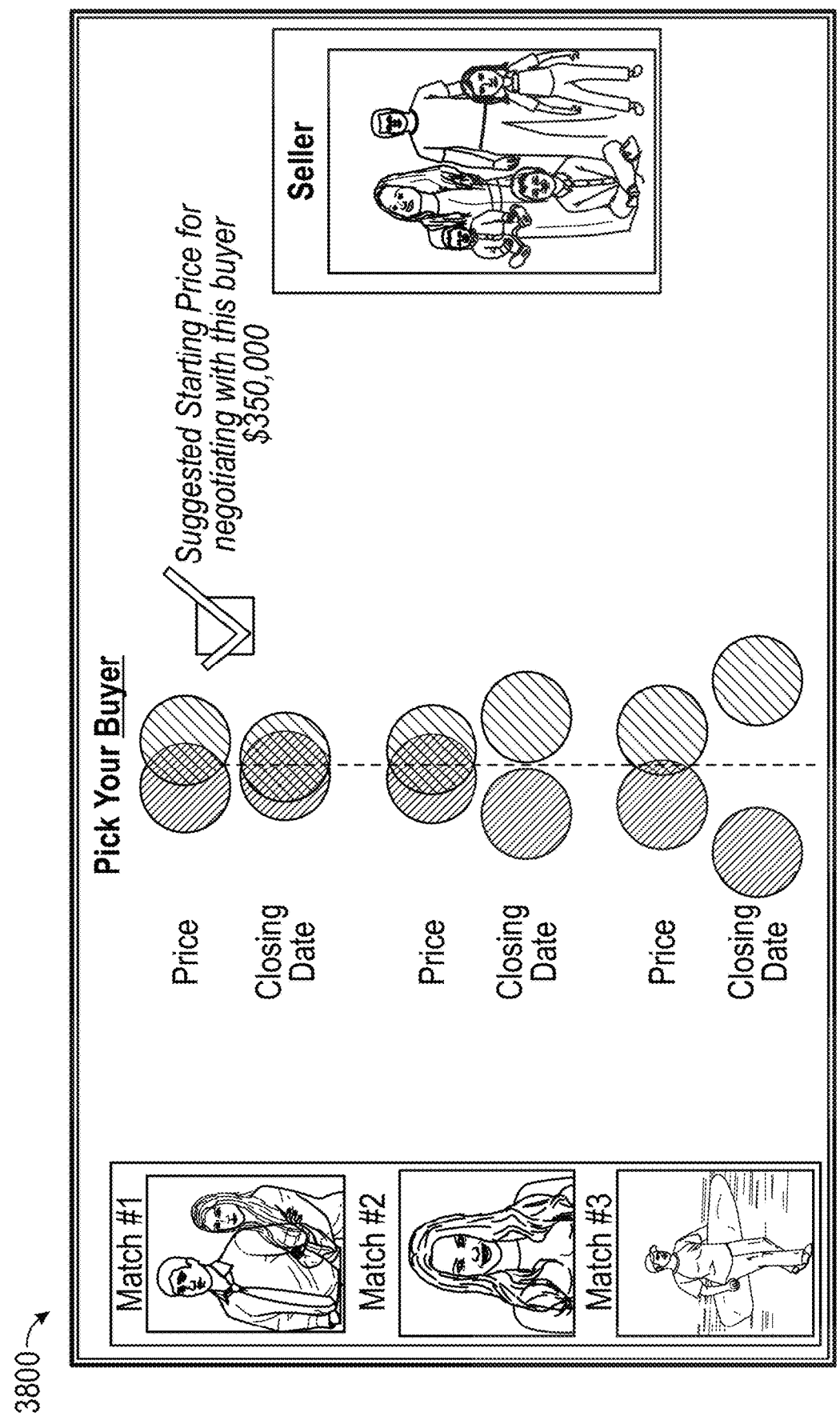
Figure 39:
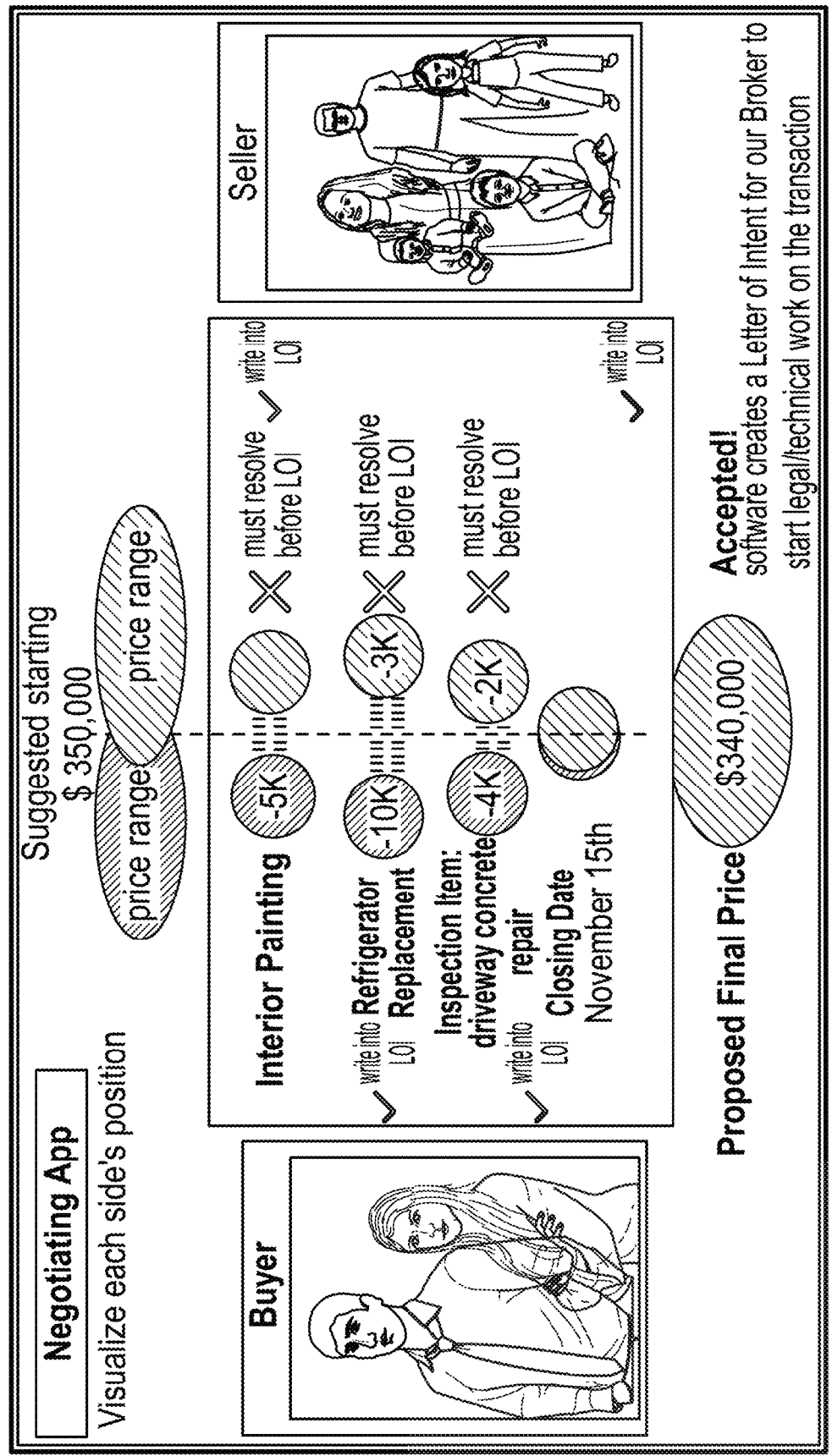
Figure 40:
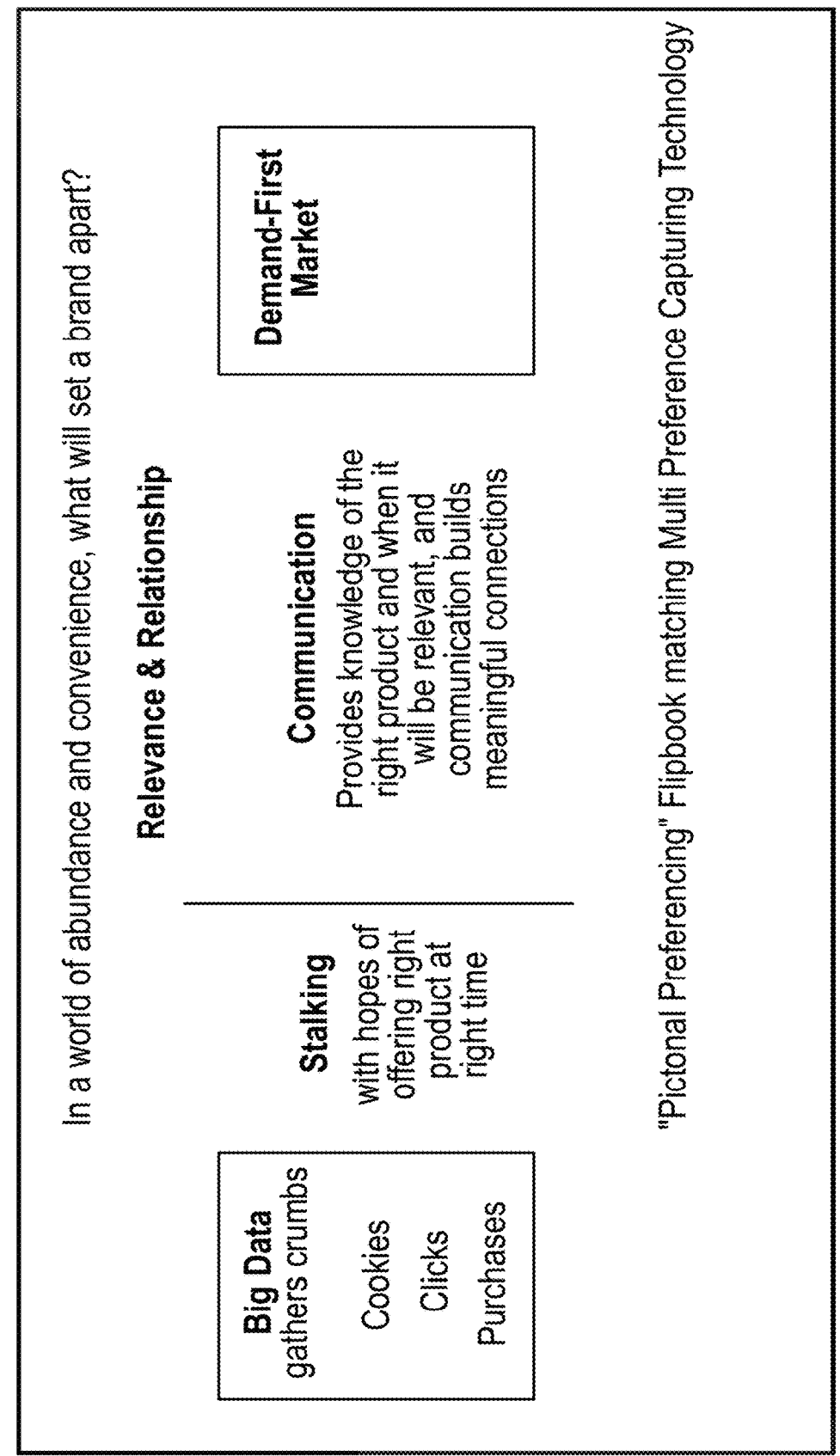

FIGS. 4-35 show example user interfaces 400-3500 used for generating preference profiles based on image analysis and user feedback and matching users based on the preference profiles and user photographs in accordance with aspects of the present disclosure. For example, as shown in FIG. 9, a user may select from multiple sets of training photographs ("Flipbooks"), and be presented with the training photographs from the selected set, one at a time, and be allowed to specify the user's preference for the presented training photograph (e.g., by selecting one of the "yes" and "no" buttons as shown in FIG. 11, by dragging or swiping the photograph left or right as shown in FIG. 10, or by sliding the indicators up or down on the slider bars for the different features depicted in the photograph as shown in FIG. 13). Although not shown, other types of user interface elements may be used to collect the user's feedback, such as digital buttons, rotary dials, drop-down menus, and the like. After going through the set of training photographs, the user may be presented with a breakdown of the user's preference profile generated by the system, as shown in FIGS. 15 and 16. For example, the various percentages may be generated by calculating for what percentage of the training photographs associated with a specific attribute/tag (e.g., contemporary, mid-century modern, etc. or characteristics thereof) the user indicated a preference. The user may also be able to specify various other parameters that indicate the user's preference with respect to potential target objects. In response to specifying the parameters, the user may be presented with a list/ranking of target objects that the user may be interested in. On the other hand, a homeowner may be able to take a photo of his or her own home as shown in FIG. 23, and be presented with various metrics about the user's home. Further, the homeowner may capture one or more photos of the interior of the home and/or specify additional parameters that indicate various characteristics of the home and/or the homeowner. In response to specifying the parameters, the homeowner may be presented with a list/ranking of potential buyers who may be interested in purchasing the user's home, as shown in FIGS. 34 and 35.

Additional Features

Figure 41:
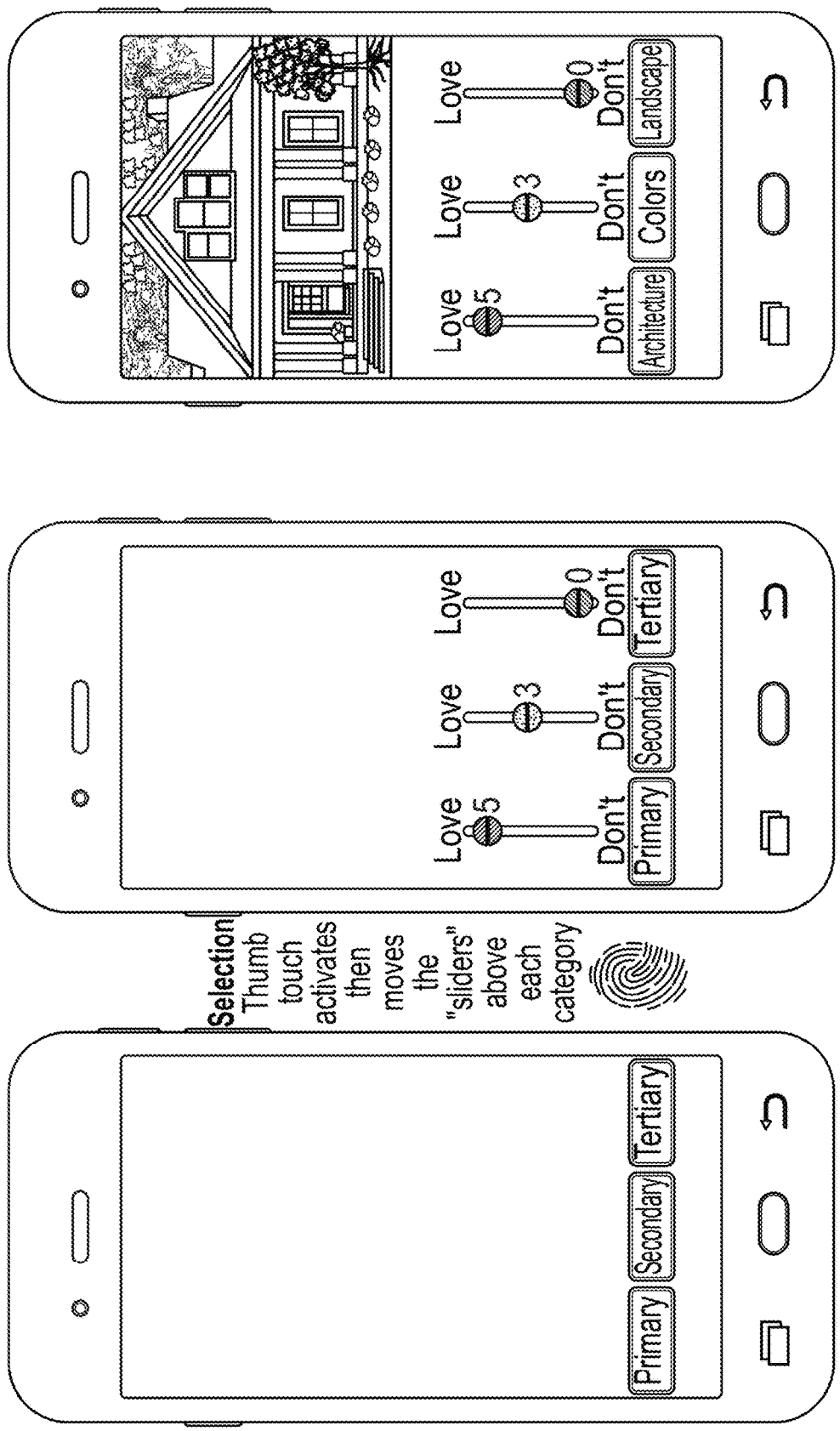
Figure 42:
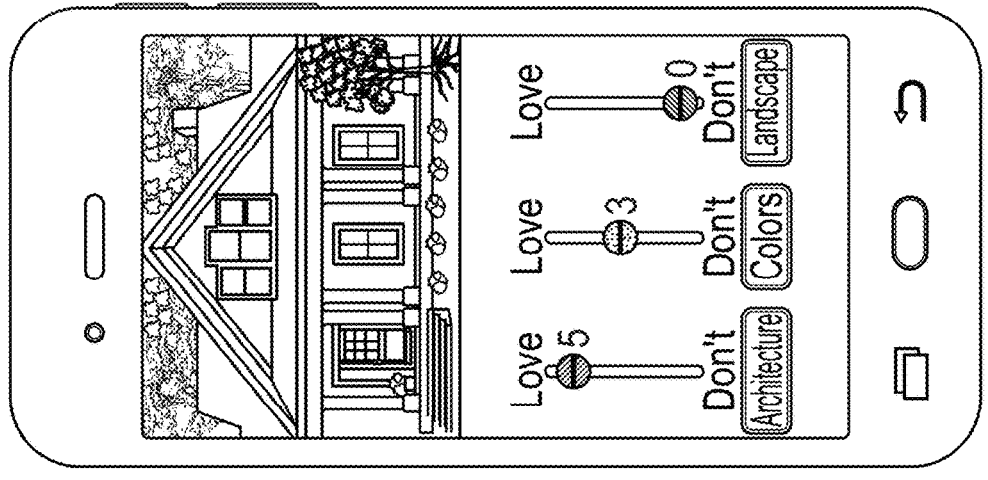
Figure 42:
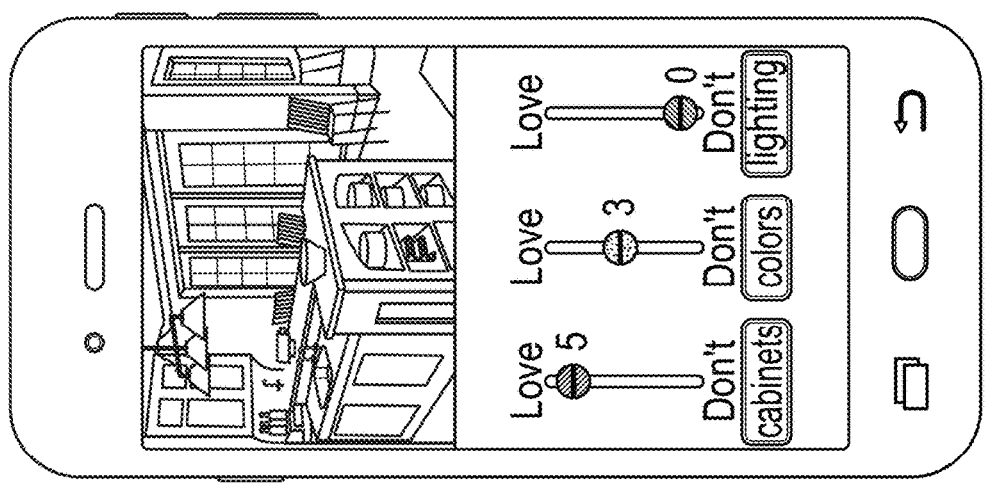
Figure 42:
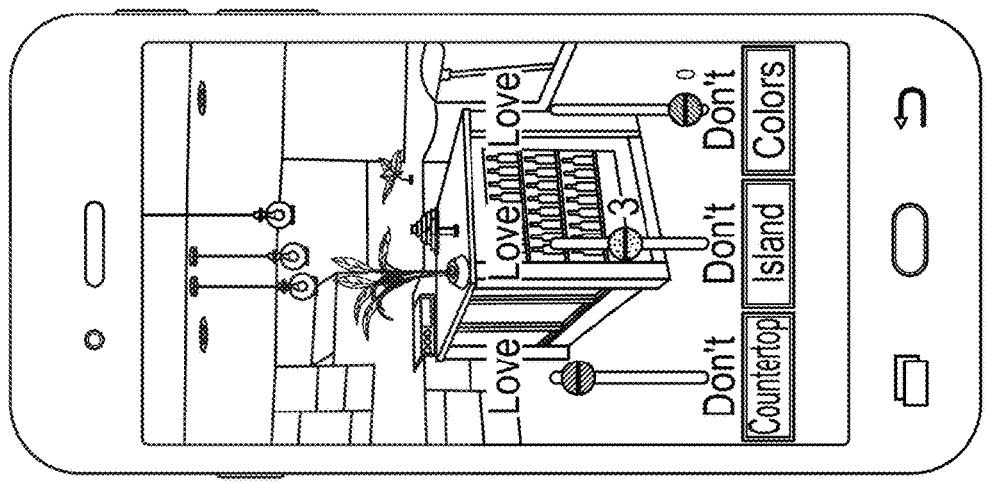
Figure 43:
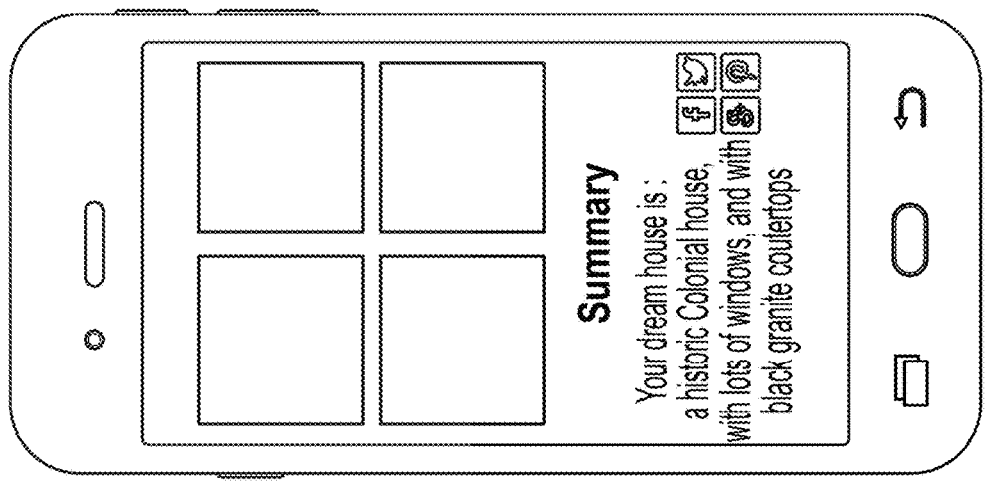
Figure 43:
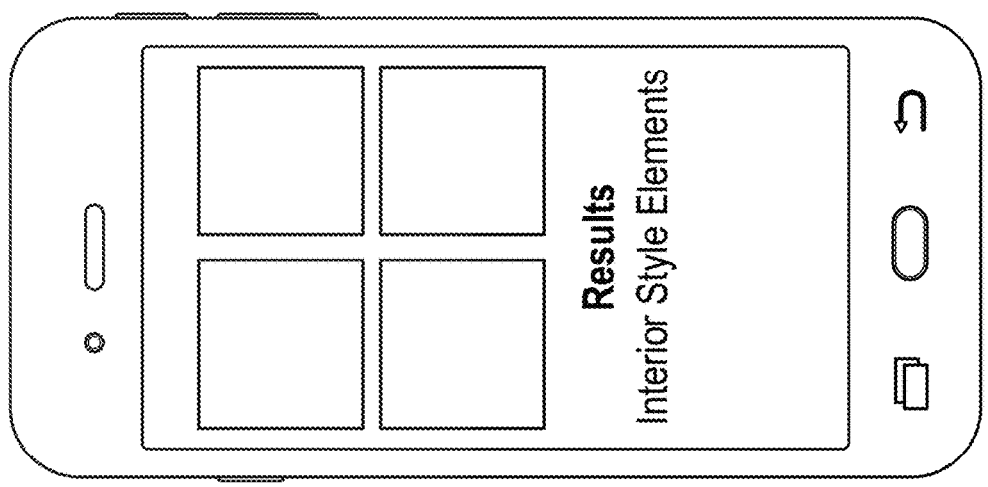
Figure 43:
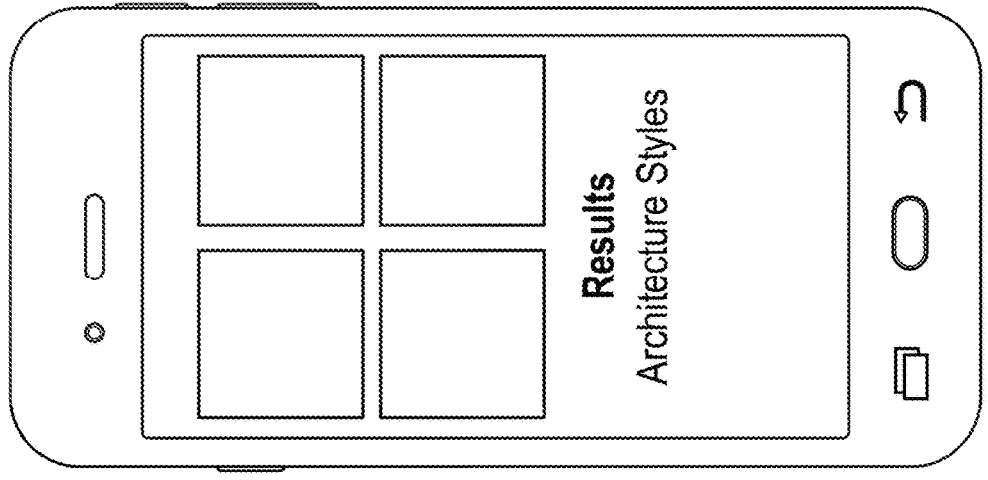

FIGS. 36-43 show example diagrams 3600-4300 illustrating additional features of the systems and methods in accordance with aspects of the present disclosure. For example, as shown in FIGS. 41-43, a user's preference (and degree of preference) with respect to various combinations of elements of a home may be collected and utilized to match the user with other users (e.g., homeowners) and/or target objects (e.g., homes).

Search Request Generation and Transmission Routine

Figure 44:
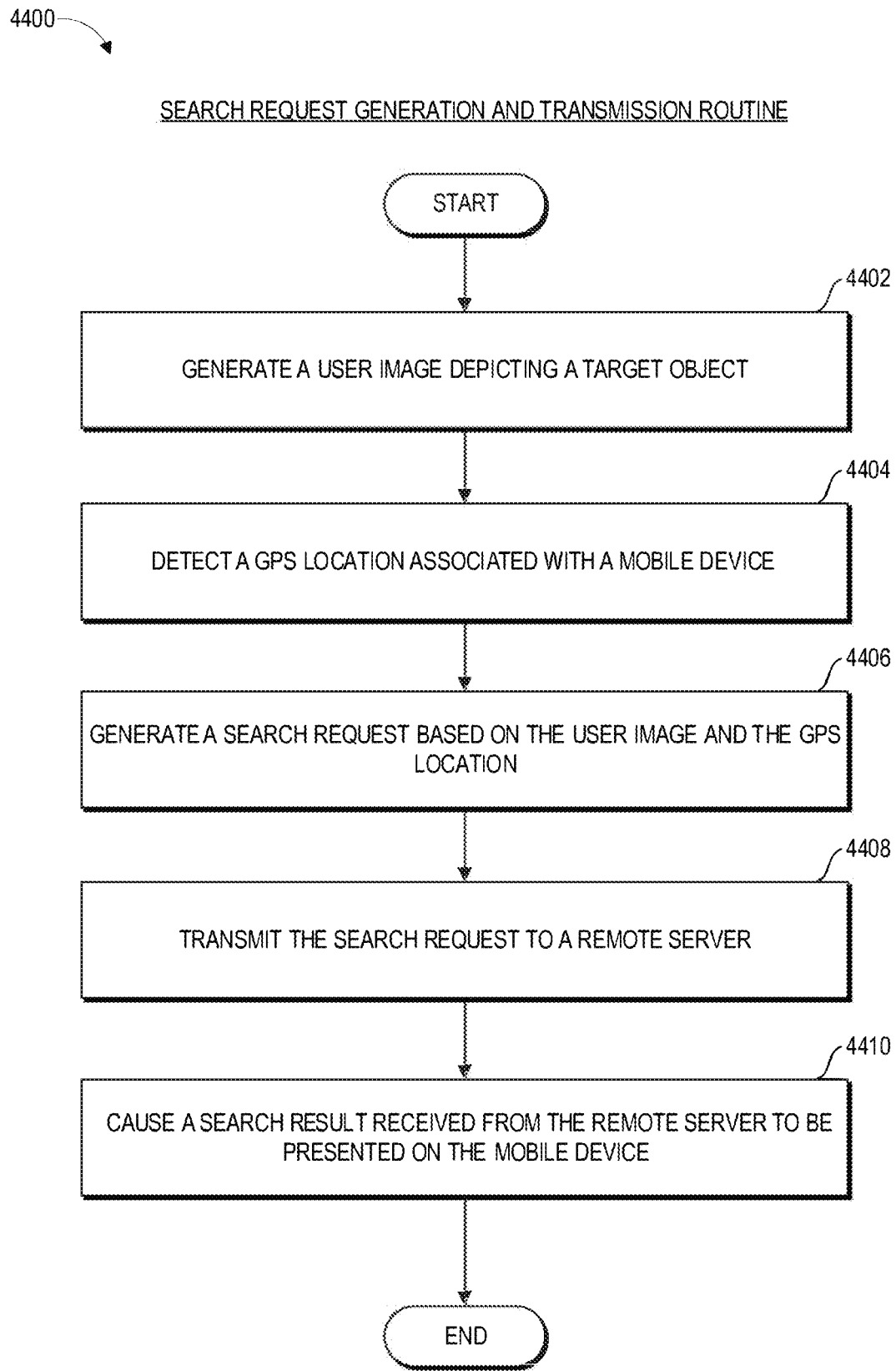
FIG. 44 is a flow diagram illustrating an example routine for generating and transmitting a search request in accordance with aspects of the present disclosure.

FIG. 44 is a flow diagram of an illustrative method 4400 implemented at least in part by the user computing device 102 for generating and transmitting a search request to a remote server to search for potential buyer users who may be interested in purchasing a home depicted in a user photograph included in the search request. Although any number of systems, in whole or in part, can implement the method 4400, to simplify discussion, the method 4400 will be described as being performed by the user computing device 102. In other implementations, one or more steps described herein as being performed by the user computing device 102 can be performed by the user matching service 150 or another component.

At block 4402, the user computing device 102 generates, using a camera module of the user computing device 102, a user image depicting a target object. For example, the mobile application running on the user computing device 102 may provide a user interface for capturing a photograph (also referred to herein as user image or user photograph), and the user may point the camera of the user computing device 102 at her own home that she has already registered using the mobile application (e.g., indicated to the user matching system 101 that she is the owner of the home), and capture a photograph of the exterior of the home from the front yard or the sidewalk. The captured photograph may be stored in the user computing device 102. Additionally or alternatively, the captured photograph may be transmitted (either automatically or upon user confirmation) to the user matching system 101 for further image analysis.

In some implementations, instead of capturing a photograph via the mobile application and automatically selecting the photograph for transmission to the user matching system 101, the mobile application may provide a user interface for selecting an existing photograph that was previously taken and stored on the user computing device 102. The captured photograph (or previously captured and stored photograph) may include geographical identification metadata (e.g., geo-tag information) that can be used to identify the geographical location where the photograph was taken. Although some implementations described herein refer to photographs or images of target objects (e.g., houses) being captured and/or submitted, the implementations are not limited as such, and in some other implementations, other forms of media such as videos may be used additionally or alternatively. For example, the user may capture a video of a house, and submit a search request along with the captured video via a mobile application installed on the user's smartphone. In such an example, one or more images extracted from the video can be used to perform the image comparison and/or verification techniques described herein.

At block 4404, the user computing device 102 detects, using a GPS module of the user computing device 102, a GPS location associated with the user computing device 102. Alternatively or additionally, the user computing device 102 may extract the location information from the photograph selected by the user. Using the GPS location of the user computing device 102 (or the location information extracted from the photograph), the user computing device 102 may determine that the photograph of the user's home is taken from a location proximate to the location of the home registered on the user's account. For example, based on the GPS coordinates, the user computing device 102 may determine that the user is standing right next to (or the photograph was taken right next to) "1234 Palm Drive, Atlanta, GA 30319," which is listed on the user's profile as the home address of the user.

At block 4406, the user computing device 102 generates a search request based on the user image and the GPS location. For example, the generated search request may include the user image and the GPS location. As another example, the user computing device 102 may generate the search request based on (i) the location of the user computing device 102 and/or the location information embedded in or associated with the selected photograph being proximate to a home listed on the user's profile as being owned by the user, (ii) whether the location of the user computing device 102 and/or the location information embedded in or associated with the selected photograph being within a threshold distance from a home listed on the user's profile as being owned by the user, and/or (iii) whether the location of the user computing device 102 and/or the location information embedded in or associated with the selected photograph satisfying another threshold proximity condition based on one or more homes listed on the user's profile as being owned by the user, and if one or more of these criteria are not met, the user computing device 102 may not generate the search request. Alternatively, the location-based verification may be performed on a remote server (e.g., by the user matching service 150), and if one or more of these criteria are not met, the user matching service 150 may reject the search request transmitted from the user computing device 102.

At block 4408, the user computing device 102 transmits the search request to the remote server, where the search request includes the identity of the user or his or her user account in the user matching system 101, the user image from block 4402, and/or the location information determined at block 4404. For example, the search request may include the user's account ID, a photograph of the user's home, and the GPS coordinates of the user's mobile device. As another example, the search request may include the user's account ID and a photograph of the user's home (and not include the GPS coordinates of the user's mobile device). In other cases, one or more different combinations of the information described herein may be included in the search request.

In some implementations, there is a temporal gap (e.g., that is greater than a threshold level, such as 5 minutes, 30 minutes, 1 hour, 1 day, 5 days, and so on) between the time at which the photograph included in the search request was taken and the time at which the search request is submitted by the user computing device 102. For example, the user may have taken the photograph of the house two days ago, and have now decided to submit the search request using the photograph. In some implementations, there is a spatial gap (e.g., that is greater than a threshold level, such as a few meters, 1 mile, 5 miles, 10 miles, 25 miles, and so on) between the location at which the photograph included in the search request was taken and the location at which the search request is submitted by the user computing device 102. For example, the user may have taken the photograph of his home from his own front yard, and may have gone to work and have now decided to submit the search request from work. By allowing the user to submit a search request using a photograph that was taken at a different time or location, and not relying solely on the location of the user computing device 102 at the time of submitting the search request to verify the validity of the search request (e.g., to ensure that the homeowner took the photograph from a location proximate to his home and that the home depicted in the photograph is actually his home), the user matching system 101 provides improved user experience (e.g., temporal and spatial flexibility).

In response to the search request, the user matching system 101 may process and verify the search request and cause a list of potential buyer users who might be interested in the user's home. In some implementations, the user matching system 101 may verify the search request received from the user computing system 101 by using the content of the photograph (e.g., by checking whether the home depicted in the photograph sufficiently resembles the home depicted in a public database image), the GPS location associated with the photograph (or the mobile device of the user) (e.g., by checking whether the GPS location is with a threshold distance from a home listed on the user's profile), or both. The techniques for processing and verifying the search request is described in greater detail below with reference to FIG. 45.

At block 4410, the user computing device 102 causes a search result received from the remote server to be presented on the mobile device. For example, the search result may include a ranking of buyer user profiles and corresponding match percentage values with respect to the home depicted in the photograph (e.g., as shown in FIG. 34).

In some implementations, one or more blocks may be added to the method 4400. In some implementations, one or more of the blocks shown in FIG. 44 may be omitted or modified. In some cases, block 4402 may be enabled only if the GPS location of the mobile device is within a threshold level of proximity from a home listed on the user's profile as being owned by the user. For example, if the user does not own any homes nearby, the user may not be able to access this feature of the mobile application that allows the user to take a photograph of a home and allow the user to see a list or ranking of potential buyers who might be interested in the home based on the buyer profiles stored on the user matching system 101. In some implementations, one or more tasks described herein as being performed by a remote server (e.g., user matching service 150 or other components of the user matching system 101) may instead be performed by the user computing device. Similarly, one or more tasks described herein as being performed by the user computing device may instead be performed by a remote server (e.g., user matching service 150 or other components of the user matching system 101).

Search Request Processing and Notification Transmission Routine

Figure 45:
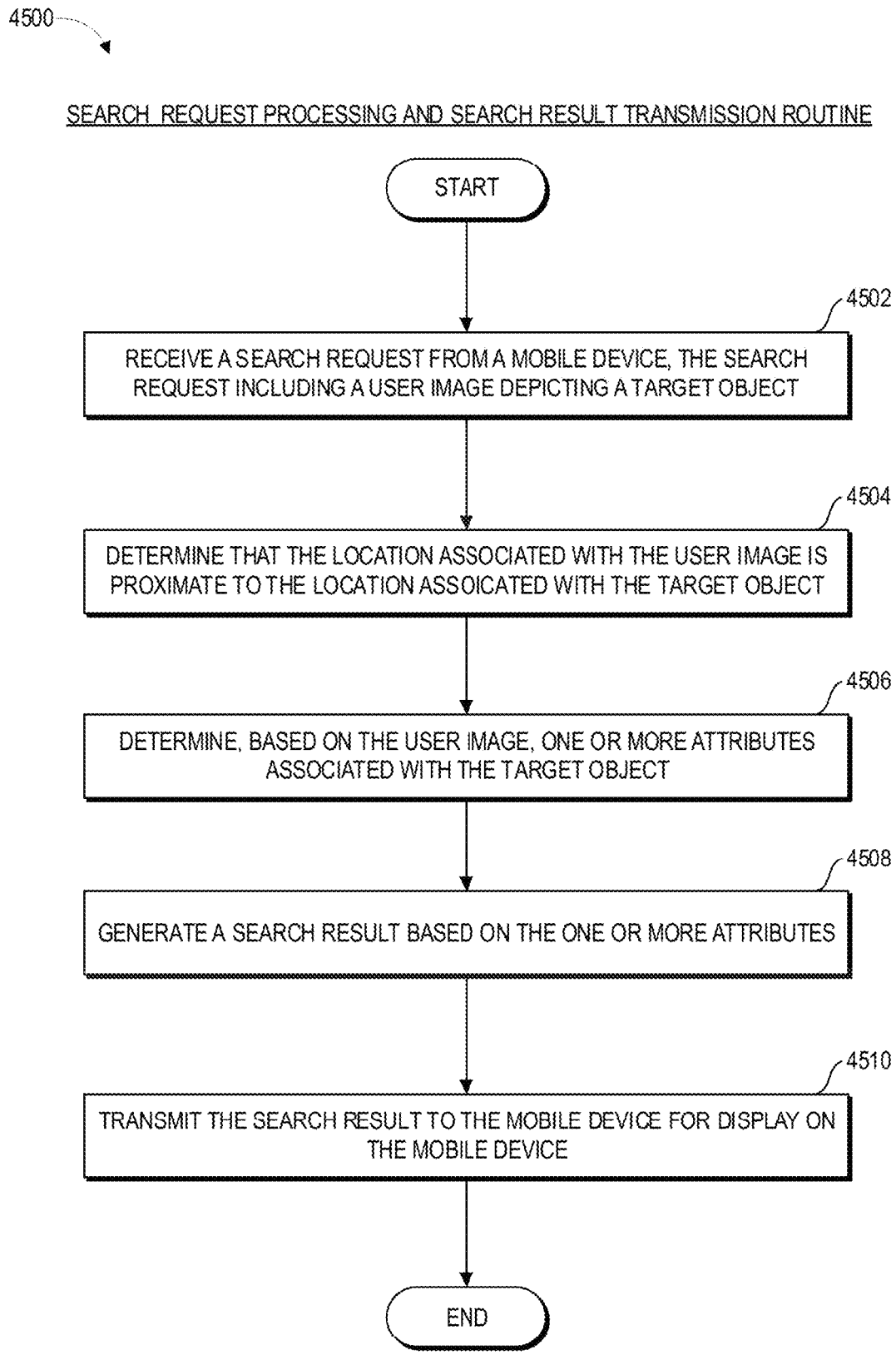
FIG. 45 is a flow diagram illustrating an example routine for processing a search request from a user computing device and transmitting a search result to the user computing device in accordance with aspects of the present disclosure.

FIG. 45 is a flow diagram of an illustrative method 4500 implemented at least in part by the user matching service 150 for generating a search result based on a search request received from the user computing devices 102, and transmitting the search result to the user computing devices 102. Although any number of systems, in whole or in part, can implement the method 4500, to simplify discussion, the method 4500 will be described as being performed by the user matching service 150. In other implementations, one or more steps described herein as being performed by the user matching service 150 can be performed by the user computing device 102 or another component.

At block 4502, the user matching service 150 receives, from a mobile device associated with a user account (also referred to as the homeowner in this example), a search request to search for one or more potential buyer users who might be interested in the homeowner's home (e.g., one of the target objects associated with the homeowner's user account). For example, as discussed with reference to FIG. 44, the search request may include the identity of the user or the user's account in the user matching system 101, an image depicting a target object (e.g., a house) identified as being owned by the user, and/or the location information associated with the user's mobile device and/or the image.

At block 4504, the user matching service 150 determines that the location associated with the user image is proximate to the location associated with the target object (e.g., the user's home listed on the user's profile as being owned by the user). In the example of FIG. 45, the location information included in the search request (or otherwise received from the user computing device 102), the user matching service can verify the validity of the search request. For example, the user matching service 150 may query a public or private database to determine whether the location information included in the search request (e.g., associated with the user image) is within a threshold level of proximity to the location information associated with a home listed on the user's profile as being owned by the user. For example, the user matching service 150 may query the GOOGLE MAPS™ mapping service to determine the GPS coordinates associated with the street address associated with one or more homes listed on the user's profile as being owned by the user and determine whether the GPS coordinates are within a threshold level of proximity (e.g., within 10 meters) of the GPS coordinates included in the search request or associated with the photograph included in the search request. If the two sets of GPS coordinates are within the threshold level of proximity, the method 4500 may proceed to block 4506. Otherwise, the user matching service 150 may deny or reject the search request.

The user matching service 150 may use the GPS coordinates of the mobile device at the time the search request is submitted, or the location information embedded in the photograph included in the search request. In some cases, the user matching service 150 may conduct one verification using the GPS coordinates of the mobile device and another verification using the location information embedded in the photograph, and proceed to block 4506 only if one (or both) of the verifications are completed successfully (e.g., the two locations being within the threshold level of proximity). In some implementations, the user matching service 150 uses the GPS coordinates of the mobile device (or the GPS coordinates associated with the photograph) to determine one or more addresses at or in the vicinity of the GPS coordinates. Then, the user matching service 150 may verify that the street address associated with a home listed on the user's profile as being owned by the user matches one of the determined addresses.

Additionally or alternatively, the user matching service 150 may compare the photograph included in the search request to the image of the house at the street address associated with a home listed on the user's profile as being owned by the user available on a public or private database such as via the GOOGLE MAPS™ mapping service. For example, the user matching service 150 may perform an image comparison between the photograph and the GOOGLE MAPS™ mapping service image of the house at the street address associated with a home listed on the user's profile as being owned by the user, and determine whether there is a threshold level of similarity. In some cases, if the user has multiple homes listed on her profile, the user matching service 150 may perform the comparison for each of the multiple homes. In other cases, the user matching service 150 may perform the comparison for one of the homes that is closest to the location identified in the search request.

The image comparison may include inputting both the photograph from the search request and the image of the house retrieved from a public or private database into an image classifier configured to receive an image as input and output one or more values indicative of the characteristics of the inputted image, and comparing the output values associated with the photograph and the image of the house. In other implementations, another image comparison algorithm may be used, such as pixel-by-pixel comparison, feature detection and matching, and the like. If the two images have at least a threshold level of similarity, the user matching service 150 may proceed to block 4506. Otherwise, the user matching service 150 may deny or reject the search request. In some implementations, the verification process described with reference to block 4504 may be performed on the mobile device (e.g., user computing device 102) only, on the user matching system 101 only, or both.

Although the example of FIG. 45 is described as allowing a user to submit a search request and verifying that the integrity of the search request using the GPS coordinates, the address, and/or the photograph, in some other implementations, some or all of the verification may occur prior to the search request being submitted to the user matching service 150. For example, the mobile device may be allowed to transmit a search request only from a location that is within the threshold level of proximity from one of the homes listed on the user's profile as being owned by the user. In some implementations, one or more of the steps prior to the transmission (e.g., capturing the image of the home to view a ranking of users who might be interested in the home) may be disabled from a location that is not within the threshold level of proximity from one of the homes listed on the user's profile as being owned by the user. Advantageously, the automatic generation and transmission of search results is limited to those search requests that have been verified using the locations and/or the photographs associated with the search requests, thereby ensuring that the user matching system 101 is not overloaded with too many search requests, thereby allowing the user matching system 101 to consume a reduced amount of computing resources and provide faster response times and shorter latencies.

Further, in some implementations, instead of denying a search request in the event of a mismatch, the user matching service 150 may approve the search request and provide an indication of the mismatch (e.g., a distance between the target object and the location from which the search request was submitted or the location associated with the photograph, an indication that the search request did not satisfy a threshold level of geographical proximity, an image similarity metric indicating the degree of similarity between the user-submitted photograph and the photograph associated with the target object, an indication that the user-submitted photograph did not satisfy a threshold level of image similarity, etc.). For example, if construction activities have taken place after a mapping service (e.g., GOOGLE MAPS™) captured and stored the photograph of the target object in its database, the user-submitted photograph may look different from the photograph accessed from the GOOGLE MAPS™ database. In such an example, the user matching service 150 may still approve the search request but provide an indication that the user-submitted photograph did not match the photograph of the target object obtained from the GOOGLE MAPS™ database.

At block 4506, the user matching service 150 determines, based on the user image, one or more attributes associated with the target object. For example, the user matching service 150 may analyze the user image depicting the user's home and determine the attributes of the home such as style, size, color, roofing, gardening, etc. One or more attributes may be associated with a weight value or a modifier (e.g., 80% Georgian style, average size, lighter in color, etc.). In some implementations, the determined attributes are transmitted to the user's mobile device for presentation to the user.

At block 4508, the user matching service 150 generates a search result based on the one or more attributes. The user matching service 150 may compare the attributes associated with the user image to the preference profiles of other users (e.g., buyer users) of the user matching system 101, and based on the comparison, rank those users in the descending order of correlation or match percentage. For example, if the attributes of the user image include 80% Georgian style, average in size, and lighter in color, Buyer User A whose preference profile indicates that he has a 90% preference score for Georgian style homes and prefers homes that are average in size (e.g., relative to other homes in the geographical area of interest) may be ranked higher than Buyer User B whose preference profile indicates that she has a 45% preference score for Georgian style homes and prefers homes that are larger than average in size. The ranked list may be limited to a specific number of buyer users (e.g., top 10 buyer users) or a specific degree of match (e.g., buyer users having at least a 60% match percentage with the homeowner user's home). The buyer users whose preference models are used to generate the match percentages and the ranked list may be a subset of all users of the user matching system 101 selected based on the characteristics of the target object and/or the homeowner user. For example, the user matching service 150 may input the user image from the homeowner user into the preferences models of all buyer users within a specific geographical area (e.g., within the same ZIP code as the homeowner's home or one or more adjacent ZIP codes, within 25 miles of the homeowner's home, in the same city as the homeowner's home or one or more adjacent cities, etc.). In some implementations, the buyer users' resource limitations such as home price range, timeline for purchasing a home, geographical location or area of interest, and the like are considered when generating the ranking of potential buyers.

At block 4510, the user matching service 150 transmits the search result to the mobile device for display on the mobile device. Upon receiving the search result from the user matching service 150, the mobile device of the user may display the search result so that the user can browse the list of buyer users who may be interested in purchasing the user's home (e.g., the home depicted in the user image included in the search request of block 4502). In some implementations, the search result presented to the homeowner user may indicate, for each buyer user included in the search result, the buyer user's resource limitations such as home price range, timeline for purchasing a home, geographical location or area of interest, and the like. Although not illustrated in FIG. 45, subsequent to the transmission of the search result to the mobile device, the homeowner user using the mobile device may be able to initiate communication with one or more of the buyer users included in the search result, either directly to the mobile devices of such buyer users or indirectly via the user matching system 101.

In some implementations, one or more blocks may be added to the method 4500. In some implementations, one or more of the blocks shown in FIG. 45 may be omitted or modified. For example, blocks 4506 and 4508 may be modified such that in response to the search request from the homeowner user, the one or more images of the target object submitted by the homeowner user may be inputted into the preference models of one or more buyer users of the user matching system 101. Based on the results from inputting the one or more images into the buyer users' preference models, the user matching service 150 may generate a ranked list of buyer users in the descending order of match percentage (e.g., from the buyer user having the highest match percentage to the buyer user having the lowest match percentage). As discussed above, the ranked list may be limited to a specific number of buyer users (e.g., top 10 buyer users) or a specific degree of match (e.g., buyer users having at least a 60% match percentage with the homeowner user's home).

The preference model of a user may be generated using various machine learning algorithms. For example, as discussed with reference to FIG. 3, the user may be presented with a series of images and asked to provide an input on each image. Based on the user's input, the user matching system 101 (or another system) can generate the user's preference model configured to take an image as input and output one or more parameters indicative of a degree of match between the user's preferences and the characteristics of the inputted image. Some non-limiting examples of such algorithms that can be used to generate and update the preference models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron) or convolutional neural network algorithms, deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Although not illustrated in FIG. 45, prior to block 4502, the user matching service 150 may receive a request from the user to add the target object (e.g., a home that the user owns) depicted in the user image at block 4502 to the user's account. Such a request may include identifying information such as the street address of the home the user wishes to add to his or her account. For example, a new user may register for a user account on the user matching system 101 and claim the street address associated with a target object (e.g., a home) as his or her own home address. In some implementations, in response to a user's indication that the home at a particular street address belongs to the user, a request to register the street address as the user's home may be sent to a system administrator for approval, and upon system administrator approval, the user matching system 101 may register the street address with the user (e.g., in the data repository 140, the user may be listed as the owner of the home at the street address and/or the street address may be added to the user's profile/account). In other implementations, in response to a user's indication that the home at a particular street address belongs to the user, the user's account information is compared to information in an ownership registry, and upon determining that the user is the owner of the home at the particular street address, the user matching system 101 registers the street address with the user. In yet other implementations, in response to a user's indication that the home at a particular street address belongs to the user, the user matching system 101 determines whether the home at the particular street address has already been registered with another user of the user matching system 101, and if not, the user matching system 101 registers the street address with the user without further approval by a system administrator or comparison to an ownership registry. If the user matching system 101 determines that the home at the particular street address has already been registered with another user of the user matching system 101, the user matching system 101 may request system administrator approval and/or compare the user's account information to an ownership registry, and based on the results of the approval and/or comparison, update the owner of the home in the data repository 140. In some implementations, one or more tasks described herein as being performed by a remote server (e.g., user matching service 150 or other components of the user matching system 101) may instead be performed by the user computing device. Similarly, one or more tasks described herein as being performed by the user computing device may instead be performed by a remote server (e.g., user matching service 150 or other components of the user matching system 101).

Link Request Generation and Transmission Routine

Figure 46:
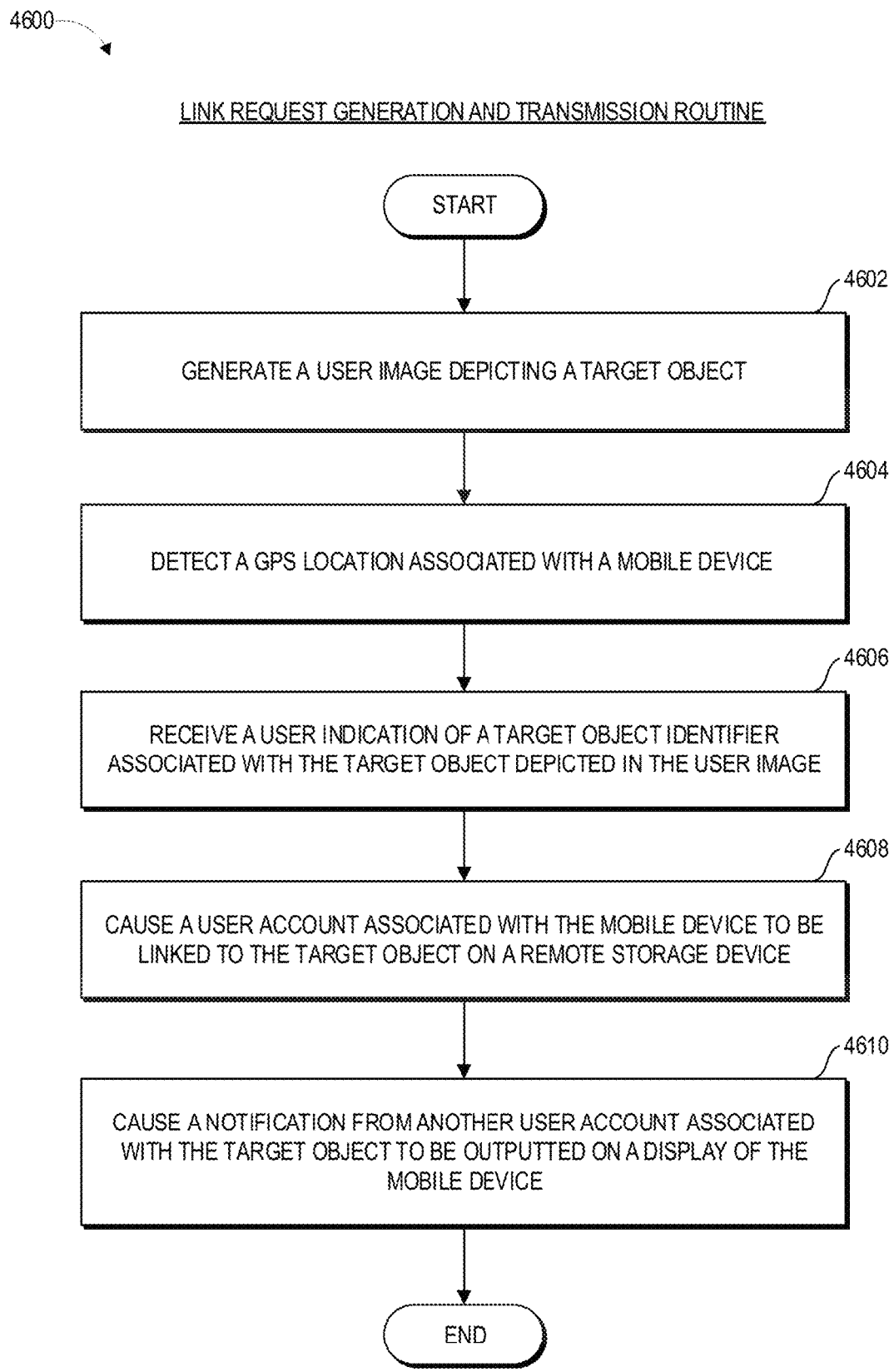
FIG. 46 is a flow diagram illustrating an example routine for generating and transmitting a link request in accordance with aspects of the present disclosure.

FIG. 46 is a flow diagram of an illustrative method 4600 implemented at least in part by the user computing device 102 for generating and transmitting a link request to a remote server to create a link between a user account associated with the user computing device 102 and a target object. Although any number of systems, in whole or in part, can implement the method 4600, to simplify discussion, the method 4600 will be described as being performed by the user computing device 102.

At block 4602, the user computing device 102 generates, using a camera module of the user computing device 102, a user image depicting a target object. For example, the user application running on the user computing device 102 may provide a user interface for capturing a photograph (also referred to herein as user image), and the user may point the camera of the user computing device 102 at the house that he or she is interested in and capture a photograph of the exterior of the house from the sidewalk. The captured photograph may be stored in the user computing device 102.

In some implementations, instead of capturing a photograph via the user application and automatically selecting the photograph for submission, the user application may provide a user interface for selecting an existing photograph that was previously taken and stored on the user computing device 102. The captured photograph (or previously captured and stored photograph) may include geographical identification metadata (e.g., geotag information) that can be used to identify the geographical location where the photograph was taken. Although some implementations described herein refer to photographs or images of target objects (e.g., houses) being captured and/or submitted, the embodiments are not limited as such, and in some other implementations, other forms of media such as videos may be used additionally or alternatively. For example, the user may capture a video of a house, and submit a link request along with the captured video via a mobile application installed on the user's smartphone. In such an example, one or more images extracted from the video can be used to perform the image comparison and/or verification techniques described herein.

At block 4604, the user computing device 102 detects, using a GPS module of the user computing device 102, a GPS location associated with the user computing device 102. Alternatively or additionally, the user computing device 102 may extract the location information from the photograph selected by the user. Using the GPS location of the user computing device (or the location information extracted from the photograph), the user computing device 102 may output one or more suggestions of target objects for user selection. For example, based on the GPS coordinates, the user computing device 102 may determine that the user is standing right next to (or the photograph was taken right next to) "1234 Palm Drive, Atlanta, GA 30319." The user computing device 102 may output the street address on the display of the user computing device 102 for user confirmation. In some cases, the user computing device 102 may output multiple addresses for user selection. For example, the user computing device 102 may output both "1234 Palm Drive, Atlanta, GA 30319" and "1235 Palm Drive, Atlanta, GA 30319" based on both of the street address being within a threshold level of proximity from the GPS coordinates of the user computing device 102 (or from the location at which the previously stored photograph was originally taken). The user computing device 102 may identify the street address(es) by querying public or private databases such as via the GOOGLE MAPS™ mapping service. For example, the user computing device 102 may determine one or more lots, plots, tracts, or parcels of land based on the current location of the user computing device 102 and/or the location information (e.g., geotag information) embedded in or associated with a photograph selected for submission to the remote server, and/or determine one or more street addresses associated with the determined lots, plots, tracts, or parcels of land. The mobile application running on the user computing device 102 may cause the one or more lots, plots, tracts, or parcels of land and/or the one or more addresses to be outputted for user selection. The mobile application may output any number of such addresses or lots, plots, tracts, or parcels of land based on the location of the user computing device 102 and/or the location information embedded in or associated with the selected photograph. For example, the mobile application may output the closest street address or lot, plot, tract, or parcel of land. As another example, the mobile application may output multiple (e.g., 2, 3, 4, etc.) street addresses or lots, plots, tracts, or parcels of land based on (i) whether they are adjacent to the location of the user computing device 102 and/or the location information embedded in or associated with the selected photograph, (ii) whether they are within a threshold distance from the location of the user computing device 102 and/or the location information embedded in or associated with the selected photograph, and/or (iii) whether they satisfy another threshold proximity condition based on the location of the user computing device 102 and/or the location information embedded in or associated with the selected photograph.

In some implementations, the target object is the determined lot, plot, tract, or parcel of land, and the target identifier is an identifier associated with such lot, plot, tract, or parcel of land. In such implementations, the user may indicate the target identifier by selecting the lot, plot, tract, or parcel of land (or another lot, plot, tract, or parcel of land near or adjacent to the determined lot, plot, tract, or parcel of land) via a user interface provided by the mobile application installed on the user computing device 102. The user interface may also indicate the current location of the user computing device 102 (or the location embedded in or associated with the selected photograph).

At block 4606, the user computing device 102 receives a user indication of a target object identifier associated with the target object depicted in the user image, wherein the target object identifier is associated with a geographical location that is proximate (e.g., within a threshold level of proximity as described herein) to the detected GPS location. For example, the target object may be a house, and the target object identifier may be the street address of the house. In some implementations, the user inputs the street address into a text field outputted on the display of the user computing device. In other implementations, the user selects a street address from a list or drop-down menu including multiple street addresses identified based on the GPS location detected at block 4604.

At block 4608, the user computing device 102 causes a user account associated with the user computing device 102 to be linked to the target object on a remote storage device. The user computing device 102 may transmit a link request to the user matching system 101, where the link request includes the identity of the user or his or her user account in the user matching system 101, the photograph from block 4602, the location information determined at block 4604, and/or the target object identified at block 4606. For example, the link request may include the user's account ID, a photograph of the house that the user likes, the GPS coordinates of the user's mobile device, and the street address of the house indicated by the user. As another example, the link request may include the user's account ID, the GPS coordinates of the mobile device, and the street address automatically determined based on the GPS coordinates of the mobile device. In other cases, one or more different combinations of the information described herein may be included in the link request. In some implementations, the user computing device 102 may cause a message (e.g., "link request submitted" or "the house has been marked") or animation (e.g., a balloon landing on the front yard of the house) to be outputted on the display of the user computing device 102 confirming that the link request has been submitted (or that the link request has been completed).

In some implementations, there is a temporal gap (e.g., that is greater than a threshold level, such as 5 minutes, 30 minutes, 1 hour, 1 day, 5 days, and so on) between the time at which the photograph included in the link request was taken and the time at which the link request is submitted by the user computing device 102. For example, the user may have taken the photograph of the house while walking through a neighborhood two days ago, and have now decided to submit the link request using the photograph. In some implementations, there is a spatial gap (e.g., that is greater than a threshold level, such as a few meters, 1 mile, 5 miles, 10 miles, 25 miles, and so on) between the location at which the photograph included in the link request was taken and the location at which the link request is submitted by the user computing device 102. For example, the user may have taken the photograph of the house while walking through a neighborhood 5 miles away from her home, and after returning home, have now decided to submit the link request using the photograph. By allowing the user to submit a link request using a photograph that was taken at a different time or location, and not relying solely on the location of the user computing device 102 at the time of submitting the link request to identify target object identifiers or to verify the validity of the link request, the user matching system 101 provides improved user experience (e.g., temporal and spatial flexibility). In some implementations, in response to determining that there is a temporal gap (e.g., by comparing the time at which the link request was submitted and the time at which the photograph of the target object was taken) or a spatial gap (e.g., by comparing the location from which the link request was submitted and the location at which the photograph of the target object was taken), the link request may be sent to a system administrator for approval, and upon system administrator approval, the link may be created. In other implementations, the requested link is created without such approval after determining that there is a temporal gap or a spatial gap. In yet other implementations, the requested link is created without such approval regardless of whether there is a temporal gap or a spatial gap.

In response to the link request, the user matching system 101 may process and verify the link request and cause the user account associated with the user computing device 102 to be linked to the target object in a storage device or database associated with the user matching system 101. The techniques for processing and verifying the link request is described in greater detail below with reference to FIG. 4.

At block 4610, the user computing device 102 causes a notification from another user account associated with the target object (e.g., the owner of the target object) to be outputted on a display of the user computing device 102. For example, the target object linked to the user account (e.g., first user providing the link request) may belong to another user (e.g., second user) of the user matching system 101, and the user matching system 101 may transmit an electronic notification to the second user indicating that another user (e.g., first user providing the link request) has expressed interest in the second user's house (or another property). In response, the second user may wish to send an electronic message to the first user via the user matching system 101. The message may be transmitted to the first user as an electronic notification and outputted on the display of the user computing device 102 of the first user.

Alternatively, the target object linked to the user account may not belong to any other user in the user matching system 101. In such a case, when a new user account is eventually associated with the target object, the user matching system 101 may transmit an electronic notification to the user computing device associated with such new user account, and the new user may choose to communicate with the user linked to his or her house (target object). Then, the user computing device 102 may receive an electronic message from the new user, and cause the message to be outputted on the display of the user computing device 102 as an electronic notification.

In some implementations, one or more blocks may be added to the method 4600. In some implementations, one or more of the blocks shown in FIG. 46 may be omitted or modified. In some cases, block 4606 may be omitted, based on there being only one street address associated with the geographical location of the user computing device 102 (or the geographical location determined based on the geotag information embedded in the photograph selected by the user). As another example, in some implementations, block 4602 is omitted and a photograph is not transmitted along with the link request. In such implementations, the user matching system 101 may verify the link request received from the user computing system 101 by using information other than a photograph (or any geographical information that would have been embedded therein).

Link Request Processing and Notification Transmission Routine

Figure 47:
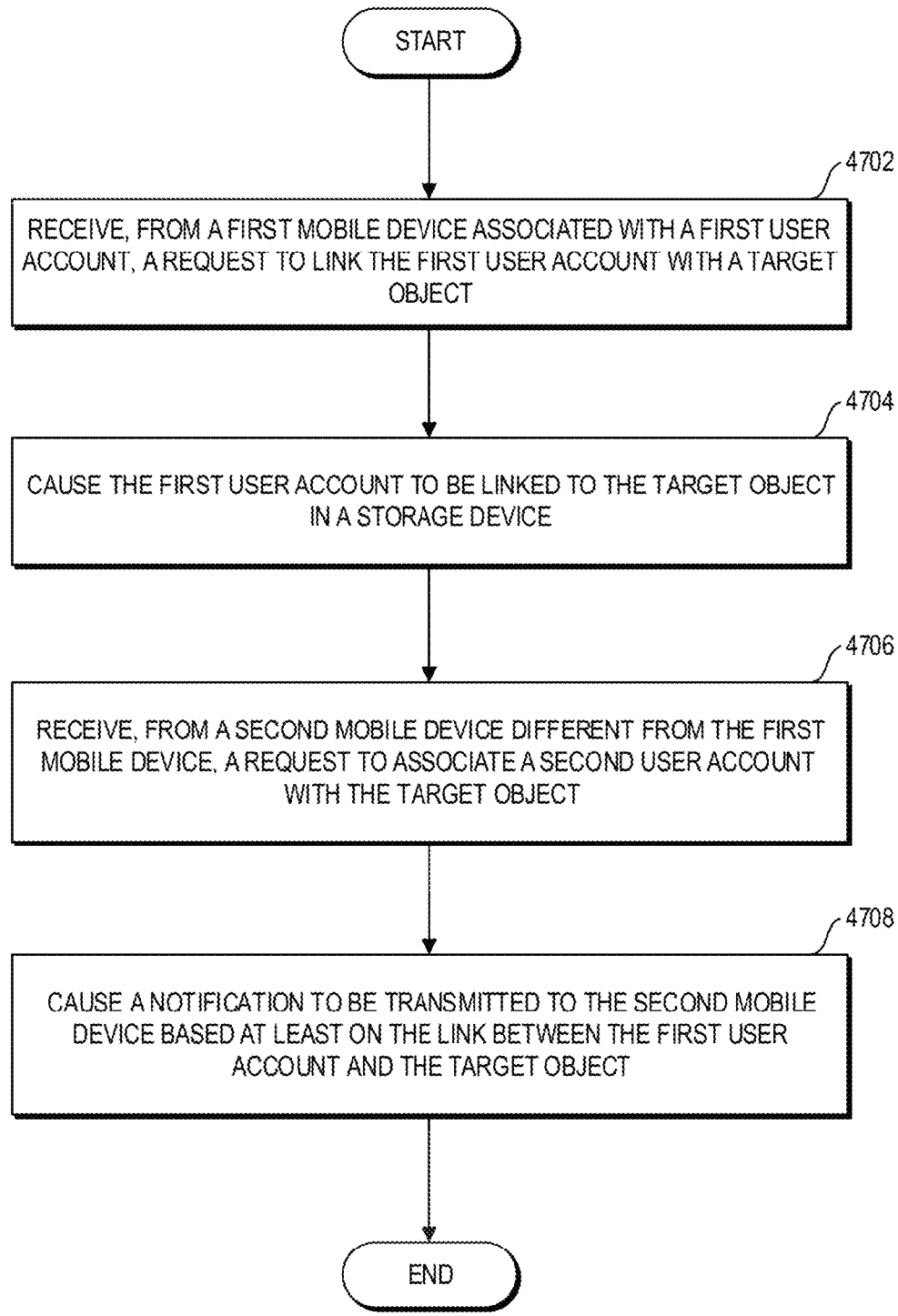
FIG. 47 is a flow diagram illustrating an example routine for processing a link request from a user computing device and transmitting a notification to another user computing device in accordance with aspects of the present disclosure.

FIG. 47 is a flow diagram of an illustrative method 4700 implemented at least in part by the user matching service 150 for creating links based on link requests received from the user computing devices 102, and transmitting electronic notifications to the user computing devices 102 based on the created links. Although any number of systems, in whole or in part, can implement the method 4700, to simplify discussion, the method 4700 will be described as being performed by the user matching service 150.

At block 4702, the user matching service 150 receives, from a first mobile device associated with a first user account (also referred to as the first user in this example), a link request to link the first user account with a target object. For example, as discussed with reference to FIG. 3, the link request may include the identity of the user or the user's account in the user matching system 101, a photograph depicting the target object (e.g., a house), the location information associated with the first mobile device and/or the photograph, and/or an identifier associated with the target object (e.g. the street address of the house).

Based on the information included in the link request, the user matching service 150 may verify that the link request is valid. To do so, the user matching service 150 may query a public or private database to determine whether the location information included in the link request is within a threshold level of proximity to the location information associated with the target object identifier (e.g., the street address). For example, the user matching service 150 may query the GOOGLE MAPS™ mapping service to determine the GPS coordinates associated with the street address provided in the link request and determine whether the two sets of GPS coordinates are within a threshold level of proximity (e.g., within 10 meters). If the two sets of GPS coordinates are within the threshold level of proximity, the method 4700 may proceed to block 4704. Otherwise, the user matching service 150 may deny or reject the link request. The user matching service 150 may use the GPS coordinates of the first mobile device at the time the link request is submitted, or the location information embedded in the photograph included in the link request. In some cases, the user matching service 150 may conduct one verification using the GPS coordinates of the first mobile device and another verification using the location information embedded in the photograph, and proceed to block 4704 only if one or both of the verifications are completed successfully (e.g., the two locations being within the threshold level of proximity). In some implementations, the user matching service 150 uses the GPS coordinates of the first mobile device (or the GPS coordinates associated with the photograph) to determine one or more addresses at or in the vicinity of the GPS coordinates. Then, the user matching service 150 may verify that the street address provided in the link request matches one of the determined addresses.

Additionally or alternatively, the user matching service 150 may compare the photograph included in the link request to the image of the house at the street address available on a public or private database such as via the GOOGLE MAPS™ mapping service. For example, the user matching service 150 may perform an image comparison between the photograph and the GOOGLE MAPS™ mapping service image of the house at the street address included in the link request, and determine whether there is a threshold level of similarity. The image comparison may include inputting both the photograph and the image of the house into an image classifier configured to receive an image as input and output one or more values indicative of the characteristics of the inputted image, and comparing the output values associated with the photograph and the image of the house. In other implementations, another image comparison algorithm may be used, such as pixel-by-pixel comparison, feature detection and matching, and the like. If the two images have at least a threshold level of similarity, the user matching service 150 may proceed to block 4704. Otherwise, the user matching service 150 may deny or reject the link request. In some implementations, the verification process described with reference to block 4702 may be performed on the first mobile device (e.g., user computing device 102) only, on the user matching system 101 only, or both.

Although the example of FIG. 47 is described as allowing a user to submit a link request and verifying that the integrity of the link request using the GPS coordinates, the address, and/or the photograph, in some other implementations, some or all of the verification may occur prior to the link request being submitted to the user matching service 150. For example, the first mobile device may be presented with one or more addresses based on the current location of the first mobile device (or the location associated with the photograph), and the first user may not be able to select any address other than those presented on the first mobile device. Further, in some implementations, instead of denying a link request in the event of a mismatch, the user matching service 150 may approve the link request and provide an indication of the mismatch (e.g., a distance between the target object and the location from which the link request was submitted or the location associated with the photograph, an indication that the link request did not satisfy a threshold level of geographical proximity, an image similarity metric indicating a similarity between the user-submitted photograph and the photograph associated with the target object, an indication that the user-submitted photograph did not satisfy a threshold level of image similarity, etc.). For example, if construction activities have taken place after a mapping service (e.g., GOOGLE MAPS™) captured and stored the photograph of the target object in its database, the user-submitted photograph may look different from the photograph accessed from the GOOGLE MAPS™ database. In such an example, the user matching service 150 may still approve the link request but provide an indication that the user-submitted photograph did not match the photograph of the target object obtained from the GOOGLE MAPS™ database.

At block 4704, the user matching service 150 causes the first user account to be linked to the target object in the storage device. In some cases, the user matching service 150 can add linking information (or modify existing linking information) to the storage device to indicate that the first user account is linked to the target object. For example, the user matching service 150 associates the first user account with the target object in a database such that the user matching system 101 can query the database to retrieve all user accounts associated with a given target object and/or query the database to retrieve all target objects associated with a given user account. In some cases, other techniques for associating the user account and the target object may be used (e.g., using tags, identifiers, and the like).

In some implementations, the created links are visible to the users associated with the links. For example, if User A is linked to Target Objects X, Y, and Z, and User B is linked to Target Objects P, Q, and Z, User A may be able to see that Target Objects X, Y, and Z are linked to his or her user account, but unable to see that Target Objects P, Q, and Z are linked to User B. In other implementations, a user may be able to see not only his or her links, but all other links created in the user matching system 101. In such implementations, in the example above, User A may be able to see that Target Objects X, Y, and Z are linked to his or her user account and also see that Target Objects P, Q, and Z are linked to User B. In yet other implementations, a user may be able to see not only his or her links, but all other links created for the target objects to which he or she is linked. In such implementations, in the example above, User A may be able to see that Target Objects X, Y, and Z are linked to his or her user account and also see that Target Object Z is linked to User B (based on User A being linked to Target Object Z), but unable to see that Target Objects P and Q are linked to User B.

As described herein, in some implementations, a user can create or request multiple, distinct links to different target objects. In other implementations, a user can create or request multiple, distinct links to different target objects up to a limit set by the user matching system 101. For example, the user may need to request the user matching service 150 to increase the limit once the limit has been reached. This limit may be user-specific and different users may be associated with different limits. Further, a single user may be associated with multiple target objects (e.g., the user may own multiple houses, and one user of the user matching system 101 may request to be linked to one of such houses, and another user of the user matching system 101 may request to be linked to another one of such houses.

Additionally or alternatively, a user may be able to see not only the links created or requested by the user, but also one or more other links for which the user is given permission to view by the creator or requestor of such links. For example, the user matching service 150 may provide, on the user computing device 102, a user interface for giving another user permission (e.g., by selecting said another user from a list of users, inputting said another user's email address, etc.) to view and/or modify the links. In some implementations, the user being given the permission to view and/or modify the links is a spouse or a co-searcher of the user giving the permission to view and/or modify the links. In some implementations, the user being given the permission to view and/or modify the links is a fellow potential buyer of the target object to which the user is linked. In some implementations, the user giving the permission to view and/or modify the links is the owner(s) of the target object(s) to which the user is linked. In some of such implementations, the owner(s) of the target object(s) may be automatically given the permission to view and/or modify any links to the target object(s).

In some implementations, the links described herein may be visible on a map (e.g., as icons placed over the locations of the houses that are linked). Alternatively or additionally, the links may be visible in an augmented reality (AR) (e.g., as icons superimposed on images of the houses in a street view captured by the camera of the user computing device 102).

At block 4706, the user matching service 150 receives, from a second mobile device different from the first mobile device, a request to associate a second user account (also referred to as the second user in this example) with the target object. For example, a new user may register for a user account on the user matching system 101 and claim the street address associated with the target object that was previously linked to the first user account, as his or her own home address. In some implementations, in response to a user's indication that the home at a particular street address belongs to the user, a request to register the street address as the user's home may be sent to a system administrator for approval, and upon system administrator approval, the user matching system 101 registers the street address with the user (e.g., in the data repository 140, the user may be listed as the owner of the home at the street address and/or the street address may be added to the user's profile/account). In other implementations, in response to a user's indication that the home at a particular street address belongs to the user, the user's account information is compared to information in an ownership registry, and upon determining that the user is the owner of the home at the particular street address, the user matching system 101 registers the street address with the user. In yet other implementations, in response to a user's indication that the home at a particular street address belongs to the user, the user matching system 101 determines whether the home at the particular street address has already been registered with another user of the user matching system 101, and if not, the user matching system 101 registers the street address with the user without further approval by a system administrator or comparison to an ownership registry. If the user matching system 101 determines that the home at the particular street address has already been registered with another user of the user matching system 101, the user matching system 101 may request system administrator approval and/or compare the user's account information to an ownership registry, and based on the results of the approval and/or comparison, update the owner of the home in the data repository 140.

At block 4708, the user matching service 150 causes a notification to be transmitted to the second mobile device based at least on the link between the first user account and the target object. For example, the user matching service 150 transmits the notification to the second mobile device based at least on the storage device storing the linking information between the target object and the first user account. The notification may include information associated with the first user account (e.g., the first user account's profile and/or preference information). Advantageously, the new user receives the notification (or multiple notifications) based on the one or more links previously created on the user matching system 101. Further, the automatic generation and transmission of notifications is limited to those links that have been verified using the locations and/or the photographs associated with the link requests, thereby ensuring that the user matching system 101 and/or the second mobile device are not overloaded.

In some implementations, in response to the linking of the first user account and the target object, one or more images of the target object submitted by the second user prior to the linking may be inputted into the first user's preference model for presentation to the second user. The notification transmitted to the second mobile device may include the result of inputting the images submitted by the second user into the first user's preference model (e.g., one or more metrics that indicate a degree of match between the target object of the second user and the various characteristics of the first user). Additionally, the notification may include indications of the first user's resource limitations, timeline, location, and the like. In other implementations, in response to the linking of the first user account and the target object, one or more images of the target object submitted by the first user may be inputted into the first user's preference model for presentation to the second user. The notification transmitted to the second mobile device may include the result of inputting the images submitted by the first user into the first user's preference model (e.g., one or more metrics that indicate a degree of match between the target object of the second user and the various characteristics of the first user). Additionally, the notification may include indications of the first user's resource limitations, timeline, location, and the like.

The preference model of a user may be generated using various machine learning algorithms. For example, the user may be presented with a series of images and asked to provide an input on each image. Based on the user's input, the user matching system 101 (or another system) can generate the user's preference model configured to take an image as input and output one or more parameters indicative of a degree of match between the user's preferences and the characteristics of the inputted image. Some non-limiting examples of such algorithms that can be used to generate and update the preference models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron) or convolutional neural network algorithms, deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some implementations, one or more blocks may be added to the method 4700. In some implementations, one or more of the blocks shown in FIG. 47 may be omitted or modified. For example, if another user has already claimed the target object (e.g., by identifying the street address associated with the target object as being the user's property), block 4706 may be omitted and the notification may be transmitted to the mobile device of such user at block 4708.

As another example, although the examples of FIGS. 46 and 47 describe that a photograph depicting the target object is included in the link request, in other implementations, multiple photographs depicting the target object (e.g., from different angles) may be included in the link request. In such implementations, the verification techniques described herein (e.g., verifying that the location associated with the photograph is within a threshold level of proximity from the target object, verifying that the photograph exhibits a threshold level of image similarity compared to the image of the target object, etc.) may be performed for each of the photographs included in the link request. Alternatively, such verification techniques may be performed for only one of the photographs included in the link request. In yet other cases, one or more of such verification techniques may be performed on all of the photographs, and one or more other verification techniques may be performed on only one of the photographs. Based on the verification results, a single link is created between the requesting user and the target object despite the link request including multiple photographs. Alternatively, multiple links may be created between the requesting user and the target object based on the link request including multiple photographs. For example, when the user has captured and submitted two photographs of the target object from two different angles, two links may be created between the user and the target object. In some cases, when the two links are presented via a user interface on the user computing device 102, the two links may be grouped together under a single user interface element that can be expanded upon activation (e.g., the user clicking on the user interface element).

Overview of User Computing Device

Figure 48:
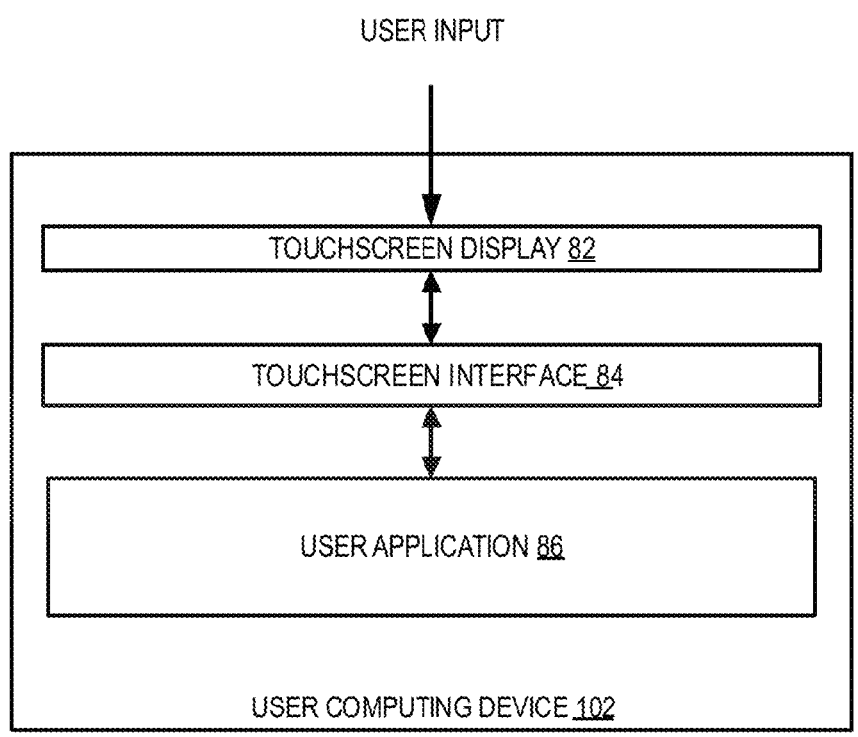
FIG. 48 illustrates an implementation of a user computing system in accordance with aspects of the present disclosure.

FIG. 48 illustrates an example user computing device 102. As illustrated, the user computing device 102 may be a single computing device that can include a number of elements. However, in some cases, the user computing device 102 may be a computing system that includes multiple devices. For example, such a system may include one device that includes a central processing unit and a graphics processing unit, another device that includes a display, and another device that includes an input mechanism, such as a keyboard or mouse.

In the non-limiting example of FIG. 48, the user computing device 102 is a touch-capable computing device capable of receiving input from a user via a touchscreen display 82. However, the user computing device 102 is not limited as such and may include non-touch capable implementations, which do not include the touchscreen display 82. For example, the user computing device 102 may include a microphone and voice-activated user interfaces. In FIG. 48, the user computing device 102 includes a touchscreen display 82 and a touchscreen interface 84, and is configured to execute a user application 86. The user application 86 may execute on the user computing device 102 to perform the various techniques described herein. For example, the user application 86 may include programming routines and/or modules configured to perform one or more of the tasks described herein such as outputting training photographs for presentation to a first user, receiving indications of the first user's preferences for the training photographs, generating a preference profile for the first user (e.g., based on tags or attributes associated with the training photographs), receiving a user photograph from a second user, determining the location associated with the user photograph, determining that the location is proximate to a home registered as being owned by the second user, determining tags or attributes associated with the user photograph, generating a profile for the second user and/or the second user's home, determining a match between the first user and the second user based on a comparison of their preference profiles (or a match between the first user and the second user's home), capturing a photograph, specifying a target object, generating and transmitting a link request to a remote server, receive or transmit electronic notifications to the remote server and/or mobile devices of other users, and/or other aspects discussed herein or illustrated in FIGS. 1-56. While the user computing device 102 includes the touchscreen display 82, it is recognized that a variety of input devices may be used in addition to or in place of the touchscreen display 82.

The user computing device 102 can include one or more processors, such as central processing units (CPUs), graphics processing units (GPUs), and/or accelerated processing units (APUs). Further, the user computing device 102 may include one or more data storage elements. In some implementations, the user computing device 102 may be a general purpose computing device capable of executing the user application 86 and other applications. For example, the user computing device 102 may be a smartphone with an integrated touchscreen display. Components of an example implementation of the user computing device 102 are described in more detail with respect to FIG. 49.

The touchscreen display 82 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 82. The touchscreen interface 84 can be configured to translate the touch input into data and output the data such that the outputted data can be interpreted by components of the user computing device 102, such as an operating system and the user application 86. Some example characteristics of a touch input can include, shape, size, pressure, location, direction, momentum, duration, and/or other characteristics. The touchscreen interface 84 can be configured to determine the type of touch input, such as, for example a tap (for example, touch and release at a single location) or a swipe (for example, movement through a plurality of locations on touchscreen in a single touch input). The touchscreen interface 84 can be configured to detect and output touch input data associated with multiple touch inputs occurring simultaneously or substantially in parallel. In some cases, the simultaneous touch inputs may include instances where a user maintains a first touch on the touchscreen display 82 while subsequently performing a second touch on the touchscreen display 82. The touchscreen interface 84 can be configured to detect movement of the touch inputs. The touch input data can be transmitted to components of the user computing device 102 for processing. For example, the touch input data can be transmitted directly to the user application 86 for processing.

In some implementations, the touch input data can undergo processing and/or filtering by the touchscreen interface 84, an operating system, or other components prior to being output to the user application 86. As one example, raw touch input data can be captured from a touch input. The raw data can be filtered to remove background noise, pressure values associated with the input can be measured, and location coordinates associated with the touch input can be calculated. The type of touch input data provided to the user application 86 can be dependent upon the specific implementation of the touchscreen interface 84 and the particular application programming interface (API) associated with the touchscreen interface 84. In some implementations, the touch input data can include location coordinates of the touch input. The touch signal data can be output at a defined frequency. Processing the touch inputs can be computed many times per second and the touch input data can be output to the user application 86 for further processing.

The user application 86 can be configured to be executed on the user computing device 102. The user application 86 might comprise software code that informs the user computing device 102 of processor instructions to execute, but might also include data used in the navigating the user application 86, such as data relating to constants, parameters, images, and other data structures.

Example Hardware Configuration of User Computing Device

Figure 49:
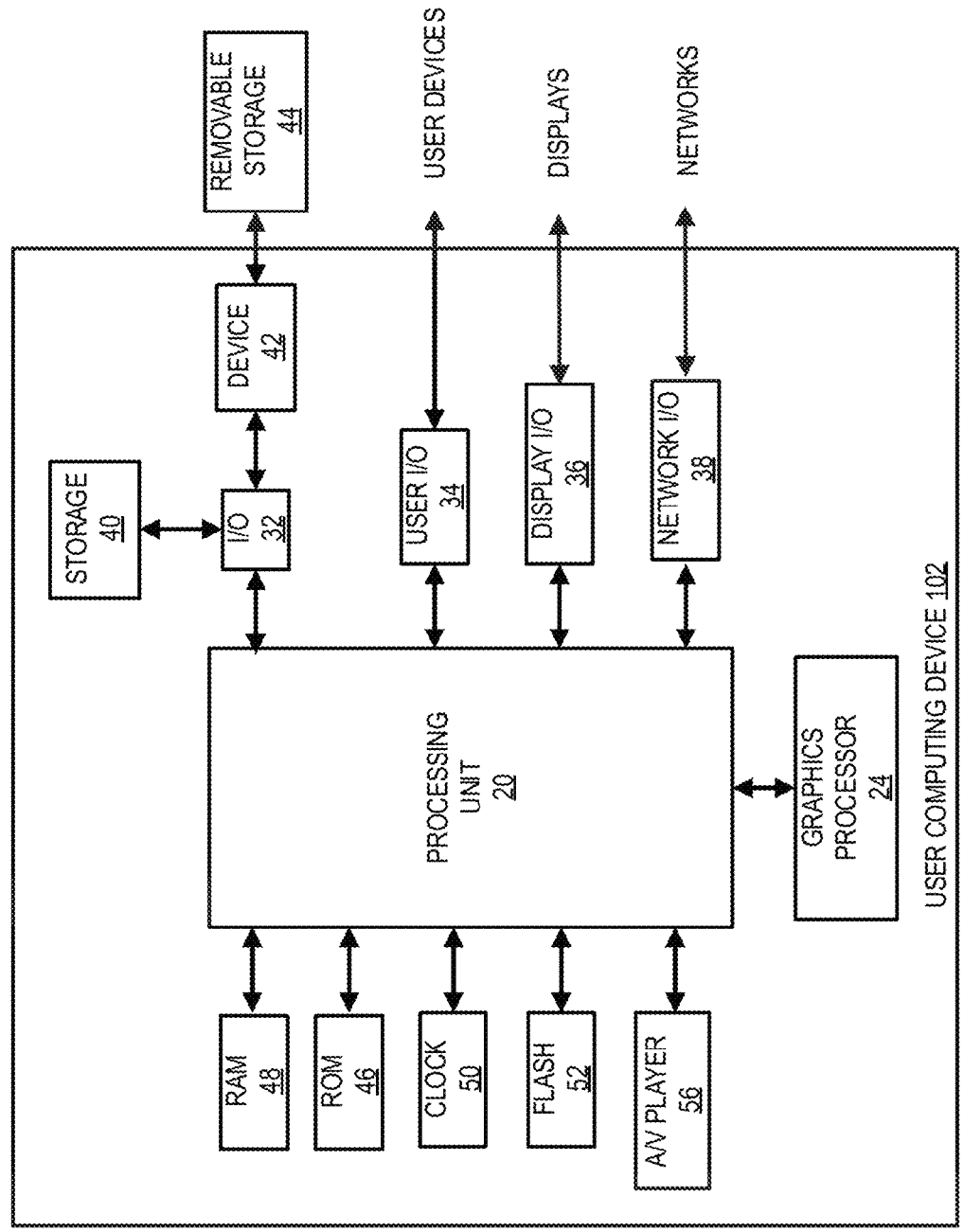
FIG. 49 illustrates an implementation of a hardware configuration for the user computing system of FIG. 48 in accordance with aspects of the present disclosure.

FIG. 49 illustrates an example hardware configuration for the user computing device 102 of FIG. 48. Other variations of the user computing device 102 may be substituted for the examples explicitly presented herein, such as removing or adding components to the user computing device 102. The user computing device 102 may include a smartphone, a tablet, a personal computer, a desktop, a laptop, a smart television, a car console display, and the like. Further, although not explicitly illustrated in FIG. 49, the user computing device 102 may optionally include a touchscreen display 82 and a touchscreen interface 84 as described with respect to FIG. 48.

As shown, the user computing device 102 includes a processing unit 20 that interacts with other components of the user computing device 102 and also components external to the user computing device 102. The user computing device 102 may include a separate graphics processor 24. In some cases, the graphics processor 24 may be built into the processing unit 20, such as with an accelerated processing unit (APU). In some such cases, the graphics processor 24 may share random-access memory (RAM) with the processing unit 20. Alternatively, or additionally, the user computing device 102 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard, which is sometimes referred to as an on-board graphics chip or device.

The user computing device 102 also includes various components for enabling input/output, such as an I/O 32, a user I/O 34, a display I/O 36, and a network I/O 38. As previously described, the input/output components may, in some cases, include touch-enabled devices. The I/O 32 interacts with storage 40 and, through a device 42, removable storage media 44 in order to provide storage for the user computing device 102. The processing unit 20 can communicate through the I/O 32 to store data. In addition to the storage 40 and the removable storage media 44, the user computing device 102 is also shown as including read-only memory (ROM) 46 and RAM 48. The RAM 48 may be used for data that is accessed frequently, for example, when the user application 86 is running.

The user I/O 34 is used to send and receive commands between the processing unit 20 and user computing devices. In some implementations, the user I/O 34 includes touchscreen inputs. As previously described, the touchscreen can be a capacitive touchscreen, a resistive touchscreen, or other type of touchscreen technology that is configured to receive user input through tactile inputs from the user. The display I/O 36 provides input/output functions that are used to display images. The network I/O 38 is used for input/output functions for a network. The network I/O 38 may be used during execution of a user application, such as when submitting a request (e.g., a search request, a link request, etc.), receiving electronic notifications and/or other data (such as the user images and location information) from a remote server, or transmitting electronic notifications and/or other data (such as the user images and location information) to the remote server.

Display output signals may be produced by the display I/O 36 and can include signals for displaying visual content produced by the user computing device 102 on a display device, such as graphics, user interfaces, video, and/or other visual content. The user computing device 102 may comprise one or more integrated displays configured to receive display output signals produced by the display I/O 36, which may be outputted for display to a user. According to some implementations, display output signals produced by the display I/O 36 may also be outputted to one or more display devices external to the user computing device 102.

The user computing device 102 can also include other features that may be used with the user application 86, such as a clock 50, flash memory 52, and other components. An audio/video player 56 might also be used to play a video sequence, such as a movie. It should be understood that other components may be provided in the user computing device 102 and that a person skilled in the art will appreciate other variations of the user computing device 102. Although not illustrated in FIGS. 48 and 49, the user computing device 102 may include or be connected to one or more camera modules for generating and storing photographs depicting target objects.

Program code can be stored in the ROM 46, the RAM 48, or the storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in the storage 40, and/or on removable media. In general, program code can be found embodied in a tangible non-transitory signal-bearing medium.

The RAM 48 (and possibly other storage) is usable to store variables and other application and processor data as needed. Data from the storage 40, the ROM 46, servers accessed via a network (not shown), or the removable storage media 46 may be read and loaded into the RAM 48. Although data is described as being found in the RAM 48, it will be understood that data does not have to be stored in the RAM 48 and may be stored in other memory accessible to the processing unit 20 or distributed among several media.

Additional User Interface Screenshots

Figure 50:
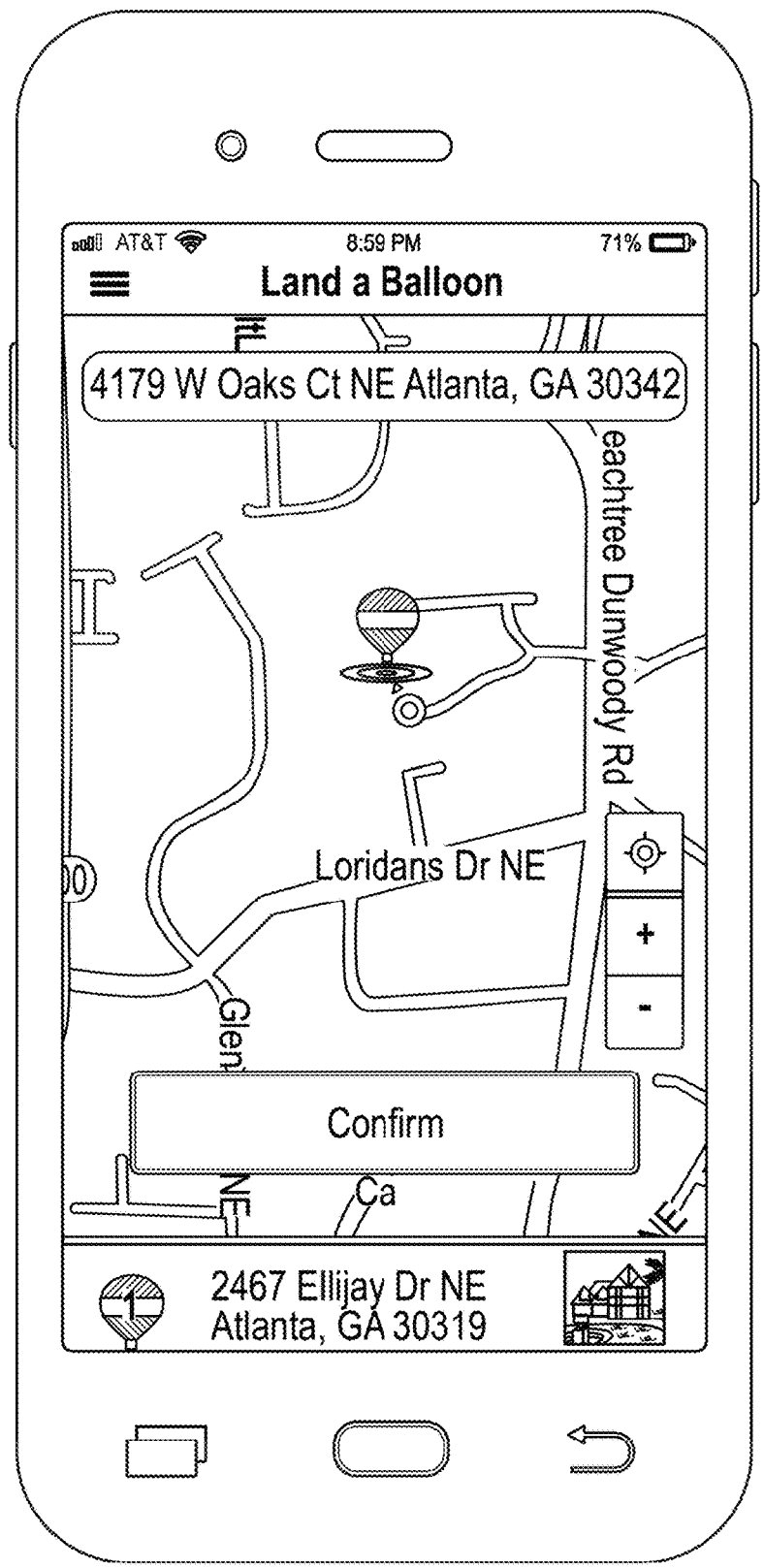
FIGS. 50-56 are additional example user interfaces used for establishing a link between a user and a target object in accordance with aspects of the present disclosure.
Figure 51:
Figure 52:
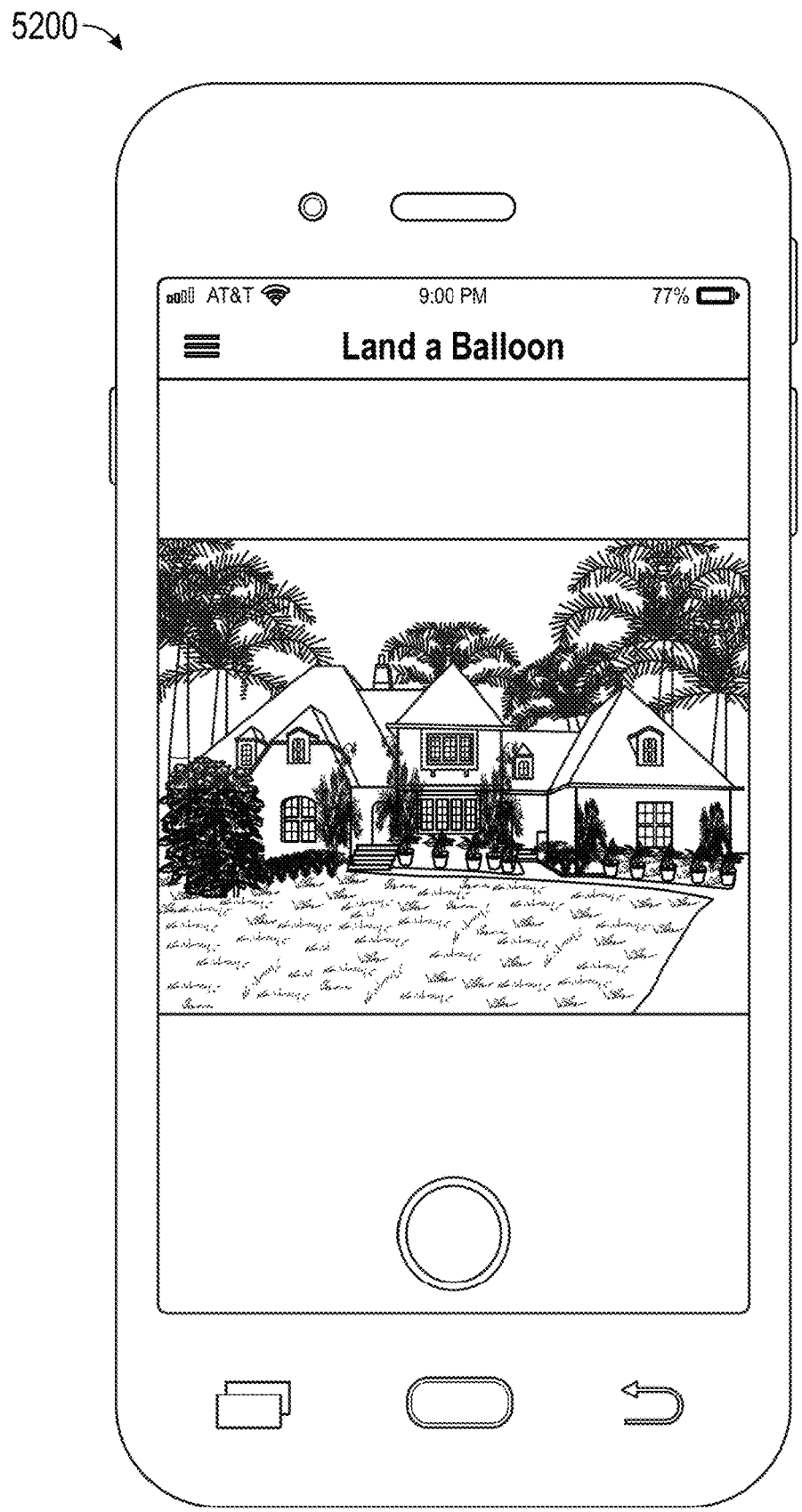
Figure 53:
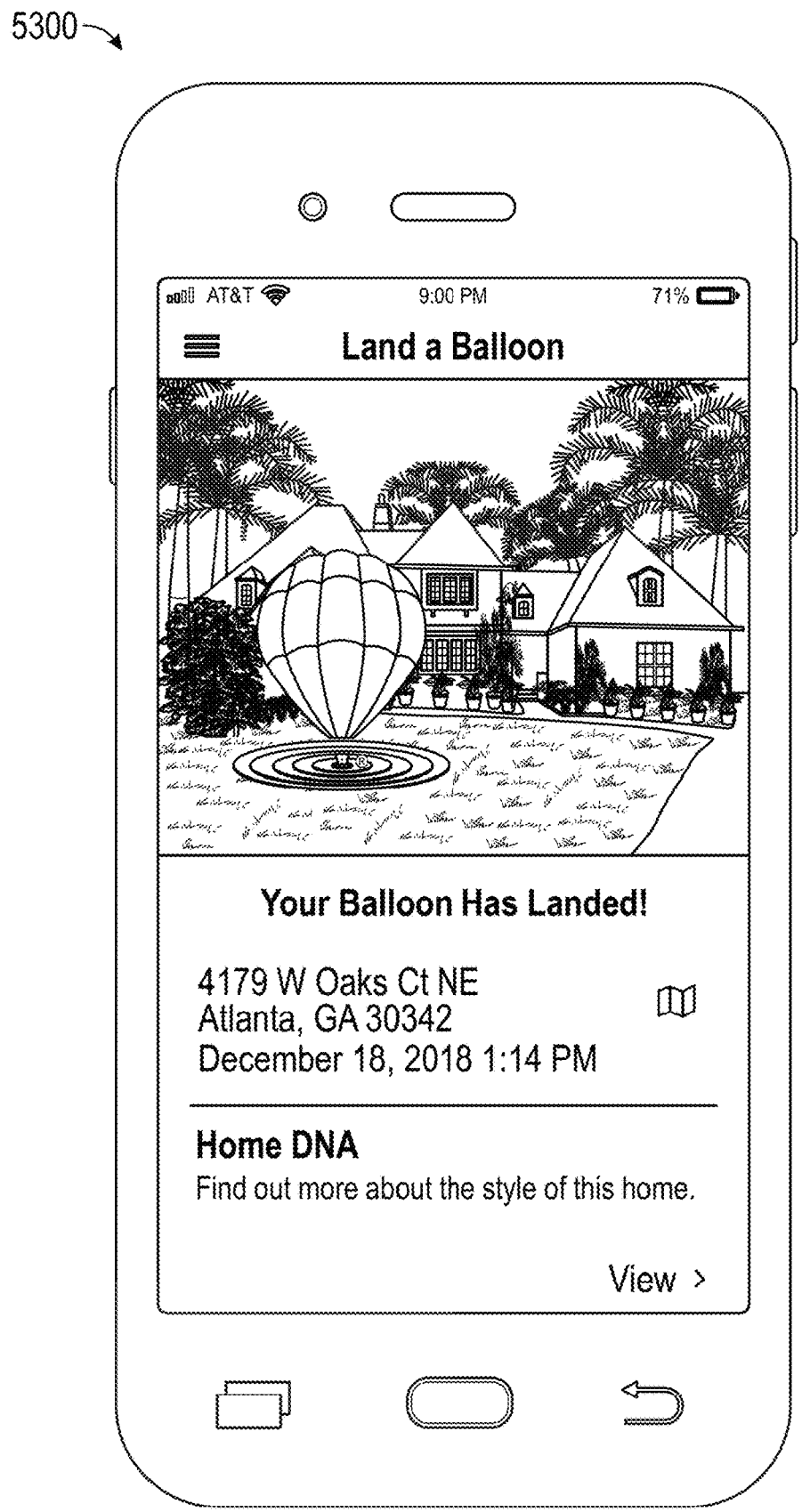
Figure 54:
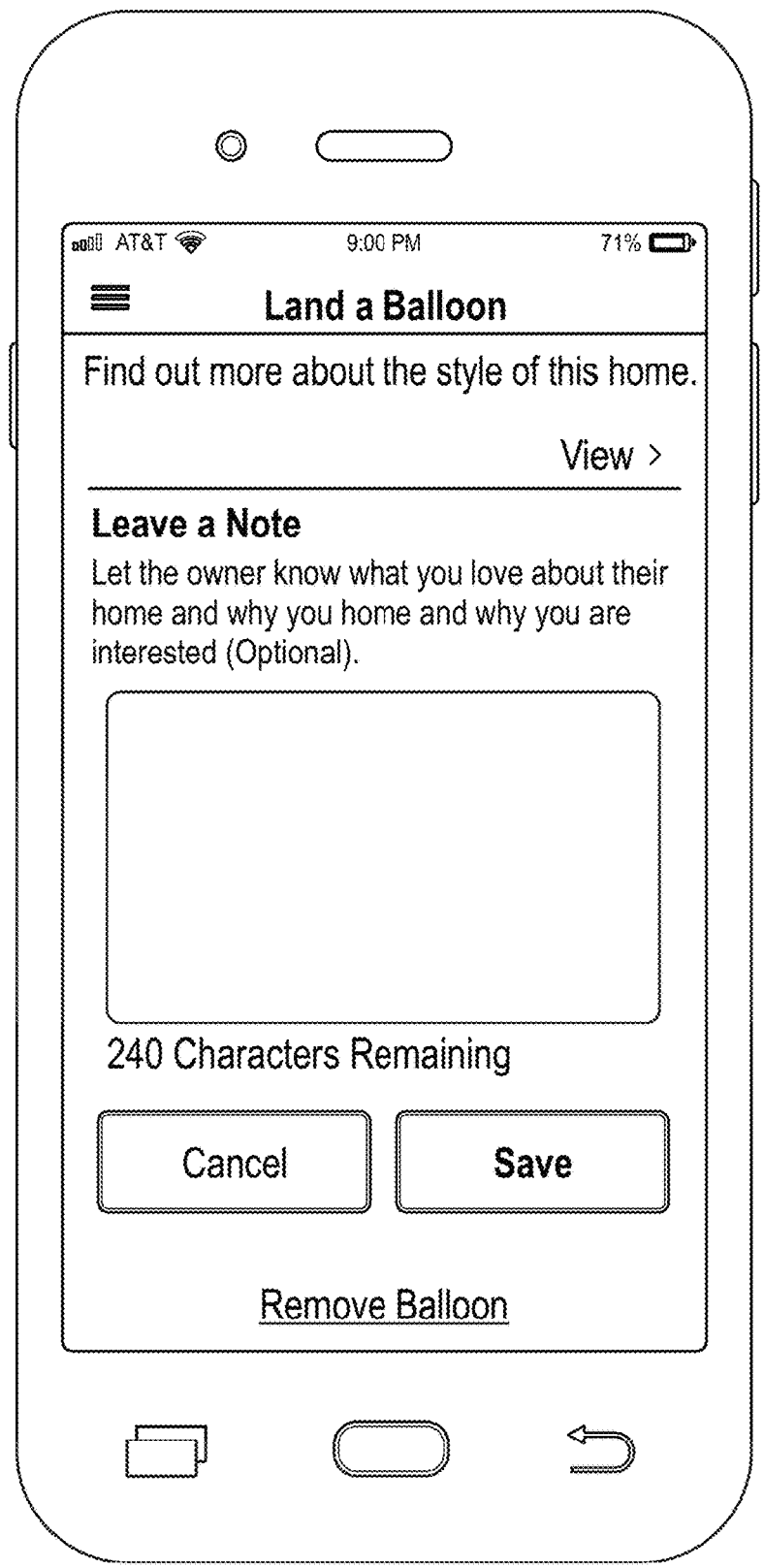
Figure 55:
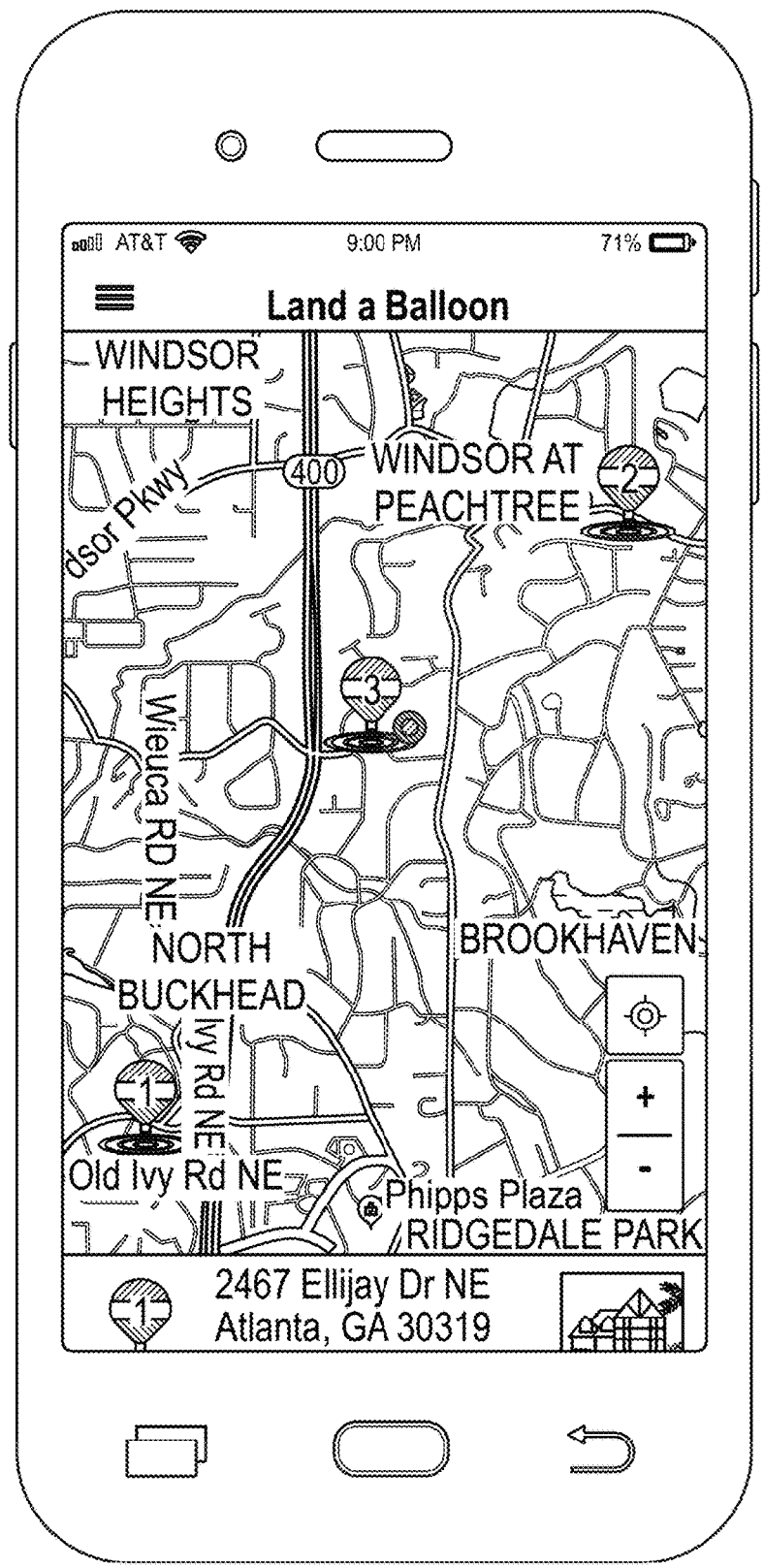

FIGS. 50-56 show additional example user interfaces 5000-5600 used for establishing a link between a user and a target object in accordance with aspects of the present disclosure. For example, as shown in FIG. 50, a user may be presented with a user interface that allows the user to specify at which map location and/or at which street address to land a "balloon," which can be a graphical illustration of the link created on the user matching system 101. The user may be able to land a balloon (or request and/or create a link) with a photo or without a photo, as illustrated in FIG. 51 and as described herein. As shown in FIGS. 52 and 53, the user may capture a photo of the house, and a balloon may be landed on the house. Further, as shown in FIG. 54, the user may, after landing the balloon, leave a message to be transmitted to the owner of the house (e.g., immediately, once the owner of the house creates an account on the user matching system

101, or once an existing user lists the house as his or her house). The balloons landed by the user may be visible on a map view (FIG. 55) and/or a list view (FIG. 56). Although the examples described herein uses the analogy of landing a balloon, other examples (e.g., planting a "flag" in the front yard) may be used.

Example Clauses

Various examples and implementations of the present disclosure can be defined by the following non-limiting clauses:

Clause 1: A mobile device comprising: one or more processors; a display in communication with the one or more processors; a location determination module in communication with the one or more processors and configured to receive a signal indicative of a location of the mobile device; a camera module in communication with the one or more processors and configured to generate images; one or more memories storing computer-executable instructions, which, when executed by the one or more processors, configure the one or more processors to: generate, using the camera module, a user image depicting a target object; determine, using the location determination module, a location associated with the mobile device; output one or more target object identifiers for user selection based on the location associated with the mobile device; receive a user selection of a particular target object identifier of the one or more target object identifiers, wherein the particular target object identifier is associated with the target object depicted in the user image, and wherein the particular target object identifier is associated with a geographical location that is proximate to the location associated with the mobile device; cause linking information between a first user account associated with the mobile device and the target object to be stored on a remote storage device; and cause a notification to be outputted on the display of the mobile device, wherein the notification comprises information associated with a second user account that is associated with the target object.

Clause 2: The mobile device of Clause 1, wherein the computer-executable instructions, when executed, further configure the one or more processors to select the one or more target object identifiers from a plurality of target object identifiers based on the one or more target object identifiers each being associated a geographical location that is proximate to the location associated with the mobile device.

Clause 3: The mobile device of Clause 1, wherein the particular target object identifier comprises a street address associated with the target object.

Clause 4: The mobile device of Clause 1, wherein the location associated with the mobile device is different from a current location associated with the mobile device when the linking information is stored on the remote storage device.

Clause 5: The mobile device of Clause 1, wherein the notification comprises an electronic message sent from the second user account to the first user account.

Clause 6: The mobile device of Clause 1, wherein the target object is linked to one or more other user accounts prior to the linking information being stored on the remote storage device.

Clause 7: A method comprising: generating a user image depicting a target object; determining a location associated with a mobile device; outputting one or more target object identifiers for user selection based on the location associated with the mobile device; receiving a user selection of a particular target object identifier of the one or more target object identifiers, wherein the particular target object identifier is associated with the target object depicted in the user image, and wherein the particular target object identifier is associated with a geographical location that is proximate to the location associated with the mobile device; storing linking information between a user account associated with the mobile device and the target object on a remote storage device; and outputting a notification on the display of the mobile device, wherein the notification comprises information associated with another user account that is associated with the target object.

Clause 8: The method of Clause 7, further comprising selecting the one or more target object identifiers from a plurality of target object identifiers based on the one or more target object identifiers each being associated a geographical location that is proximate to the location associated with the mobile device.

Clause 9: The method of Clause 7, wherein the particular target object identifier comprises a street address associated with the target object.

Clause 10: The method of Clause 7, wherein the location associated with the mobile device is different from a current location associated with the mobile device when the linking information is stored on the remote storage device.

Clause 11: The method of Clause 7, wherein the notification comprises an electronic message sent from the second user account to the first user account.

Clause 12: The method of Clause 7, wherein the target object is linked to one or more other user accounts prior to the linking information being stored on the remote storage device.

Clause 13: Non-transitory physical computer storage storing instructions that, when executed by one or more processors of a computing device, configure the one or more processors to: generate, using a camera module of the computing device, a user image depicting a target object; determine, using a location determination module of the computing device, a location associated with the computing device; output one or more target object identifiers for user selection based on the location associated with the computing device; receive a user selection of a particular target object identifier of the one or more target object identifiers, wherein the particular target object identifier is associated with the target object depicted in the user image, and wherein the particular target object identifier is associated with a geographical location that is proximate to the location associated with the computing device; cause linking information between a first user account associated with the computing device and the target object to be stored on a remote storage device; and cause a notification to be outputted, wherein the notification comprises information associated with a second user account that is associated with the target object.

Clause 14: The non-transitory physical computer storage of Clause 13, wherein the computer-executable instructions, when executed, further configure the one or more processors to select the one or more target object identifiers from a plurality of target object identifiers based on the one or more target object identifiers each being associated a geographical location that is proximate to the location associated with the computing device.

Clause 15: The non-transitory physical computer storage of Clause 13, wherein the particular target object identifier comprises a street address associated with the target object.

Clause 16: The non-transitory physical computer storage of Clause 13, wherein the location associated with the computing device is different from a current location associated with the computing device when the linking information is stored on the remote storage device.

Clause 17: The non-transitory physical computer storage of Clause 13, wherein the notification comprises an electronic message sent from the second user account to the first user account.

Clause 18: The non-transitory physical computer storage of Clause 13, wherein the target object is linked to one or more other user accounts prior to the linking information being stored on the remote storage device.

Clause 19: A system comprising: a storage device storing linking information associated with a plurality of user accounts and a plurality of target objects; and a computing device configured to: receive, from a first mobile device associated with a first user account, location information corresponding to a target object; determine one or more target object identifiers based on the location information corresponding to the target object; transmit the one or more target object identifiers to the first mobile device; receive, from the first mobile device, a request to link the first user account with the target object, wherein the request includes a photograph depicting the target object and an indication that a particular target object identifier of the one or more target object identifiers transmitted to the first mobile device corresponds to the target object; cause linking information between the first user account and the target object to be stored in the storage device; receive, from a second mobile device different from the first mobile device, a request to associate a second user account with the target object; and based at least on the storage device storing the linking information between the target object and the first user account, cause a notification to be transmitted to the second mobile device, wherein the notification comprises information associated with the first user account.

Clause 20: The system of Clause 19, wherein the computing device is further configured to determine the one or more target object identifiers based on a location associated with each one of the one or more target object identifiers being within a threshold level of proximity to a location associated with the target object.

Clause 21: The system of Clause 19, wherein the request to associate the second user account with the target object is generated in response to an indication from a user associated with the second user account that the user is an owner of the target object.

Clause 22: The system of Clause 19, wherein the notification transmitted to the second mobile device indicates a degree of match between the target object and preference data associated with the first user account.

Clause 23: A method comprising: receiving, from a first mobile device associated with a first user account, location information corresponding to a target object; determining one or more target object identifiers based on the location information corresponding to the target object; transmitting the one or more target object identifiers to the first mobile device; receiving, from the first mobile device, a request to link the first user account with the target object, wherein the request includes a photograph depicting the target object and an indication that a particular target object identifier of the one or more target object identifiers transmitted to the first mobile device corresponds to the target object; storing linking information between the first user account and the target object in the storage device; receiving, from a second mobile device different from the first mobile device, a request to associate a second user account with the target object; and based at least on the storage device storing the linking information between the target object and the first user account, transmitting a notification to the second mobile device, wherein the notification comprises information associated with the first user account.

Clause 24: The method of Clause 23, further comprising determining the one or more target object identifiers based on a location associated with each one of the one or more target object identifiers being within a threshold level of proximity to a location associated with the target object.

Clause 25: The method of Clause 23, wherein the request to associate the second user account with the target object is generated in response to an indication from a user associated with the second user account that the user is an owner of the target object.

Clause 26: The method of Clause 23, wherein the notification transmitted to the second mobile device indicates a degree of match between the target object and preference data associated with the first user account.

Clause 27: A mobile device comprising: one or more processors; a display in communication with the one or more processors; a location determination module in communication with the one or more processors and configured to receive a signal indicative of a location of the mobile device; a camera module in communication with the one or more processors and configured to generate images; one or more memories storing computer-executable instructions, which, when executed by the one or more processors, cause the one or more processors to: generate, using the camera module, a user image depicting a target object associated with a user, wherein the target object is the user's home; determine, using the location determination module, a location associated with the mobile device; determine that a first location associated with the user image depicting the target object is proximate to a second location associated with a home registered on the user's profile; determine one or more attributes associated with the user image; identify a subset of users exhibiting a threshold level of match with respect to the target object depicted in the user image based on a comparison of the one or more attributes to a plurality of user profiles; and cause a ranking of users to be displayed on the display based on the identified subset of users.

Clause 28: The mobile device of Clause 27, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

Clause 29: The mobile device of Clause 27, wherein the computer-executable instructions, when executed, further configured the one or more processors to receive the user's selection of a particular user from the ranking of users, and cause an additional user interface to be outputted, wherein the additional user interface is usable by the user to send an electronic message to the particular user.

Clause 30: The mobile device of Clause 27, wherein the ranking of users indicates, for each respective user in the ranking, a degree of match between the respective user and the target object.

Clause 31: A method comprising: generating, on a mobile device of a user, a user image depicting a target object, wherein the target object is the user's home; determining a location associated with the mobile device; determining that a first location associated with the user image depicting the target object is proximate to a second location associated with a home registered on the user's profile; determining one or more attributes associated with the user image; identifying a subset of users exhibiting a threshold level of match with respect to the target object depicted in the user image by comparing the one or more attributes to a plurality of user profiles; and displaying a ranking of users on a display of the mobile device based on the identified subset of users.

Clause 32: The method of Clause 31, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

Clause 33: The method of Clause 31, further comprising receiving the user's selection of a particular user from the ranking of users, and outputting an additional user interface that is usable by the user to send an electronic message to the particular user.

Clause 34: The method of Clause 31, wherein the ranking of users indicates, for each respective user in the ranking, a degree of match between the respective user and the target object.

Clause 35: Non-transitory physical computer storage storing instructions that, when executed by one or more processors of a computing device, configure the one or more processors to: generate, using a camera module of the computing device, a user image depicting a target object, wherein the target object is the user's home; determine, using a location determination module of the computing device, a location associated with the computing device; determine that a first location associated with the user image depicting the target object is proximate to a second location associated with a home registered on the user's profile; determine one or more attributes associated with the user image; identify a subset of users exhibiting a threshold level of match with respect to the target object depicted in the user image by comparing the one or more attributes to a plurality of user profiles; and cause a ranking of users to be outputted based on the identified subset of users.

Clause 36: The non-transitory physical computer storage of Clause 35, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

Clause 37: The non-transitory physical computer storage of Clause 35, wherein the computer-executable instructions, when executed, further configured the one or more processors to receive the user's selection of a particular user from the ranking of users, and cause an additional user interface to be outputted, wherein the additional user interface is usable by the user to send an electronic message to the particular user.

Clause 38: The non-transitory physical computer storage of Clause 35, wherein the ranking of users indicates, for each respective user in the ranking, a degree of match between the respective user and the target object.

Clause 39: A system comprising: a storage device storing user preference data associated with a plurality of user accounts and target object data associated with a plurality of target objects, wherein each target object corresponds to a home registered on the system; and a computing device configured to: receive, from a mobile device associated with a user account, location information associated with the mobile device; determine that the location information satisfies a location condition associated with the user account; receive, from the mobile device, a search request to search for one or more additional user accounts, wherein the search request includes a user image depicting a target object associated with the user account; determine one or more attributes associated with the user image; identify a subset of user accounts exhibiting a threshold level of match with respect to the target object depicted in the user image from the plurality of user accounts stored in the storage device by comparing the one or more attributes to the user preference data associated with the plurality of user accounts; and cause a ranking of user accounts to be outputted to the mobile device for presentation to the user based on the identified subset of user accounts.

Clause 40: The system of Clause 39, wherein determining that the location information satisfies the location condition associated with the user account comprises determining first GPS coordinates based on the location information associated with the mobile device and second GPS coordinates based on the user account, and determining that a difference between the first GPS coordinates and the second GPS coordinates is less than or equal to a threshold amount.

Clause 41: The system of Clause 39, wherein the computing device is further configured to receive an indication that the user has activated a user interface element on the mobile device to send an electronic message to a specific user account of the user accounts in the ranking, and cause the electronic message to be transmitted to another mobile device associated with the specific user account.

Clause 42: The system of Clause 39, wherein the ranking of user accounts indicates, for each respective user account in the ranking, a degree of match between the respective user account and the target object.

Clause 43: A method comprising: receiving, from a mobile device associated with a user account, location information associated with the mobile device; determining that the location information satisfies a location condition associated with the user account; receiving, from the mobile device, a search request to search for one or more additional user accounts, wherein the search request includes a user image depicting a target object associated with the user account; determining one or more attributes associated with the user image; identifying a subset of user accounts exhibiting a threshold level of match with respect to the target object depicted in the user image from the plurality of user accounts stored in a storage device by comparing the one or more attributes to user preference data associated with the plurality of user accounts; and outputting a ranking of user accounts to the mobile device for presentation to the user based on the identified subset of user accounts.

Clause 44: The method of Clause 43, wherein determining that the location information satisfies the location condition associated with the user account comprises determining first GPS coordinates based on the location information associated with the mobile device and second GPS coordinates based on the user account, and determining that a difference between the first GPS coordinates and the second GPS coordinates is less than or equal to a threshold amount.

Clause 45: The method of Clause 43, further comprising receiving an indication that the user has activated a user interface element on the mobile device to send an electronic message to a specific user account of the user accounts in the ranking, and transmitting the electronic message to another mobile device associated with the specific user account.

Clause 46: The method of Clause 43, wherein the ranking of user accounts indicates, for each respective user account in the ranking, a degree of match between the respective user account and the target object.

Clause 47: A computing device comprising: one or more processors; a display in communication with the one or more processors; one or more memories storing computer-executable instructions, which, when executed by the one or more processors, configure the one or more processors to: cause a plurality of training photographs to be displayed on the display along with one or more user interface elements usable by a user of the computing device to indicate the user's preference with respect to the plurality of training photographs; receive a set of user inputs with respect the plurality of training photographs via the one or more user interface elements; cause preference data associated with the user to be generated based on the received set of user inputs; cause a subset of target objects to be identified from a plurality of target objects stored on a remote storage device based on the preference data associated with the user; and cause a ranking of potential target objects to be displayed on the display based on the subset of target objects.

Clause 48: The computing device of Clause 47, wherein the one or more user interface elements include a first digital button for indicating that the user likes a training photograph presented on the same display screen of the computing device as the first digital button, and a second digital button for indicating that the user dislikes a training photograph presented on the same display screen of the computing device as the second digital button.

Clause 49: The computing device of Clause 47, wherein the one or more user interface elements are configured to generate an indication that the user likes a training photograph when the training photograph is swiped in a first direction, and to generate an indication that the user dislikes the training photograph when the training photograph is swiped in a direction opposite to the first direction.

Clause 50: The computing device of Clause 47, wherein the one or more user interface elements include one or more buttons, bars, or dials usable to specify a degree of preference for one or more elements depicted in a training photograph presented on the same display screen of the computing device as the one or more buttons, bars, or dials.

Clause 51: The computing device of Clause 47, wherein the preference data associated with the first user account includes one or more metrics that are each indicative of the user's preference with respect to a particular home architecture style, home exterior style, home interior style, or lifestyle.

Clause 52: The computing device of Clause 47, wherein the computer-executable instructions, when executed, further configured the one or more processors to receive the user's selection of a particular target object from the ranking of potential target objects, and cause an additional user interface to be displayed on the display, wherein the additional user interface is usable by the user to send an electronic message to an owner of the particular target object.

Clause 53: A method comprising: outputting, on a display of a computing device, a plurality of training photographs along with one or more user interface elements usable by a user of the computing device to indicate the user's preference with respect to the plurality of training photographs; receiving a set of user inputs with respect the plurality of training photographs via the one or more user interface elements; generating preference data associated with the user based on the received set of user inputs; identifying a subset of target objects from a plurality of target objects stored on a remote storage device based on the preference data associated with the user; and outputting, on the display of the computing device, a ranking of potential target objects based on the subset of target objects.

Clause 54: The method of Clause 53, wherein the one or more user interface elements include a first digital button for indicating that the user likes a training photograph presented on the same display screen of the computing device as the first digital button, and a second digital button for indicating that the user dislikes a training photograph presented on the same display screen of the computing device as the second digital button.

Clause 55: The method of Clause 53, wherein the one or more user interface elements are configured to generate an indication that the user likes a training photograph when the training photograph is swiped in a first direction, and to generate an indication that the user dislikes the training photograph when the training photograph is swiped in a direction opposite to the first direction.

Clause 56: The method of Clause 53, wherein the one or more user interface elements include one or more buttons, bars, or dials usable to specify a degree of preference for one or more elements depicted in a training photograph presented on the same display screen of the computing device as the one or more buttons, bars, or dials.

Clause 57: The method of Clause 53, wherein the preference data associated with the first user account includes one or more metrics that are each indicative of the user's preference with respect to a particular home architecture style, home exterior style, home interior style, or lifestyle.

Clause 58: The method of Clause 53, further comprising receiving the user's selection of a particular target object from the ranking of potential target objects, and outputting, on the display of the computing device, an additional user interface usable by the user to send an electronic message to an owner of the particular target object.

Clause 59: Non-transitory physical computer storage storing instructions that, when executed by one or more processors of a computing device, configure the one or more processors to: cause a plurality of training photographs to be outputted along with one or more user interface elements usable by a user of the computing device to indicate the user's preference with respect to the plurality of training photographs; receive a set of user inputs with respect the plurality of training photographs via the one or more user interface elements; cause preference data associated with the user to be generated based on the received set of user inputs; cause a subset of target objects to be identified from a plurality of target objects stored on a remote storage device based on the preference data associated with the user; and cause a ranking of potential target objects to outputted based on the subset of target objects.

Clause 60: The non-transitory physical computer storage of Clause 59, wherein the one or more user interface elements include a first digital button for indicating that the user likes a training photograph presented on the same display screen of the computing device as the first digital button, and a second digital button for indicating that the user dislikes a training photograph presented on the same display screen of the computing device as the second digital button.

Clause 61: The non-transitory physical computer storage of Clause 59, wherein the one or more user interface elements are configured to generate an indication that the user likes a training photograph when the training photograph is swiped in a first direction, and to generate an indication that the user dislikes the training photograph when the training photograph is swiped in a direction opposite to the first direction.

Clause 62: The non-transitory physical computer storage of Clause 59, wherein the one or more user interface elements include one or more buttons, bars, or dials usable to specify a degree of preference for one or more elements depicted in a training photograph presented on the same display screen of the computing device as the one or more buttons, bars, or dials.

Clause 63: The non-transitory physical computer storage of Clause 59, wherein the preference data associated with the first user account includes one or more metrics that are each indicative of the user's preference with respect to a particular home architecture style, home exterior style, home interior style, or lifestyle.

Clause 64: The non-transitory physical computer storage of Clause 59, wherein the computer-executable instructions, when executed, further configured the one or more processors to receive the user's selection of a particular target object from the ranking of potential target objects, and cause an additional user interface to be outputted, wherein the additional user interface is usable by the user to send an electronic message to an owner of the particular target object.

Clause 65: A system comprising: a storage device storing (i) a plurality of training photographs that are each associated with one or more attributes, and (ii) a plurality of target objects associated with one or more user accounts; and a server computing device configured to: cause the plurality of training photographs to be presented on a mobile device associated with a first user account along with one or more user interface elements usable by a user of the user computing device to indicate the user's preference with respect to the plurality of training photographs; receive an indication of the user's preference with respect to the plurality of training photographs; generate preference data associated with the first user account based on the received indication; identify a subset of target objects from the plurality of target objects based on the preference data associated with the first user account; and cause a ranking of potential target objects to be presented on the user computing device based on the subset of target objects.

Clause 66: The system of Clause 65, wherein the one or more user interface elements include a first digital button for indicating that the user likes a training photograph presented on the same display screen of the user computing device as the first digital button, and a second digital button for indicating that the user dislikes a training photograph presented on the same display screen of the user computing device as the second digital button.

Clause 67: The system of Clause 65, wherein the one or more user interface elements are configured to generate an indication that the user likes a training photograph when the training photograph is swiped in a first direction, and to generate an indication that the user dislikes the training photograph when the training photograph is swiped in a direction opposite to the first direction.

Clause 68: The system of Clause 65, wherein the one or more user interface elements include one or more buttons, bars, or dials usable to specify a degree of preference for one or more elements depicted in a training photograph presented on the same display screen of the user computing device as the one or more buttons, bars, or dials.

Clause 69: The system of Clause 65, wherein the preference data associated with the first user account includes one or more metrics that are each indicative of the user's preference with respect to a particular home architecture style, home exterior style, home interior style, or lifestyle.

Clause 70: The system of Clause 65, wherein the computer-executable instructions, when executed, further configure the server computing device to receive the user's selection of a particular target object from the ranking of potential target objects, and cause an additional user interface to be displayed on the display, wherein the additional user interface is usable by the user to send an electronic message to an owner of the particular target object.

Clause 71: A method comprising: outputting a plurality of training photographs that are each associated with one or more attributes to a computing device associated with a first user account such that the plurality of training photographs are presented on the computing device along with one or more user interface elements usable by a user of the computing device to indicate the user's preference with respect to the plurality of training photographs; receiving an indication of the user's preference with respect to the plurality of training photographs; generating preference data associated with the first user account based on the received indication; identifying, based on the preference data associated with the first user account, a subset of target objects from a plurality of target objects stored on a storage device; and outputting a ranking of potential target objects to the computing device for presentation on the computing device based on the subset of target objects.

Clause 72: The method of Clause 71, wherein the one or more user interface elements include a first digital button for indicating that the user likes a training photograph presented on the same display screen of the computing device as the first digital button, and a second digital button for indicating that the user dislikes a training photograph presented on the same display screen of the computing device as the second digital button.

Clause 73: The method of Clause 71, wherein the one or more user interface elements are configured to generate an indication that the user likes a training photograph when the training photograph is swiped in a first direction, and to generate an indication that the user dislikes the training photograph when the training photograph is swiped in a direction opposite to the first direction.

Clause 74: The method of Clause 71, wherein the one or more user interface elements include one or more buttons, bars, or dials usable to specify a degree of preference for one or more elements depicted in a training photograph presented on the same display screen of the computing device as the one or more buttons, bars, or dials.

Clause 75: The method of Clause 71, wherein the preference data associated with the first user account includes one or more metrics that are each indicative of the user's preference with respect to a particular home architecture style, home exterior style, home interior style, or lifestyle.

Clause 76: The method of Clause 71, further comprising receiving the user's selection of a particular target object from the ranking of potential target objects, and outputting an additional user interface to the computing device for presentation to the user, wherein the additional user interface is usable by the user to send an electronic message to an owner of the particular target object.

OTHER CONSIDERATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure. Further, additional embodiments created by combining any two or more features or techniques of one or more embodiments described herein or illustrated in FIGS. 1-56 are also intended to be included herein within the scope of this disclosure. For example, feature A of example X and feature B of example Y may be combined into a claimed implementation Z even if (i) feature A and feature B are not described herein as being part of the same example or implementation, (ii) example X includes features other than feature A that are not part of the claimed implementation Z, and/or (iii) example Y includes features other than feature B that are not part of the claimed implementation Z.

What is claimed is:

1. A mobile device comprising:
one or more processors;
a display in communication with the one or more processors;
a location determination module in communication with the one or more processors and configured to receive a signal indicative of a location of the mobile device;
a camera module in communication with the one or more processors and configured to generate images;
one or more memories storing computer-executable instructions, which, when executed by the one or more processors, cause the one or more processors to:
generate, using the camera module, a user image depicting a target object associated with a user, wherein the target object is the user's home;
determine, using the location determination module, a location associated with the mobile device;
determine that a first location associated with the user image depicting the target object is proximate to a second location associated with a home registered on the user's profile;
determine one or more attributes associated with the user image;
identify a subset of users exhibiting a threshold level of match with respect to the target object depicted in the user image based on a comparison of the one or more attributes to a plurality of user profiles; and
cause a ranking of users to be displayed on the display based on the identified subset of users.

2. The mobile device of claim 1, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

3. The mobile device of claim 1, wherein the computer-executable instructions, when executed, further cause the one or more processors to receive the user's selection of a particular user from the ranking of users, and cause an additional user interface to be outputted, wherein the additional user interface is usable by the user to send an electronic message to the particular user.

4. The mobile device of claim 1, wherein the ranking of users indicates, for each respective user in the ranking, a degree of match between the respective user and the target object.

5. A method comprising:
- generating, on a mobile device of a user, a user image depicting a target object, wherein the target object is the user's home;
- determining a location associated with the mobile device;
- determining that a first location associated with the user image depicting the target object is proximate to a second location associated with a home registered on the user's profile;
- determining one or more attributes associated with the user image;
- identifying a subset of users exhibiting a threshold level of match with respect to the target object depicted in the user image by comparing the one or more attributes to a plurality of user profiles; and
- displaying a ranking of users on a display of the mobile device based on the identified subset of users.

6. The method of claim 5, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

7. The method of claim 5, further comprising receiving the user's selection of a particular user from the ranking of users, and outputting an additional user interface that is usable by the user to send an electronic message to the particular user.

8. The method of claim 5, wherein the ranking of users indicates, for each respective user in the ranking, a degree of match between the respective user and the target object.

9. Non-transitory physical computer storage storing instructions that, when executed by one or more processors of a computing device, configure the one or more processors to:
- generate, using a camera module of the computing device, a user image depicting a target object, wherein the target object is the user's home;
- determine, using a location determination module of the computing device, a location associated with the computing device;
- determine that a first location associated with the user image depicting the target object is proximate to a second location associated with a home registered on the user's profile;
- determine one or more attributes associated with the user image;
- identify a subset of users exhibiting a threshold level of match with respect to the target object depicted in the user image by comparing the one or more attributes to a plurality of user profiles; and
- cause a ranking of users to be outputted based on the identified subset of users.

10. The non-transitory physical computer storage of claim 9, wherein determining that the first location associated with the user image depicting the target object is proximate to the second location associated with the home registered on the user's profile comprises determining first GPS coordinates associated with the first location and second GPS coordinates associated with the second location, and determining that a difference between the first GPS coordinates and the second GPS coordinates is less than or equal to a threshold amount.

11. The non-transitory physical computer storage of claim 9, wherein the computer-executable instructions, when executed, further configure the one or more processors to receive the user's selection of a particular user from the ranking of users, and cause an additional user interface to be outputted, wherein the additional user interface is usable by the user to send an electronic message to the particular user.

12. The non-transitory physical computer storage of claim 9, wherein the ranking of users indicates, for each respective user in the ranking, a degree of match between the respective user and the target object.

13. A system comprising:
- a storage device storing user preference data associated with a plurality of user accounts and target object data associated with a plurality of target objects, wherein each target object corresponds to a home registered on the system; and
- a computing device configured to:
  - receive, from a mobile device associated with a user account, location information associated with the mobile device;
  - determine that the location information satisfies a location condition associated with the user account;
  - receive, from the mobile device, a search request to search for one or more additional user accounts, wherein the search request includes a user image depicting a target object associated with the user account;
  - determine one or more attributes associated with the user image;
  - identify a subset of user accounts exhibiting a threshold level of match with respect to the target object depicted in the user image from the plurality of user accounts stored in the storage device by comparing the one or more attributes to the user preference data associated with the plurality of user accounts; and
  - cause a ranking of user accounts to be outputted to the mobile device for presentation to the user based on the identified subset of user accounts.

14. The system of claim 13, wherein determining that the location information satisfies the location condition associated with the user account comprises determining first GPS coordinates based on the location information associated with the mobile device and second GPS coordinates based on the user account, and determining that a difference between the first GPS coordinates and the second GPS coordinates is less than or equal to a threshold amount.

15. The system of claim 13, wherein the computing device is further configured to receive an indication that the user has activated a user interface element on the mobile device to send an electronic message to a specific user account of the user accounts in the ranking, and cause the electronic message to be transmitted to another mobile device associated with the specific user account.

16. The system of claim 13, wherein the ranking of user accounts indicates, for each respective user account in the ranking, a degree of match between the respective user account and the target object.

17. A method comprising:
- receiving, from a mobile device associated with a user account, location information associated with the mobile device;
- determining that the location information satisfies a location condition associated with the user account;
- receiving, from the mobile device, a search request to search for one or more additional user accounts, wherein the search request includes a user image depicting a target object associated with the user account;

determining one or more attributes associated with the user image;

identifying a subset of user accounts exhibiting a threshold level of match with respect to the target object depicted in the user image from the plurality of user accounts stored in a storage device by comparing the one or more attributes to user preference data associated with the plurality of user accounts; and outputting a ranking of user accounts to the mobile device for presentation to the user based on the identified subset of user accounts.

18. The method of claim 17, wherein determining that the location information satisfies the location condition associated with the user account comprises determining first GPS coordinates based on the location information associated with the mobile device and second GPS coordinates based on the user account, and determining that a difference between the first GPS coordinates and the second GPS coordinates is less than or equal to a threshold amount.

19. The method of claim 17, further comprising receiving an indication that the user has activated a user interface element on the mobile device to send an electronic message to a specific user account of the user accounts in the ranking, and transmitting the electronic message to another mobile device associated with the specific user account.

20. The method of claim 17, wherein the ranking of user accounts indicates, for each respective user account in the ranking, a degree of match between the respective user account and the target object.

\* \* \* \* \*